(12) United States Patent
Yi et al.

(10) Patent No.: US 12,417,663 B2
(45) Date of Patent: Sep. 16, 2025

(54) DEVICE CONTROL METHODS AND SYSTEMS

(71) Applicant: YUNDING NETWORK TECHNOLOGY (BEIJING) CO., LTD., Beijing (CN)

(72) Inventors: Qi Yi, Beijing (CN); Yanpeng Lyu, Beijing (CN); Jiaming Pan, Beijing (CN); Lei Zhao, Beijing (CN); Li Fang, Shenzhen (CN)

(73) Assignee: YUNDING NETWORK TECHNOLOGY (BEIJING) CO., LTD., Beijing (CN)

(*) Notice: Subject to any disclaimer, the term of this patent is extended or adjusted under 35 U.S.C. 154(b) by 246 days.

(21) Appl. No.: 18/058,861

(22) Filed: Nov. 26, 2022

(65) Prior Publication Data
US 2023/0091394 A1    Mar. 23, 2023

Related U.S. Application Data

(63) Continuation of application No. PCT/CN2021/096186, filed on May 26, 2021.

(30) Foreign Application Priority Data

May 26, 2020 (CN) .......................... 202010454856.1
Jul. 30, 2020 (CN) .......................... 202010750449.5
(Continued)

(51) Int. Cl.
G07C 9/00 (2020.01)
G06V 20/52 (2022.01)

(52) U.S. Cl.
CPC ......... *G07C 9/00571* (2013.01); *G06V 20/52* (2022.01); *G07C 9/00309* (2013.01);
(Continued)

(58) Field of Classification Search
CPC ............ G05B 15/02; G05B 2219/2642; G06V 20/52; G07C 9/00309; G07C 9/00571; G07C 2009/00507
See application file for complete search history.

(56) References Cited

U.S. PATENT DOCUMENTS

| 6,771,181 B1 * | 8/2004 | Hughen, Jr. ........... G08B 7/062 49/141 |
| 9,064,394 B1 | 6/2015 | Trundle |

(Continued)

FOREIGN PATENT DOCUMENTS

| CN | 1153887 C | 6/2004 |
| CN | 102708609 A | 10/2012 |

(Continued)

OTHER PUBLICATIONS

The Extended European Search Report in European Application No. 21812467.5 mailed on Oct. 5, 2023, 14 pages.
(Continued)

*Primary Examiner* — Yong Hang Jiang
(74) *Attorney, Agent, or Firm* — METIS IP LLC

(57) ABSTRACT

The embodiments of the present disclosure disclose a method and system for controlling a device. The device control method includes: determining one or more sets, wherein the one or more sets include one or more preset rules each of which corresponds to a set of the one or more sets; including a first device into a first set of the one or more sets based on information of the first device; and controlling the first device in the first set to perform a corresponding operation according to a preset rule corresponding to the first set.

20 Claims, 20 Drawing Sheets

(30) Foreign Application Priority Data

| Jul. 30, 2020 | (CN) | 202021553185.6 |
| Dec. 31, 2020 | (CN) | 202011621279.7 |
| Dec. 31, 2020 | (CN) | 202011624116.4 |

(52) U.S. Cl.
CPC ............. *G07C 2009/00507* (2013.01); *G07C 2009/00753* (2013.01)

(56) References Cited

U.S. PATENT DOCUMENTS

| 9,241,270 | B1* | 1/2016 | Logue | G06F 21/44 |
| 10,062,233 | B1* | 8/2018 | Rogers | G07C 9/38 |
| 2007/0222621 | A1* | 9/2007 | Cole | E06B 7/32 |
| | | | | 340/573.1 |
| 2014/0229752 | A1 | 8/2014 | Lee | |
| 2015/0116109 | A1* | 4/2015 | Fadell | G06Q 10/0631 |
| | | | | 340/501 |
| 2016/0316007 | A1 | 10/2016 | Hou et al. | |
| 2017/0039844 | A1 | 2/2017 | Malhotra et al. | |
| 2021/0287521 | A1* | 9/2021 | Stone | G05B 13/0265 |

FOREIGN PATENT DOCUMENTS

| CN | 203773609 U | 8/2014 |
| CN | 104135407 A | 11/2014 |
| CN | 104484915 A | 4/2015 |
| CN | 104581528 A | 4/2015 |
| CN | 104746965 A | 7/2015 |
| CN | 104851244 A | 8/2015 |
| CN | 104973012 A | 10/2015 |
| CN | 105607499 A | 5/2016 |
| CN | 205277085 U | 6/2016 |
| CN | 205541017 U | 8/2016 |
| CN | 106088841 A | 11/2016 |
| CN | 106547904 A | 3/2017 |
| CN | 106952429 A | 7/2017 |
| CN | 107419970 A | 12/2017 |
| CN | 107545675 A | 1/2018 |
| CN | 107590974 A | 1/2018 |
| CN | 207008746 U | 2/2018 |
| CN | 108037675 A | 5/2018 |
| CN | 108049721 A | 5/2018 |
| CN | 108124130 A | 6/2018 |
| CN | 207440958 U | 6/2018 |
| CN | 208003314 U | 10/2018 |
| CN | 108848392 A | 11/2018 |
| CN | 108986821 A | 12/2018 |
| CN | 109039834 A | 12/2018 |
| CN | 109079810 A | 12/2018 |
| CN | 109150672 A | 1/2019 |
| CN | 109191632 A | 1/2019 |
| CN | 109298642 A | 2/2019 |
| CN | 109471371 A | 3/2019 |
| CN | 109555370 | 4/2019 |
| CN | 109615738 | 4/2019 |
| CN | 208722370 U | 4/2019 |
| CN | 109756404 A | 5/2019 |
| CN | 109828544 A | 5/2019 |
| CN | 110379060 A | 10/2019 |
| CN | 110519738 A | 11/2019 |
| CN | 210244550 U | 4/2020 |
| CN | 111158255 A | 5/2020 |
| CN | 111427339 | 7/2020 |
| CN | 211294116 U | 8/2020 |
| CN | 111852204 | 10/2020 |
| CN | 213042656 U | 4/2021 |
| JP | H08101978 A | 4/1996 |
| JP | 2016038766 A | 3/2016 |
| TW | 201831768 A | 9/2018 |

OTHER PUBLICATIONS

International Search Report in PCT/CN2021/096186 mailed on Aug. 30, 2021, 6 pages.

Written Opinion in PCT/CN2021/096186 mailed on Aug. 30, 2021, 10 pages.

First Office Action in Chinese Application No. 202010454856.1 mailed on May 24, 2022, 17 pages.

First Office Action in Chinese Application No. 202011621279.7 mailed on Nov. 2, 2022, 27 pages.

First Office Action in Chinese Application No. 202011624116.4 mailed on Nov. 18, 2022, 23 pages.

\* cited by examiner

DEVICE CONTROL METHODS AND SYSTEMS

CROSS-REFERENCE TO RELATED APPLICATIONS

This application is a continuation of International Patent Applicant No. PCT/CN2021/096186, filed on May 26, 2021, which claims priority to Chinese Patent Application No. 202010454856.1, filed on May 26, 2020, Chinese Patent Application No. 202021553185.6, filed on Jul. 30, 2020, Chinese Patent Application No. 202010750449.5, filed on Jul. 30, 2020, Chinese Patent Application No. 202011624116.4, filed on Dec. 31, 2020, and Chinese Patent Application No. 202011621279.7, filed on Dec. 31, 2020, the contents of each of which are hereby incorporated by reference.

TECHNICAL FIELD

The present application relates to the device control field, and in particular, to a device control method and system.

BACKGROUND

With the advancement and development of science and technology, smart devices (such as a smart lock, a smart speaker, a smart curtain, a smart lamp, etc.) have entered the daily life of the public. The smart devices are widely used in fields such as access control system, home equipment, security, transportation, etc. How to conveniently and effectively realize the independent and linkage control of a smart device, such as the state (e.g., an armed state, a disarming state, etc.) control of the smart device, the mode (e.g., an electronic anti-lock mode, an administrator mode, etc.) control of the smart device, and the effective use of the smart device to improve security prevention and control, has important practical application value. Therefore, it is expected to provide an effective method and system for controlling a smart device.

SUMMARY

One of the embodiments of the present disclosure provides a method for controlling a device, comprising: determining one or more sets, wherein the one or more sets include one or more preset rules each of which corresponds to a set of the one or more sets; including a first device into a first set of the one or more sets based on information of the first device; and controlling the first device in the first set to perform a corresponding operation according to a preset rule corresponding to the first set.

In some embodiments, the device control method further comprises: receiving a management instruction; and performing a corresponding management operation according to the management instruction. The management instruction is configured to instruct to manage at least one of a set, a device in the set, or a user account associated with the device in the set.

In some embodiments, the device control method further comprises: receiving a sharing request of the first device; creating a new set by using the identifier of the first set corresponding to the first device as a set identifier; including the first device into the new set; and setting a control authority of the first device to make the control authority meet a requirement of the setting information of the original user account corresponding to the first device. The sharing request carries an identifier of the first device, an identifier and configuration information of the first set corresponding to the first device, and setting information of an original user account corresponding to the first device. Configuration information of the new set is set as the configuration information of the first set.

In some embodiments, the device control method further comprises: obtaining a control instruction for controlling the first device used by a user; verifying whether the control instruction satisfies a preset condition to obtain a verification result; and determining whether to control the first device to perform an operation corresponding to the control instruction according to the verification result, a state of the first device, and the control instruction.

In some embodiments, the control instruction is sent by the user through a first terminal device. The verifying whether the control instruction satisfies the preset condition comprises: verifying whether the first terminal device has an authority to execute the operation corresponding to the control instruction.

In some embodiments, the control instruction is generated based on an operation of the user on an operating component of the first device. The verifying whether the control instruction satisfies the preset condition includes: verifying whether the operating component is at a preset position.

In some embodiments, the control instruction is configured to control to turn on or turn off a preset mode of the first device.

In some embodiments, the preset mode includes one or more of: a safe mode, a do-not-disturb mode, a specific user control mode, or a user self-setting mode.

In some embodiments, the device control method further comprises: after controlling the first device to perform the operation corresponding to the control instruction, determining whether a preset scene occurs based on an image acquired by an image acquisition device; and in response to determining that the preset scene occurs, controlling the image acquisition device to perform an image acquisition operation according to a preset image acquisition rule.

In some embodiments, the first device includes a smart lock. The device control method further comprises: detecting a door-opening action behavior or a door-closing action behavior of a user; in response to determining that the door-opening action behavior or the door-closing action behavior is detected, monitoring an action of a trigger component of the smart lock; and in response to determining that the action of the trigger component satisfies a preset condition, controlling the first device to be in an armed state.

In some embodiments, the detecting the door-opening action behavior or the door-closing action behavior of the user comprises: detecting an action of an inner door operator or an outer door operator of the smart lock, or detecting the door-opening action behavior or the door-closing action behavior of the user by a sensor.

In some embodiments, the monitoring of the action of the trigger component of the smart lock comprises: monitoring an action of an outer door operator or a lock body of the smart lock. The in response to determining that the action of the trigger component satisfies the preset condition comprises: determining that a locking action of the outer door operator or the lock body of the smart lock is detected.

In some embodiments, in response to determining that the door-opening action behavior or the door-closing action behavior is detected, the monitoring the action of the trigger component of the smart lock comprises: in response to determining that the door-opening action behavior or the door-closing action behavior of the user is detected, monitoring an action of the trigger component of the smart lock within a set time period. The in response to determining that the action of the trigger component satisfies the preset condition comprises: determining that the action of the trigger component satisfies the preset condition within the set time period.

In some embodiments, the device control method further comprises: checking an indoor temperature; determining whether the indoor temperature exceeds a temperature threshold; and in response to determining that the indoor temperature exceeds the temperature threshold, controlling the smart lock to be unlocked.

In some embodiments, the controlling the first device in the first set to perform the corresponding operation according to the preset rule corresponding to the first set comprises: detecting whether an abnormal condition exists; and in response to determining that the abnormal condition is detected, controlling the first device in the first set to perform a corresponding operation according to a preset rule corresponding to the abnormal condition.

In some embodiments, the detecting whether the abnormal condition exists comprises: obtaining information; obtaining a feature of the information by parsing the information; obtaining an analysis result that matches the feature; and determining whether the abnormal condition exists according to the analysis result.

In some embodiments, the device control method further comprises: sending the abnormal condition to one or more terminal devices in response to detecting the abnormal condition.

In some embodiments, the information includes a sound signal, the feature of the information includes characteristic information of the sound signal. The characteristic information includes one or more of a timbre, a tone, a vibration amplitude, a vibration frequency, or a duration.

One of the embodiments of the present disclosure provides a device control system, comprising: a set determination module, a device determination module, and a control module. The set determination module is configured to determine one or more sets. The one or more sets include one or more preset rules each of which corresponds to a set of the one or more sets. The device determination module is configured to include a first device into a first set of the one or more sets based on information of the first device. The control module is configured to control the first device in the first set to perform a corresponding operation according to a preset rule corresponding to the first set.

One of the embodiments of the present disclosure provides a method for controlling a device, the method is applied to a first user terminal device. The method comprises: receiving a device including instruction for including a device to be included to a specified house; and including the device to be included into the specified house according to the device including instruction. The device to be included is a device bound to a user account corresponding to the first user terminal device, and the specified house is configured with a corresponding scene rule. The device included in the specified house is controlled by the first user terminal device according to the scene rule corresponding to the specified house.

In some embodiments, before receiving the device including instruction for including the device to be included into the specified house, the method further comprises: receiving a house creation instruction; creating at least one house according to the house creation instruction; and configuring a corresponding scene rule for the at least one house. The at least one house includes the specified house.

In some embodiments, the method further comprises: receiving a management instruction, and performing a corresponding management operation according to the management instruction. The management instruction is configured to instruct to manage at least one of: a house, a device of the house, a user account associated with the device of the house.

In some embodiments, the receiving the management instruction, and performing the corresponding management operation according to the management instruction comprises: receiving a moving instruction of the house where the device belongs to, wherein the moving instruction carries an original house identifier and a target house identifier of a device to be moved; deleting the device to be moved from a house corresponding to the original house identifier; including the device to be moved into a house corresponding to the target house identifier; and modifying configuration information of the device to be moved and/or configuration information of the house corresponding to the target house identifier, so that current configuration information of the device to be moved matches the scene rule of the house corresponding to the target house identifier.

In some embodiments, the receiving a management instruction, and performing a corresponding management operation according to the management instruction comprises: receiving a first device deletion instruction for deleting a device to be deleted from the corresponding house, wherein the first device deletion instruction comes from a first target user account, and the first target user account has a highest control authority over the device to be deleted; determining the house to which the device to be deleted belongs; and deleting the device to be deleted from the house to which the device to be deleted belongs according to the first device deletion instruction.

In some embodiments, if the first target user account is a user account corresponding to the first user terminal device, and a house created by a second user terminal device communicating with the first user terminal device includes the device to be deleted, the method further comprises: sending a second device deletion instruction for deleting the device to be deleted to the second user terminal device, so that the second user terminal device can delete the device to be deleted from the house to which the device to be deleted belongs according to the second device deletion instruction.

In some embodiments, the receiving a management instruction, and performing a corresponding management operation according to the management instruction comprises: receiving a user account deletion instruction for deleting a second target user account, wherein the second target user account is associated with the first device included in the house, and a control authority of the second target user account over the first device is not the highest control authority; deleting the second target user account from user accounts associated with the first device according to the user account deletion instruction; and sending a control authority deletion instruction to a server, wherein the control authority deletion instruction is configured to control the server to delete a control authority of the second target user account over the first device.

In some embodiments, the method further comprises: receiving a sharing request for sharing a device sent by the server, wherein the sharing request carries an identifier of the shared device, an identifier and configuration information of an original house corresponding to the shared device, and setting information of an original user account corresponding to the shared device; using an identifier of the original house corresponding to the shared device as a house identifier to create a new house, wherein configuration information of the new house is set as configuration information of the original house corresponding to the shared device; including the shared device into the new house; and setting a control authority of the shared device so that the control authority conforms to a requirement of the setting information of the original user account corresponding to the shared device.

One of the embodiments of the present disclosure provides a device control apparatus, which is applied to a first user terminal device. The device control apparatus includes: a first receiving unit configured to receive a device including instruction indicating to include a device to be included into a specified house. The device to be included is a device bound to a user account corresponding to the first user terminal device, and the specified house is configured with a corresponding scene rule. The device control apparatus further includes an including unit configured to include the device to be included into the specified house according to the device including instruction. The device included in the specified house is controlled by the first user terminal device according to the scene rule corresponding to the specified house.

In some embodiments, the apparatus further includes: a second receiving unit configured to receive a house creation instruction; a configuration unit configured to create at least one house according to the house creation instruction and configure a scene rule corresponding to the at least one house. The at least one house includes the specified house.

In some embodiments, the apparatus further includes: an execution unit configured to receive a management instruction, and perform a corresponding management operation according to the management instruction. The management instruction is used to instruct to manage at least one of a house, a device in the house, a user account associated with the device in the house.

In some embodiments, the apparatus further includes a sixth receiving unit configured to receive a sharing request for sharing the device sent by a server. The sharing request carries an identifier of the shared device, an identifier and configuration information of an original house corresponding to the shared device, and setting information of an original user account corresponding to the shared device. The apparatus further includes a creation unit configured to create a new house using an identifier of the original house corresponding to the shared device as a house identifier. The configuration information of the new house is set as configuration information of the original house corresponding to the shared device. The apparatus further includes a setting unit configured to include the shared device into the new house and set a control authority of the shared device so that the control authority conforms to a requirement of the setting information of the original user account corresponding to the shared device.

One of the embodiments of the present disclosure provides a smart lock control method, which is applied to a controller of a smart lock. The smart lock control method comprises: obtaining a smart lock control instruction; verifying the legality of the smart lock control instruction to obtain a verification result, wherein the smart lock control instruction includes a local control instruction or a control instruction received via a communication manner; obtaining a state of the smart lock; determining whether to respond to the smart lock control instruction according to the verification result, the state of the smart lock, and a preset control instruction response rule.

In some embodiments, the smart lock control instruction is a control instruction for turning on a preset mode. The obtaining a smart lock control instruction and verifying the legality of the smart lock control instruction to obtain a verification result comprises: obtaining a control instruction for turning on the preset mode, and determining whether the control instruction for turning on the preset mode is sent by a preset terminal device to obtain the verification result. The control instruction includes a turning on rule of the preset mode. In some embodiments, the obtaining a smart lock control instruction and verifying the legality of the smart lock control instruction to obtain a verification result comprises: obtaining a control instruction for turning on the preset mode generated in response to a user operating an operating component of the smart lock, and determining whether the control instruction is generated when the operating component corresponding to the preset mode is adjusted to a position indicating that the preset mode is turned on to obtain the verification result.

In some embodiments, the determining whether to respond to the smart lock control instruction according to the verification result, a current state of the smart lock, and the preset control instruction response rule includes: determining whether the current state of the smart lock is a locking state, and determining whether the verification result is a first preset result; in response to determining that the current state is the locking state and the verification result is the first preset result, determining to respond to the smart lock control instruction; in response to determining that the current state is not the locking state or the verification result is not the first preset result, filtering the smart lock control instruction.

In some embodiments, after determining to respond to the smart lock control instruction, the method further comprises: controlling the smart lock to be in a working state of the preset mode.

In some embodiments, after controlling the smart lock to be in the working state of the preset mode, the method further comprises: determining whether a preset scene occurs based on an image acquired by a preset image acquisition device; if so, controlling the preset image acquisition device to perform an image acquisition operation according to a preset image acquisition rule.

In some embodiments, the smart lock control instruction is a control instruction used for turning off the preset mode. The obtaining a smart lock control instruction and verifying the legality of the smart lock control instruction to obtain a verification result comprises: obtaining the smart lock control instruction for turning off the preset mode, and determining whether the control instruction is sent by the preset terminal device to obtain the verification result. The control instruction includes a turning off rule of the preset mode. In some embodiments, the obtaining a smart lock control instruction and verifying the legality of the smart lock control instruction to obtain a verification result comprises: obtaining a control instruction for turning off the preset mode generated after a preset component set on the smart lock is triggered, and determining whether control information of the control instruction satisfies a preset rule to obtain the verification result. In some embodiments, the obtaining a smart lock control instruction and verifying the legality of the smart lock control instruction to obtain a verification result comprises: obtaining a smart lock state change instruction, and determining whether a state change trend in the smart lock state change instruction is changed from the locking state to an unlocking state to obtain the verification result. In some embodiments, the obtaining a smart lock control instruction and verifying the legality of the smart lock control instruction to obtain a verification result comprises: obtaining a control instruction input by the user on a smart lock panel for turning off the preset mode, and determining whether a content in the control instruction is a preset content to obtain the verification result.

In some embodiments, when the verification result and the current state meet a preset condition, the determining whether to respond to the smart lock control instruction according to the preset control instruction response rule comprises: judging whether the current state is a normal working state, and judging whether the verification result is a second preset result, in response to determining that the state is the normal working state and the verification result is the second preset result, determining to respond to the smart lock control instruction; in response to determining that the verification result is not the second preset result, filtering the smart lock control instruction.

In some embodiments, after determining to respond to the smart lock control instruction, the method further comprises: controlling the smart lock to be in a working state of a non-preset mode.

In some embodiments, the smart lock control instruction is a control instruction for turning off the preset mode. The obtaining a smart lock control instruction and verifying the legality of the smart lock control instruction to obtain the verification result comprises: obtaining a local unlocking instruction input by the user, wherein the local unlocking instruction includes unlocking information; verifying whether the unlocking information is unlocking information with an unlocking authority; if so, verifying whether the unlocking information is the unlocking information corresponding to a preset user identifier to obtain the verification result.

In some embodiments, after determining that the smart lock control instruction needs to be responded to, the method further comprises: responding to the local unlocking instruction, performing an unlocking operation, and turning off the preset mode after successfully performing the unlocking operation.

In some embodiments, the determining whether the unlocking operation is successfully performed includes: determining whether a preset bolt is retracted; if so, determining that the unlocking operation is successfully performed.

One of the embodiments of the present disclosure provides a smart lock control apparatus, which is applied to a controller in a smart lock. The smart lock control apparatus includes an instruction verification module, a state acquisition module, and an instruction judgment module. The instruction verification module is configured to acquire a smart lock control instruction and verify a legality of the smart lock control instruction to obtain a verification result. The smart lock control instruction includes a local control instruction or a control instruction received through a communication manner. The state acquisition module is configured to acquire a state of the smart lock. The instruction judgment module is configured to determine whether to respond to the smart lock control instruction according to the verification result, the state of the smart lock, and a preset control instruction response rule.

One of the embodiments of the present disclosure provides a method for controlling a smart lock, which is applied to a smart lock. The method comprises: detecting a door-opening action behavior of a user; and monitoring an action of a safety trigger component of the smart lock in response to the door-opening action behavior; in response to determining that the action of the safety trigger component satisfies a preset condition, controlling the smart lock to be in an armed state. When the smart lock is in the armed state and a preset action is detected by the smart lock, an alert action is performed.

In some embodiments, the monitoring an action of a safety trigger component of the smart lock comprises: monitoring an operation action of an arming operator of the smart lock. The determining that the action of the safety trigger component satisfies a preset condition includes: determining that the arming operator is triggered.

In some embodiments, the monitoring the action of the safety trigger component of the smart lock includes: monitoring the action of the door operator or the lock body of the smart lock. The determining that the action of the safety trigger component satisfies a preset condition include: determining a locking action of the outer door operator or the lock body.

In some embodiments, the detecting a door-opening action behavior of a user includes: detecting a door-opening action of an indoor operator of the smart lock, or detecting the door-opening action of the indoor operator of the smart lock and sensing that the user goes out by a specified sensor.

In some embodiments, the method further comprises: in response to determining that the action of the safety trigger component satisfies the preset condition, sending an arming request to the server, so that the server controls at least one smart device to be in an armed state based on the arming request. When the smart device is in the armed state and if a preset abnormal anti-theft behavior is sensed by the smart device, the alert action is performed.

In some embodiments, the smart lock is further integrated with a camera device, the method further comprises: in response to determining that the action of the safety trigger component satisfies a preset condition, controlling the camera device integrated in the smart lock to be in the armed state. When the camera device is in the armed state, the camera device performs an image acquisition operation, and perform the alert action when it is determined that an abnormal person exists based on the acquired image.

In some embodiments, the monitoring an action of a safety trigger component of the smart lock in response to the door-opening action behavior comprises: starting a timer in response to the door-opening action behavior, and monitoring the action of the safety trigger component of the smart lock within a preset time period corresponding to the timer. The determining that the action of the safety trigger component satisfies the preset condition comprises: determining that the action of the safety trigger component satisfies the preset condition within the preset time period.

In some embodiments, the method further comprises: in a case of determining that a doorbell button associated with the smart lock is pressed, sending a doorbell reminder message to the server, so that the server sends the doorbell reminder message to a user terminal device bound to the smart lock. The doorbell reminder message is used to prompt that someone has pressed the doorbell.

In some embodiments, the method further comprises: sensing an indoor temperature by a temperature sensor in the smart lock; and controlling the smart lock to perform an unlocking operation when the indoor temperature exceeds a preset threshold.

In some embodiments, the method further comprises: when the indoor temperature exceeds the preset threshold, sending a risk alarm to the user terminal device bound to the smart lock. The risk alarm is used to remind the user that the indoor temperature exists a security risk.

One of the embodiments of the present disclosure provides a method for controlling a smart lock, which is applied to a server. The method comprises: obtaining an arming request sent by the smart lock, wherein the arming request is generated in response to determining that a door-opening action behavior of a user is detected by the smart lock and an action of the safety trigger component of the smart lock meets a preset condition; instructing the smart lock to enter an armed state. When the smart lock is in the armed state and if a preset action is detected by the smart lock, an alarm operation is performed.

One of the embodiments of the present disclosure provides a smart lock control apparatus, which is applied to a server. The apparatus comprises: a request obtaining unit and an arming instruction unit. The request obtaining unit is configured to obtain an arming request sent by the smart lock. The arming request is generated in response to determining that a door-opening action behavior of a user is detected by the smart lock and an action of the safety trigger component of the smart lock meets a preset condition. The arming instruction unit is configured to instruct the smart lock to enter an armed state in response to the arming request. When the smart lock is in the armed state and if a preset action is detected by the smart lock, an alarm operation is performed.

One of the embodiments of the present disclosure provides a non-transitory computer-readable storage medium storing instructions, the instructions, when executed by a computer, causing the computer to implement a method for controlling a device according to any one of the embodiments of the present disclosure.

One of the embodiments of the present disclosure provides a processor, the processor being configured to run a program. When the program is executed by the processor, the processor is caused to implement the method described in any embodiment of the present disclosure.

One of the embodiments of the present disclosure provides a smart lock, including: one or more processors and a storage device on which one or more programs are stored. When the one or more programs are executed by the one or more processors, the one or more processors are caused to implement the method for controlling a device described in any of the embodiments of the present disclosure.

One of the embodiments of the present disclosure provides an information processing apparatus, comprising: a sound collection module, a sound processing module, and a data transmission module. The sound collection module, the sound processing module, and the data transmission module are connected in sequence. The sound collection module collects a sound signal of the smart device. The sound processing module obtains a sound analysis result corresponding to the sound signal. The data transmission module outputs the sound analysis result to a first terminal device.

In some embodiments, when the sound processing module is configured to obtain the sound analysis result corresponding to the sound signal, the sound processing module is specifically configured to: analyze the sound signal to obtain characteristic information of the sound signal; obtain the sound analysis result that matches the characteristic information. The sound analysis result includes a sound processing result, a push manner of the sound processing result, and a push object of the sound processing result.

In some embodiments, the information processing apparatus further includes a second terminal device. The second terminal device is connected to the data transmission module. The sound processing module sends the sound signal to the second terminal device. The second terminal device obtains the sound analysis result corresponding to the sound signal, and sends the sound analysis result to the sound processing module.

In some embodiments, the sound processing module is further configured to: control a target linkage device associated with the smart device to perform a target action corresponding to the smart device.

In some embodiments, the sound processing module is further configured to: control the data transmission module to output the sound analysis result to a third terminal device when information fed back by the first terminal device is not received through the data transmission module within a preset time period.

In some embodiments, the characteristic information includes one or more of: a timbre, a tone, a vibration amplitude, or a duration.

In some embodiments, the sound collection module includes a microphone.

In some embodiments, the smart device includes one or more of: a smoke alarm, a flood alarm, or a flammable gas alarm.

In some embodiments, the data transmission module includes a wireless transmission module and a wired transmission module.

In some embodiments, the sound processing module includes a controller.

One of the embodiments of the present disclosure provides an information processing method, the method is applied to a sound processing module of any one of the embodiments of the present disclosure. The information processing method comprises: obtaining a sound signal of a smart device collected by a sound collection module; determining a sound analysis result corresponding to the sound signal; and outputting the sound analysis result to a first terminal device through a data transmission module.

In some embodiments, the determining a sound analysis result corresponding to the sound signal comprises: obtaining characteristic information of the sound signal by parsing the sound signal; and determining a sound analysis result matching the characteristic information. The sound analysis result includes a sound processing result, a push manner of the sound processing result, and a push object of the sound processing result.

In some embodiments, the determining a sound analysis result corresponding to the sound signal comprises: sending the sound signal to a second terminal device; and receiving the sound analysis results fed back by the second terminal device after obtaining the sound analysis result corresponding to the sound signal.

In some embodiments, the information processing method further comprises: controlling a target linkage device associated with the smart device to perform a target action corresponding to the smart device.

In some embodiments, the information processing method further comprises: controlling the data transmission module to output the sound analysis result to a third terminal device when the information fed back by the first terminal device is not received through the data transmission module within a preset time period.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
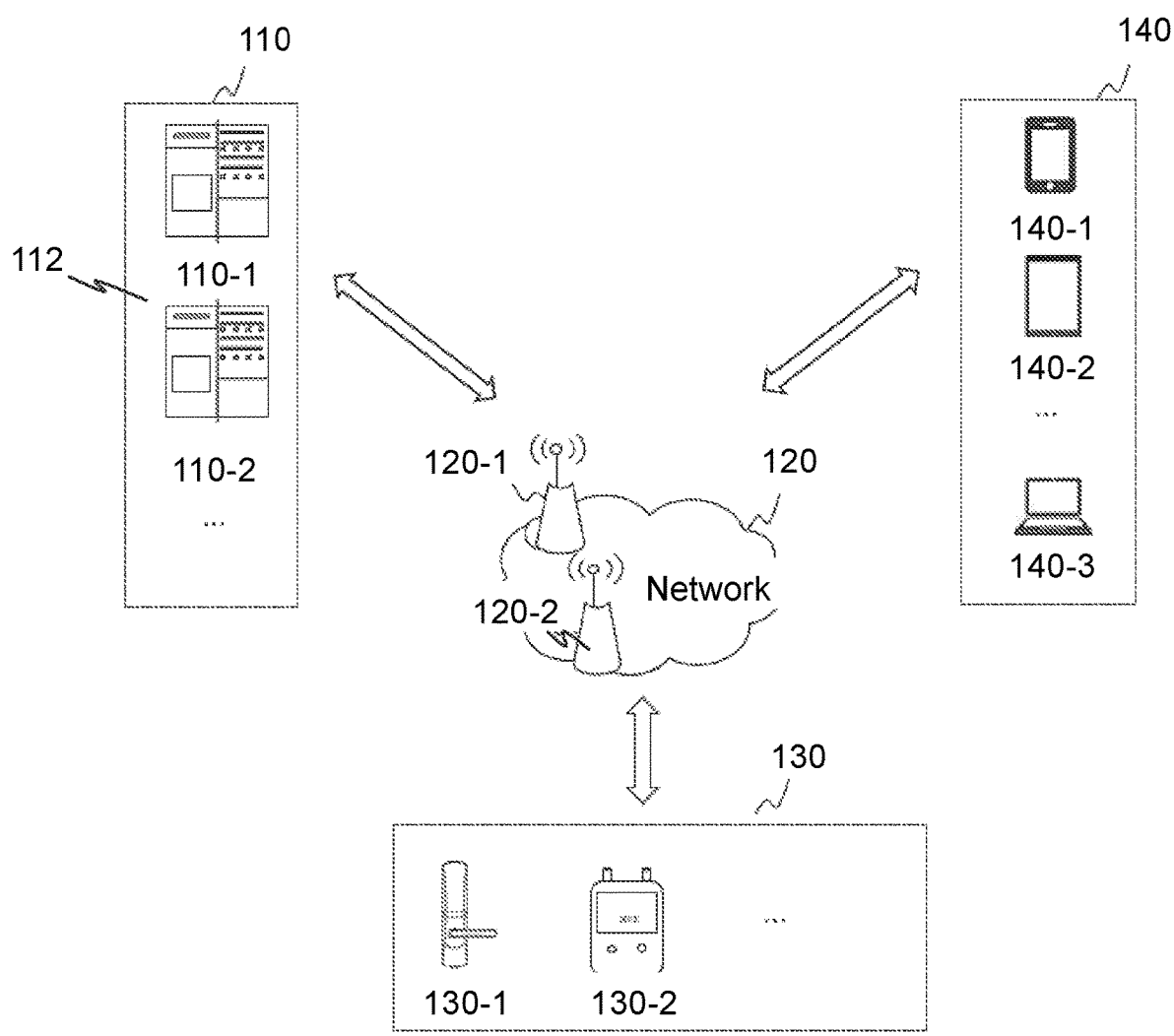
FIG. 1 shows an application scenario diagram of a method and a system for controlling a smart device according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. It should be understood that these exemplary embodiments are given only to enable those skilled in the art to better understand and realize the invention, and not intend to limit the scope of the present disclosure in any way. Unless obviously obtained from the context or the context illustrates otherwise, the same numeral in the drawings refers to the same structure or operation.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment". The term "another embodiment" means "at least one additional embodiment". It should be understood that the terms "data block," "system," "engine," "unit," "component," "module", and/or "block" used herein are one method to distinguish different components, elements, parts, sections, or assemblies of different levels. However, if other words can achieve the same purpose, the words can be replaced by other expressions It should be understood that although the terms "first," "second," "third," etc., may be used herein to describe various elements, these elements should not be limited by these terms. These terms are only used to distinguish one element from another. For example, without departing from the scope of exemplary embodiments of the present disclosure, a first element could be termed a second element, and, similarly, a second element could be termed a first element.

Flowcharts are used in this disclosure to explain the operations performed by the system according to the embodiments of the present disclosure. It should be understood that the previous or subsequent operations are not necessarily performed accurately in order. Instead, the operations may be processed in reverse order or simultaneously. At the same time, other operations can be added into these processes, or one or more operations can be removed from these processes.

The methods and systems for controlling a device involved in the embodiments of the present disclosure may be applied to the management of hardware resources. For example, the system may be applied to the management and control of devices such as a smart home device, a vehicle-mounted device, etc. The smart home device may include but be not limited to a smart lock, a safe-box, a portable cabinet, a gun cabinet, a lockbox, a smart delivery cabinet, a camera, a sensor, a lock, a doorbell, a peephole, an air conditioner, a refrigerator, a curtain, a television, a gas range, a stereo, a window, a lamp, etc. In some embodiments, the system may be applied to the management and control of software resources. For example, the system may be applied to the management and control of software resource systems such as a security system, an access control system, a music, a video, a text, etc. In some embodiments, the system may be applied to the management and control of combined software and hardware resources. For the convenience of description, the following descriptions mainly take the management and control of hardware resources as an example to describe the application of the system of the present disclosure. This is not intended to be limiting, and the system may be applied in other aspects.

FIG. 1 shows an application scenario diagram of a method and a system for controlling a smart device according to some embodiments of the present disclosure.

The control system 100 of a smart device may be applied to the control and management of smart devices such as a smart lock, a smart camera, a smart doorbell, a smart stereo, a smart gas stove, etc., in various production and living areas such as a residential building, an office building, a factory, a school, a hospital, a hotel, a rental house, etc. In some embodiments, the control system 100 of the smart device may also be applied to an on-board system.

For example, the control system 100 may control one or more devices (for example, a first device) in a set to perform a corresponding operation according to a preset rule of the set (for example, a first set). As another example, the control system 100 may verify whether one or more control instructions used by the user to control one or more devices meet a preset condition. The control system 100 may determine whether to control the one or more devices to perform one or more operations corresponding to the one or more control instructions (for example, an armed operation, an anomaly detection, or an alarm operation) based on a verification result, states of the one or more devices, and the one or more control instructions. As further another example, the control system 100 may determine whether an abnormal condition exists according to information (for example, a sound signal, state information, etc.) of the device.

As shown in FIG. 1, the control system 100 may include a server 110, a smart device 130, a user terminal device 140, and a network 120.

The server 110 may acquire and process the associated information of the smart device 130, and process the associated information of the smart device to determine the operation instruction information of the smart device to perform one or more functions described in the present disclosure. The associated information may include smart device information and/or a communication state of the smart device. The smart device information may be understood as device information of the smart device. The smart device information may include component information, power information, operation information, etc., of the smart device. For example, the device information of the smart device may include a working state of the smart device. As another example, the device information of the smart device may include position information of one or more components of the smart device.

The server 110 may perform some functions of the control system 100. Specifically, in some embodiments, the server 110 may receive a management instruction. In some embodiments, the server 110 may perform a corresponding management operation according to the management instruction. For example, the server 110 may be configured to instruct the management or control of a set, a device in the set, a user account associated with the device in the set, etc., according to the management instruction.

In some embodiments, the server 110 may be a single server or a server group (for example, a server group including a server 110-1, a server 110-2, and so on). The server may be centralized or distributed (for example, the server 110 may be a distributed system). In some embodiments, the server 110 may be local or remote. For example, the server 110 may access the smart device 130 and the user terminal device 140 via the network 120. As another example, the server 110 may be directly connected to the smart device 130 and the user terminal device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device (e.g., the computing device 200 in FIG. 2). In some embodiments, the server 110 may be implemented on a mobile device.

In some embodiments, the server 110 may include a processing device 112. As described, the processing device 112 may process at least some functions of the server 110. For example, the processing device 112 may acquire a user instruction (e.g., a management instruction, a control instruction for controlling a device, etc.) and information of a device (e.g., account information corresponding to the device, a state of the device, an action of the device or other components, a sound signal of the device, etc.). As another example, the processing device 112 may determine whether to control the device to perform related operations (e.g., moving, adding, arming, disarming, alarming, turning on/off an anti-lock mode, etc.) based on the user instruction and the information of the device.

In some embodiments, the processing device 112 may include one or more processing engines (e.g., a single-chip processing engine or a multi-chip processor). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may be used for the exchange of information and/or data. One or more components of the control system 100 (e.g., the server 110, the smart device 130, the user terminal device 140) may send information/data to other components via the network 120. For example, the smart device 130 may upload data information such as the working state, component information, etc., of the smart device to the server 110 via the network 120. As another example, the server 110 may issue data information such as a password, an activation code, etc., to the user terminal device 140 via the network 120. In some embodiments, the network 120 may be any one or a combination of a wired network or a wireless network. For example, the network 120 may include a cable network, a wired network, an optical fiber network, a telecommunication network, an intranet, the Internet, a local area network (LAN), a wide area network (WAN), a wireless local area network (WLAN), a metropolitan area network (MAN), a public switched telephone network (PSTN), a general packet radio network (GPRS), a mobile phone network, a Bluetooth network, a ZigBee network, a near-field communication (NFC) network, a narrow band Internet of things NB-IoT/LoRa, or the like, or any combination thereof. In some embodiments, the network 120 may include one or more network access points. For example, the network 120 may include wired or wireless network access points such as base stations and/or internet exchange points 120-1, 120-2 through which one or more components of the control system 100 may be connected to the network 120 to exchange data and/or information.

The smart device 130 may include smart home devices disposed in a house. In some embodiments, the smart device 130 may include, but be not limited to, a smart home device, a vehicle-mounted device, or the like. The smart home device may include a smart lock 130-1, a smart electrical device (e.g., an air conditioner, a refrigerator, a television, a gas range, a stereo, etc.), and a control device 130-2 of the smart electrical device, a safe-box, a portable cabinet, a gun cabinet, a lockbox, a smart delivery cabinet, a smart lighting device, a smart monitoring device (e.g., a smart camera, a camera, a peephole, etc.), a walkie-talkie, a smart sensor (e.g., a gyroscope, an accelerometer, a motion sensor, a positioning system (e.g., a GPS, a Beidou satellite navigation system), a pressure sensor, a light sensor, a temperature sensor, a carbon monoxide detector, a smoke detector, a sound sensor, a fingerprint sensor, an image sensor, an iris sensor, or the like, or any combination thereof), a smart vehicle-mounted device, or the like, or any combination thereof. The smart device 130 may receive and execute an instruction from the server 110 and/or the user terminal device 140. For example, the smart lock may receive an instruction from the server 110 and lock or unlock the smart lock based on the instruction. As another example, the smart lock may receive an instruction from the server 110 and enter an armed state based on the instruction. As further another example, the smart lock may enter a safe mode based on the safe-box, the safe deposit box, etc., entering the armed state, or cancel the safe mode after the security is removed. In some embodiments, the smart device 130 may also transmit its working state information to the server 110. For example, the smart lock 130-1 may transmit state information of a do-not-disturb mode to the server 110. In some embodiments, the smart device 130 may be bound to one or more applications on the user terminal device 140. For example, configuration information (e.g., an identifier, a location, a function, etc.) of the smart device 130 may be stored in the user terminal device 140. The user may control an operation of the smart device 130 via the user terminal device 140.

In some embodiments, the smart device 130 may include a controller. The controller may be configured to obtain a control instruction for controlling the smart device 130 by the user. The controller may verify whether the control instruction meets a preset condition to obtain a verification result, and determine whether to control the smart device 130 to execute an operation corresponding to the control instruction. In some embodiments, the server 110 may act as the controller of the smart device.

In some embodiments, the smart device 130 may also include a storage device for storing data locally. Specifically, when uploading data of the smart device to the server fails, the smart device may store the data to be uploaded to the server locally, and the data stored locally may be uploaded to the server again when a data transmission communication between the smart device and the server is good.

The user terminal device 140 may include user terminal devices of all relevant users of a house where the smart device 130 is installed. Specifically, the relevant users may include an administrator of the house, for example, a merchant who rents the house. The relevant users may also include a user of the house, for example, a tenant who rents the house. The relevant users may also include an owner of the house. The relevant users may also include a cleaning staff, a property management staff, etc., of the house. The user terminal device may include but be not limited to a user terminal device of any of the above-mentioned persons. For example, the user terminal device 140 may be a user terminal device of a hotel manager, a user terminal device of a hotel occupant, a user terminal device of a landlord who rents the house, or a user terminal device of a tenant who rents the house. The user terminal device 140 may receive information or data sent by the server 110 and the smart device 130 via the network 120. For example, the user terminal device 140 may receive a doorbell reminder message sent by the server 110. As another example, the user terminal device 140 may receive an alarm for an abnormal condition sent by the smart device 130.

In some embodiments, different user terminal devices may receive different information. For example, the server 110 may only send information to the user terminal device of the landlord of the rental house according to a predetermined rule, or to the user terminal device of the tenant of the rental house, or to all user terminal devices associated with the smart device at the same time. As another example, the server 110 may send information to one or more of the landlords, the administrator, the user of the device, etc., according to a predetermined rule. As further another example, the server 110 may send information to one or more of a vehicle owner, a contact person set by the vehicle owner, an actual user of the vehicle, etc., according to a predetermined rule. The user terminal device 140 may be configured to display record data of the control system 100 of the smart device, the working state of the smart device 130, an unlock record, an abnormal condition, and other related information.

The user terminal device 140 may further be configured to operate the smart device 130 directly or through the server, and receive an operation result fed back by the server 110 or the smart device 130 in the control system 100. For example, the user may remotely control to lock the smart lock through the user terminal device and display a lock result on the user terminal device. In some embodiments, the user terminal device 140 may include, but be not limited to, a smart phone 140-1, a tablet computer 140-2, a laptop computer 140-3, a desktop computer, a personal digital assistant (PDA), a handheld game console, smart glasses, a smart watch, a wearable device, a virtual display device, an enhancement display device, or the like, or any combination thereof.

In some embodiments, a storage device may be set in each of the server 110, the smart device 130, and the user terminal device 140 respectively, or an independent storage device may be separately provided in the control system 100 for storing data and/or instructions. In some embodiments, the storage device may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, one or more components in the control system 100 may be set separately. For example, for the management of a smart home device, the smart home device is at home, and the management may be completed on a mobile phone of the user. For example, the mobile phone may directly communicate with the smart home device via a LAN, a Bluetooth™ network, a ZigBee™ network, a near-field communication (NFC) network, etc., to control the smart home device. At the same time, a server (e.g., the server 110) may synchronously update information related to the smart home device (e.g., configuration information, etc.). As another example, the server may connect with the smart home device to obtain the information related to the smart home device and transmit the information related to the smart home device to a mobile phone. The mobile phone may send a management instruction to the server based on the information related to the smart home device obtained from the server. The server may control the smart home device based on the management instruction sent by the mobile phone. In some embodiments, the control system 100 may be implemented on a terminal device as a whole. For example, for the management of a file resource, the files to be managed may be all in the mobile phone, and the management may be also completed on the mobile phone of the user. In some embodiments, the control system 100 may include a central control system and one or more subsystems. For example, the central control system may be set in the server 110, and the one or more subsystems may include processing devices set locally (such as in a house, an office building, a car, etc.). The one or more subsystems may control part of devices within a certain range (such as devices in a house, devices in an office building, devices in a car, etc.). The central control system may control the one or more subsystems. In some embodiments, the central control system may also directly control the devices through the one or more subsystems.

Figure 2:
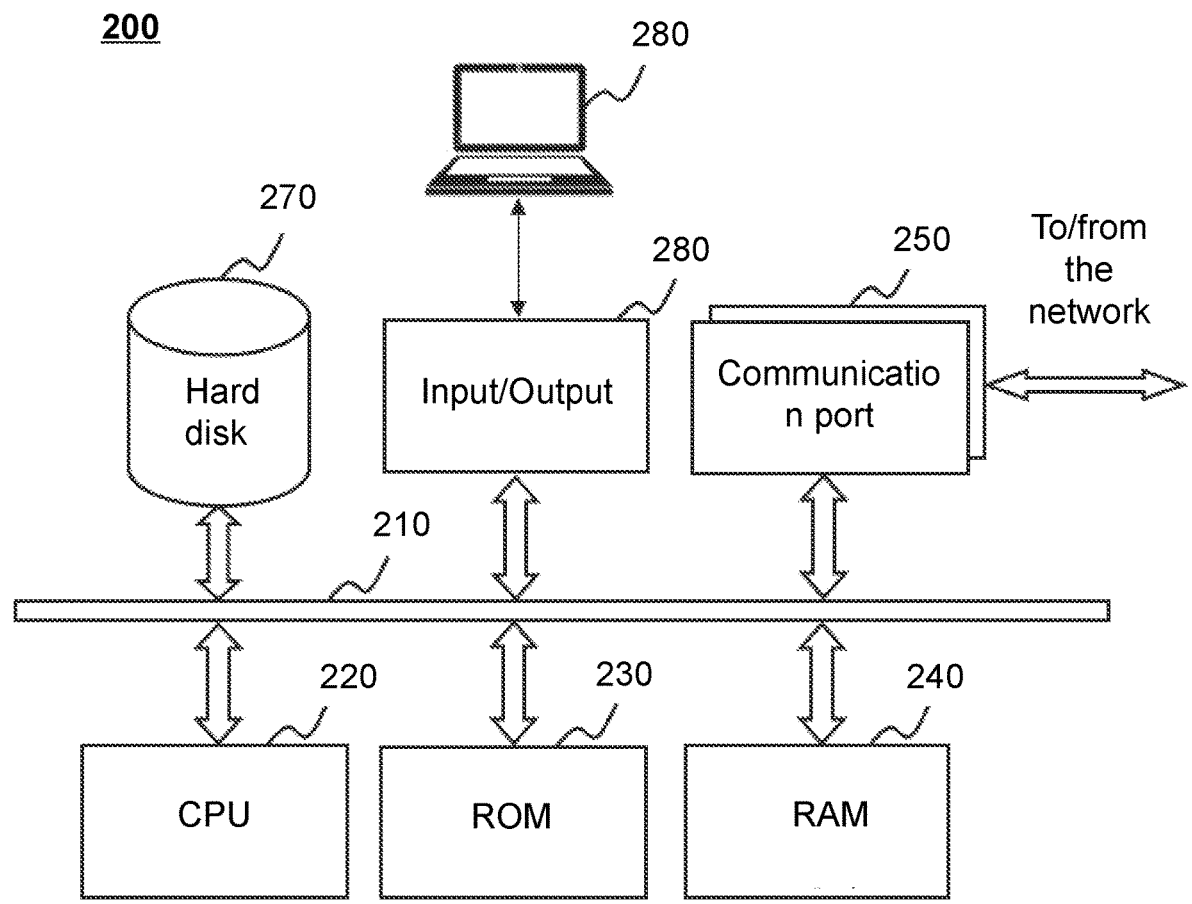
FIG. 2 is a block diagram of an exemplary computing device implementing a certain system according to some embodiments of the present disclosure.

FIG. 2 is a block diagram of an exemplary computing device (e.g., the server 110, the server 1620, the server 1920, the server 2520, the server 2740, etc.) that implements a particular system according to some embodiments of the present disclosure. The particular system may use a functional block diagram to interpret a hardware platform comprising one or more user interfaces. The computing device may be a computing device with general or specific functions. The computing device may be configured to implement any particular system according to some embodiments of the present disclosure. The computing device 200 may be configured to implement any component that provides information required for device management disclosed in the present disclosure. For example, the server 110 may be implemented by hardware devices, software programs, firmware, or any combination thereof, of a computing device such as the computing device 200. Merely by way of example, the computing device 200 for implementing the server 110 may manage one or more devices based on a received device management instruction sent by the user. As another example, the computing device 200 may determine whether a preset scene (e.g., an abnormal situation) occurs by analyzing a sound signal and an image. For simplicity, FIG. 2 depicts only one computing device. In some embodiments, the functions of the computing device performing device control and management may be implemented by a group of similar platforms in a distributed mode to distribute the processing load of the system.

The computing device 200 may include a communication terminal device 250 connected to a network that may realize data communication. The computing device 200 may also include a CPU 220 configured to execute instructions and include one or more processors. An exemplary computer platform may include an internal communication bus 210, different types of program storage units, and data storage units (e.g., the hard disk 270, the read-only memory (ROM) 230, the random access memory (RAM) 240), various data files suitable for computer processing and/or communication, and some program instructions that may be executed by the CPU. The computing device 200 may also include an input/output device 260 that may support the input and output of data streams between a computer and other components (e.g., the user interface 280). In some embodiments, the input/output device 260 may enable a user to interact with the server 110. In some embodiments, the input/output device 260 may include an input device and an output device. Exemplary input devices may include a keyboard, a mouse, a touch screen, a microphone, a trackball, or the like, or a combination thereof. Exemplary output devices may include a display device, a speaker, a printer, a projector, or the like, or a combination thereof. Exemplary display devices may include a liquid crystal display (LCD), a light emitting diode (LED) based display, a flat panel display, a curved screen, a television device, a cathode ray tube (CRT), or the like, or a combination thereof.

In some embodiments, the input/output device 260 may sense character instructions, voice instructions, gesture instructions, and/or biological information (such as facial images, voice prints, fingerprints, etc.), or the like, or any combination thereof, input by the user. In some embodiments, the user of the server 110 (for example, an operator) may input a content of the device management instruction via the input/output device 260, such as a request for sharing, moving, deleting, controlling, managing, etc., of the device. In some embodiments, the user of the server 110 (for example, the operator) may determine whether the user providing the management instruction has the authority to manage the device based on the information input via input/output device 260. The input information may include a password (for example, a character password), biological information (such as a facial image, voice prints included in a voice instruction, a fingerprint, etc.), etc. The input/output device 260 may also display a set, a device in the set, a user account associated with the device in the set, information of the device, conditions detected by the device (for example, images captured by an image acquisition device, an abnormal condition detected by the device), alarm information of the device, and so on.

Figure 3:
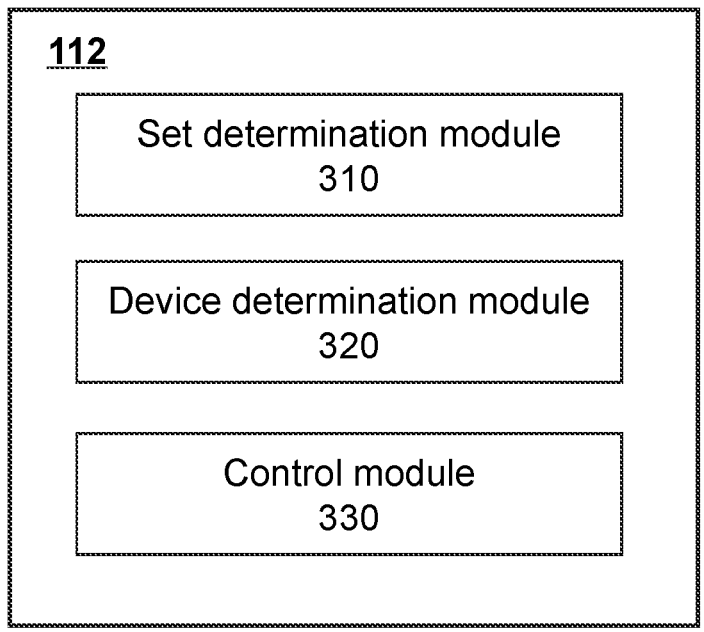
FIG. 3 is a schematic diagram of an exemplary hardware and/or software of a smart lock control system according to some embodiments of the present disclosure.

FIG. 3 is a schematic diagram of an exemplary hardware and/or software of a smart lock control system according to some embodiments of the present disclosure. As shown in FIG. 3, the smart lock control system 300 may include a set determination module 310, a device determination module 320, and a control module 330.

In some embodiments, the set determination module 310 may be configured to determine one or more sets. The one or more sets may include one or more preset rules each of which corresponds to a set of the one or more sets. The preset rule may refer to a working mode of the set. For example, the preset rule may include a safe mode, a going out mode, a party mode, a sleep mode, a reading mode, a do-not-disturb mode, a night mode, a warm mode, an armed mode, a specific user control mode, a user self-setting mode, or the like, or any combination thereof. In some embodiments, the safe mode may include a mode in which measures such as anti-theft, monitoring, etc., are taken to protect the personal and property security of users or others in a specific scenario. The going out mode may include a mode in which all or part of the devices and/or components enter a standby or power-off state in a certain scenario where the user is absent for a certain period of time. The party mode may include a mode that controls states of all or part of the devices to support a party scene in a specific scenario. The sleep mode may include a mode that the user prohibits others from visiting when sleeping at night (or at other times), so that all or part of the devices and/or components enter a specific state (such as a power-off state, a sleep state, a standby state, an armed state, etc.). The reading mode may include a mode in which all or part of the devices and/or components are controlled to create an atmosphere suitable for reading (for example, turning on an aromatherapy, softening lighting, etc.) in a specific scenario. The do-not-disturb mode may include a mode in which all or part of the devices and/or components are controlled to enter a mute state when the user does not want to be disturbed by others and/or notifications during a certain period of time. The night mode may include a mode in which all or part of the devices and/or components are controlled to facilitate needs (for example, turning on a light in a toilet at night, starting a low beam or high beam light of a vehicle at night) of the user at night during a night time period. The warm mode may include a mode in which all or part of the devices and/or components are controlled to create a warm atmosphere (for example, starting a music player to play a warm music, softening lighting, etc.) in a specific scenario. The armed mode may include a mode in which the user controls all or part of the devices and/or components to monitor an occurrence of an abnormal condition and give an immediate alarm to protect their own life and property safety in a specific scenario. The specific user control mode may include a mode in which the user allows others to use and/or control all or part of the devices and/or components under a specific scenario by setting permissions. The user self-setting mode may include a mode that the user customizes to control the state of all or part of the devices and/or components according to their needs.

In some embodiments, the device determination module 320 may include a first device into a first set of the one or more sets based on information of the first device. The information of the first device may include a quantity, a name, a type, a position, a connection manner, a code, a device ID, a bound account, etc., of the first device or a combination thereof. In some embodiments, the first device may be a device manually included by the user, a device determined by the processing device 112 according to the preset rule of the first set, or a device selected by the user from devices recommended by the processing device 112 or recorded historical devices. In some embodiments, the first device may be a device that is moved and/or shared from other terminal devices.

In some embodiments, the control module 330 may be configured to control the first devices in the first set to perform a corresponding operation according to a preset rule corresponding to the first set. In some embodiments, the control module 330 may determine configuration information of the first device in the first set according to the preset rule corresponding to the first set. The configuration information of the first device may include a working mode, a volume, a sound effect, a brightness, a frequency, etc., of the first device or a combination thereof. The control module 330 may control the first device to perform the corresponding operation according to the configuration information of the first device.

It should be noted that the above descriptions of the smart lock control system 300 and its modules are merely for the convenience of description and cannot limit the present disclosure to the scope of the embodiments. It should be understood that for those skilled in the art, after understanding the principle of the system, the may arbitrarily combine various modules or form a subsystem to connect with other modules without departing from this principle. For example, the set determination module 310, the device determination module 320, and the control module 330 in FIG. 3 may be different modules in a system, or a single module that may realize functions of two or more of the above-mentioned modules. For example, the set determination module 310 and the device determination module 320 may be two modules, or one module that have both the set determination function and the device determination function. As another example, the modules may share a storage module, or each module may have its own storage module. Such deformation is within the protection scope of the present disclosure.

Figure 4:
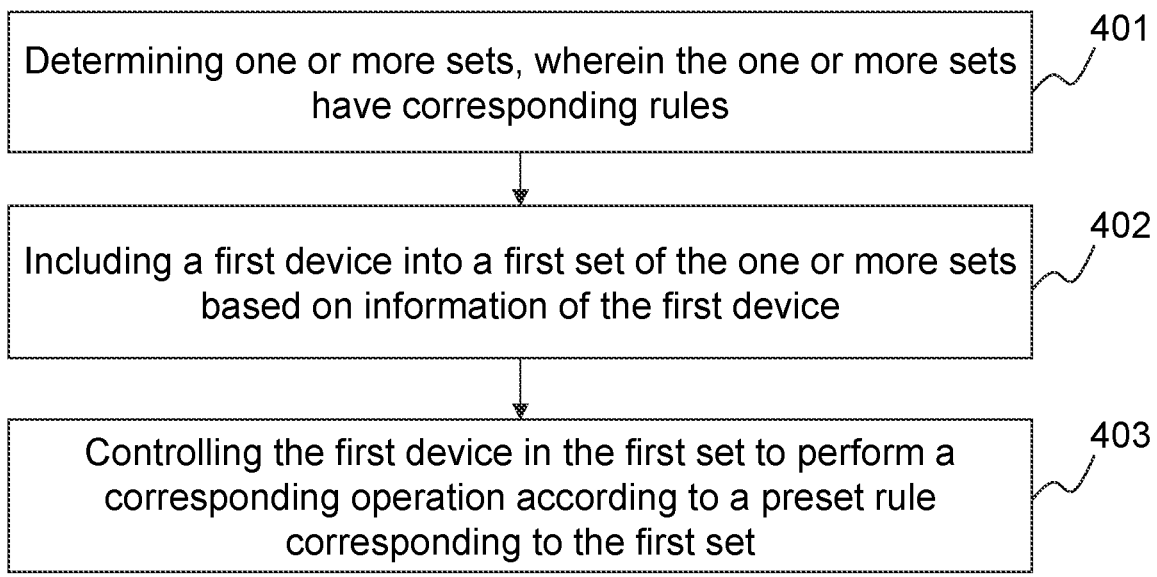
FIG. 4 is a flowchart illustrating an exemplary process for controlling a device according to some embodiments of the present disclosure.

FIG. 4 is a flowchart illustrating an exemplary process for controlling a device according to some embodiments of the present disclosure. In some embodiments, the process 400 may be executed by a processing logic, which may include hardware (for example, a circuit, a dedicated logic, a programmable logic, a microcode, etc.), software (instructions running on a processing device to execute hardware simulation), or the like, or any combination thereof. One or more operations illustrated in FIG. 4 for creating a set may be implemented by the device control system 100 in FIG. 1. For example, the process 400 may be stored in a storage device in a form of instructions, which are retrieved and/or executed by the processing device 112.

In 401, the processing device 112 may determine one or more sets. In some embodiments, operation 401 may be performed by the set determination module 310 of the system 300.

The set may refer to a device set including one or more devices and be created on a user terminal device (e.g., the user terminal device 140). In some embodiments, the set may include various forms, such as a "house" for accommodating one or more devices in the house, a "vehicle" for accommodating on-board devices, a "workshop" for accommodating one or more devices, and so on. In some embodiments, the set may also include an "area" for accommodating vehicles, a "community" for accommodating residential quarters, a "folder" for accommodating files, or the like. Merely by way of example, the one or more sets may include a set "master bedroom" corresponding to a master bedroom in a house of the user, a set "secondary bedroom" corresponding to a secondary bedroom in the house of the user, and a set "children's room" corresponding to a children's room in the house of the user.

In some embodiments, the processing device 112 may determine one or more sets based on an instruction input by the user via the user terminal device. For more descriptions regarding the set determination, please refer to FIG. 6 and the related descriptions.

In some embodiments, each of the one or more sets may have a corresponding preset rule. The preset rule may refer to a working mode of the set. For example, the preset rule may include a safe mode, a going out mode, a party mode, a sleep mode, a reading mode, a do-not-disturb mode, a night mode, a warm mode, an armed mode, a specific user control mode, a user self-setting mode, or the like, or any combination thereof. In some embodiments, the preset rules corresponding to the one or more sets may be manually determined by the user, automatically determined by the processing device 112, or semi-automatically determined by the processing device 112. For example, the user may input a name, a working time, a working mode, etc., or a combination thereof, of each set of the one or more sets by the user terminal device 140. As another example, the processing device 112 may recommend the one or more sets to the user. The user may select the set to be determined from the sets recommended by the processing device 112.

In 402, the processing device 112 may include a first device into a first set of the one or more sets based on information of the first device. In some embodiments, operation 402 may be performed by the device determination module 320 in the system 300.

The information of the first device may include a quantity, a name, a type, a position, a connection manner, a code, a device ID, a bound account, etc., of the first device or a combination thereof. In some embodiments, the processing device 112 may communicate with the first device directly or through a network (e.g., the network 120) to obtain the information of the first device. In some embodiments, the user may input the information of the first device by the user terminal device and send the information of the first device to the processing device 112. In some embodiments, the information of the first device (for example, the quantity, the type, etc.) may be determined according to a specific situation.

In some embodiments, the first device may be a device manually included by the user, a device determined by the processing device 112 according to the preset rule of the first set, or a device selected by the user from the devices recommended by the processing device 112 or recorded historical devices. In some embodiments, the first device may be a device that is moved and/or shared from other terminal devices. More descriptions for moving and sharing a device may be found elsewhere in the present disclosure (e.g., FIG. 9 and FIG. 11 and the descriptions thereof).

In some embodiments, the processing device 112 may include the first device into the first set based on the information of the first device. For example, the first set may be the "master bedroom". Merely by way of example, the processing device 112 may include the first device in the master bedroom (e.g., a television in the master bedroom, an air conditioner in the master bedroom, a curtain in the master bedroom, a lamp in the master bedroom, a door lock in the master bedroom, or a combination thereof) into the first set based on position information of the first device. More descriptions for including a device may be found elsewhere in the present disclosure (e.g., FIG. 7 and the descriptions thereof).

In 403, the processing device 112 may control the first device in the first set to perform a corresponding operation according to a preset rule corresponding to the first set. In some embodiments, operation 403 may be performed by the control module 330 in the system 300.

In some embodiments, the processing device 112 and/or the user may determine the configuration information of the first device in the first set according to the preset rule corresponding to the first set. The configuration information of the first device may include a working mode, a volume, a sound effect, a brightness, a frequency, etc., of the first device or a combination thereof. For example, when the first set is the living room, the first device may be a stereo in the living room, a lighting in the living room, a projector in the living room, etc. The preset rule corresponding to the first set may include a home theater mode. The processing device 112 may control the stereo of the living room to select a stereo sound effect, control a projector of the living room to select a movie playing mode, and control a brightness of the lighting of the living room to be relatively low according to the home theater mode of the living room. In some embodiments, the processing device 112 may control the first device in the first set to perform the corresponding operation according to the preset rule corresponding to the first set. For example, the processing device 112 may control the stereo of the living room to play sounds with the stereo sound effect, control the projector of the living room to play a movie, and control the lighting of the living room to illuminate with a relatively low brightness.

In some embodiments, an account may be bound with a plurality of devices (for example, a smart bulb, a smart router, an air purifier, a camera, etc.), acquire control authorities of the plurality of devices through account authorization, and control and/or manage each device in the plurality of devices as needed. Such a device control method may result in that the plurality of devices included in the account may not form a whole, and it is impossible to set modes of the devices based on various scenarios. The device control method and system provided in the present disclosure may integrate the plurality of devices included in the account into a whole, and may set the modes of the devices in each whole based on various scenarios.

It should be noted that the above description is merely for the convenience of description and does not intend to limit the present disclosure to the scope of the embodiments. It may be understood that for those skilled in the art, after understanding the principle of the system, they may make various modifications and changes to the above methods and systems in form and detail without departing from the principle. For example, the process 400 may also include receiving a management instruction and performing a corresponding management operation according to the management instruction. The management instruction may be configured to instruct to manage a set, a device in the set, or a user account associated with the device in the set, or a combination thereof. Specifically, the management of the set may include deleting the created set, modifying a scene rule corresponding to the created set, and modifying a set identifier of the created set. The management of devices in a set may include deleting a device from the corresponding set, and moving a device from the corresponding set to any other set. The management of user accounts associated with the devices in a set may include deleting one or more user accounts associated with devices in the set. A user account associated with a device in the set may be understood as if the device binds to the user account, the user account may be a user account associated with the device.

It should also be noted that in this embodiment, the process of receiving the management instruction and performing the corresponding management operation according to the management instruction, the process of receiving a device including instruction and including a device into a specified set, and the process of receiving a set creation instruction, creating a set according to the set creation instruction, and configuring the corresponding scene rule for the set are not implemented in an order of execution. It may also be understood that these three processes may be parallel and independent processes. More descriptions for set and/or device management may be found elsewhere in the present disclosure (e.g., FIGS. 6-12 and the descriptions thereof).

The embodiments of the present disclosure may group resources in the user account, adjust the resources based on changes of preset rules in the group, and perform management operations such as adding, deleting, sharing, moving, etc., on the resources, so as to manage the resources across accounts, across groups, and across preset rules. The resources may include different types of household devices such as a smart lock, a smart curtain, a smart electrical device (such as an air conditioner, a refrigerator, a television, a gas stove, a stereo, etc.), a control device of the smart electrical device, a safe-box, a portable cabinet, a gun cabinet, a lockbox, a smart delivery cabinet, a smart lighting device, a smart monitoring device (e.g., a smart camera, a camera, a peephole, etc.), a walkie-talkie, a smart sensor (e.g., a gyroscope, an accelerometer, a motion sensor, a positioning system (e.g., a GPS, a Beidou satellite navigation system), a pressure sensor, a light sensor, a temperature sensor, a carbon monoxide detector, a smoke detector, a sound sensor, a fingerprint sensor, an image sensor, an iris sensor, or the like, or any combination thereof). The resources may also include an on-board device such as a smart seat, a smart driving recorder, a smart navigator, etc. The resources may also include file resources such as various music, video, text, etc. The grouping may be flexibly performed according to an actual situation. For example, the household devices may be grouped by houses, on-board devices may be grouped by vehicles, and file resources may be grouped by folders. The preset rule may be a rule applicable to a scene such as a party, sleeping, overtaking, parking, etc. The preset rule may also be a rule for managing file resources. For example, music may only be placed in a music folder.

Figure 5A:
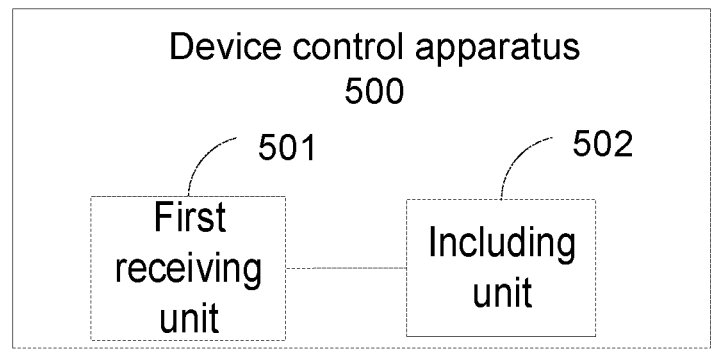
FIG. 5A is a schematic diagram of a device control apparatus according to some embodiments of the present disclosure.

FIG. 5A is a schematic diagram of a device control apparatus according to some embodiments of the present disclosure. In some embodiments, the apparatus 500 may be applied to a first terminal device (e.g., the user terminal device 140).

As shown in FIG. 5A, the apparatus 500 may include a first receiving unit 501 and an including unit 502. The first receiving unit 501 may be configured to receive a device including instruction for including a device to be included into a specified set (e.g., a new set). In some embodiments, the device to be included may include one or more devices bound to the user account corresponding to the first terminal device. In some embodiments, the specified set may be configured with a corresponding scene rule. The including unit 502 may be configured to include the device to be included into the specified set according to the device including instruction. The device included in the specified set may be controlled by the first terminal device according to a scene rule corresponding to the specified set. More descriptions for the operating processes of the first receiving unit 501 and the including unit 502 may be found elsewhere in the present disclosure (e.g., FIG. 7 and the descriptions thereof).

The first receiving unit 501 of the apparatus 500 may receive the device including instruction for including the device to be included into the specified set. In addition, the including unit 502 may be configured to include the device to be included into the specified set according to the device including instruction, so that one or more devices included into the account may be formed into a whole, and a mode of each device of each whole may be set based on various scenarios.

Figure 5B:
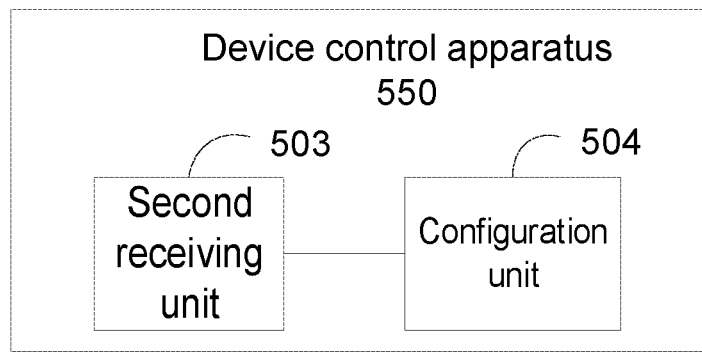
FIG. 5B is a schematic diagram of a device control apparatus according to some embodiments of the present disclosure.

FIG. 5B is a schematic diagram of a device control apparatus according to some embodiments of the present disclosure.

As shown in FIG. 5B, the apparatus 550 may include a second receiving unit 503 and a configuration unit 504. The second receiving unit 503 may be configured to receive a set creation instruction. The configuration unit 504 may be configured to create at least one set according to the set creation instruction, and configure a corresponding scene rule for the at least one set. The at least one set may include a specified set. More descriptions for the operating processes of the second receiving unit 503 and the configuration unit 504 may be found elsewhere in the present disclosure (e.g., FIG. 6 and the descriptions thereof).

Figure 5C:
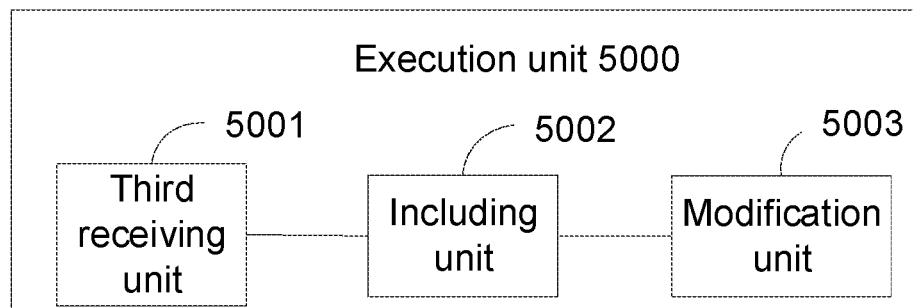
FIG. 5C is a schematic diagram of an execution unit of a device control apparatus according to some embodiments of the present disclosure.

FIG. 5C is a schematic diagram of an execution unit of a device control apparatus according to some embodiments of the present disclosure.

In some embodiments, the device control apparatus may include an execution unit 5000. The execution unit 5000 may be configured to receive a management instruction and execute a corresponding management operation according to the management instruction. In some embodiments, the management instruction may be used to indicate the management of a set, a device in the set, a user account associated with the device in the set, or the like, or a combination thereof.

As shown in FIG. 5C, the execution unit 5000 may include a third receiving unit 5001, an including unit 5002, and a modification unit 5003. The third receiving unit 5001 may be configured to receive a moving instruction for moving a device in the set (e.g., a house). In some embodiments, the moving instruction may carry an identifier of the first set (that is, a set where the device to be moved is located before moving, which may also be referred to as an original set) and an identifier of the new set (i.e., the set where the device to be moved is located after moving, which may also be referred to as a target set) of the device to be moved (for example, one or more devices in the first device). The including unit 5002 may be configured to delete the device to be moved in the set corresponding to the identifier of the first set and include the device to be moved into the set corresponding to an identifier of the target set. The modification unit 5003 may be configured to modify configuration information of the device to be moved, configuration information of the first set, configuration information of the new set, etc., or a combination thereof, so as to match the current configuration information of the device to be moved with a scene rule of the new set. For detailed descriptions of the operating processes of the third receiving unit 5001, the including unit 5002, and the modification unit 5003, please refer to FIG. 9 and the descriptions thereof.

Figure 5D:
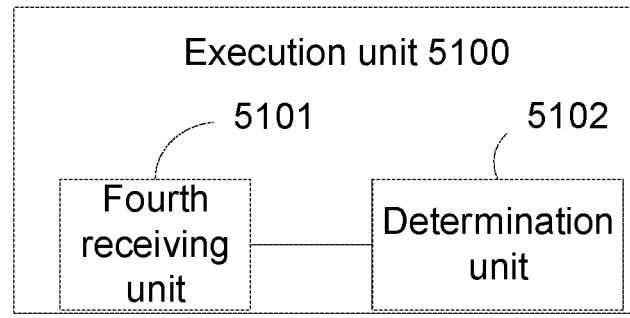
FIG. 5D is a schematic diagram of an execution unit of a device control apparatus according to some embodiments of the present disclosure.

FIG. 5D is a schematic diagram of an execution unit of a device control apparatus according to some embodiments of the present disclosure.

As shown in FIG. 5D, the execution unit 5100 may include a fourth receiving unit 5101 and a determination unit 5102. The execution unit 5100 may receive a management instruction and perform a corresponding management operation according to the management instruction. Specifically, the fourth receiving unit 5101 may receive a first device deletion instruction for deleting the device to be deleted from the corresponding set. In some embodiments, the first device deletion instruction may be sent by a first target user account. The first target user account may have a relatively high control authority over the device to be deleted, for example, a highest control authority. The determination unit 5102 may be configured to determine a set to which the device to be deleted belongs according to the first device deletion instruction, and delete the device to be deleted from the set to which the device to be deleted belongs. For detailed descriptions of the operating processes of the fourth receiving unit 5101 and the determining unit 5102, please refer to FIG. 10 and the descriptions thereof.

In some embodiments, the device control apparatus may further include a first transmission unit. The first transmission unit may be used to send a second device deletion instruction to a second terminal device for deleting the device to be deleted, so that the second terminal device may delete the device to be deleted from the set to which the device to be deleted belongs according to the second device deletion instruction.

Figure 5E:
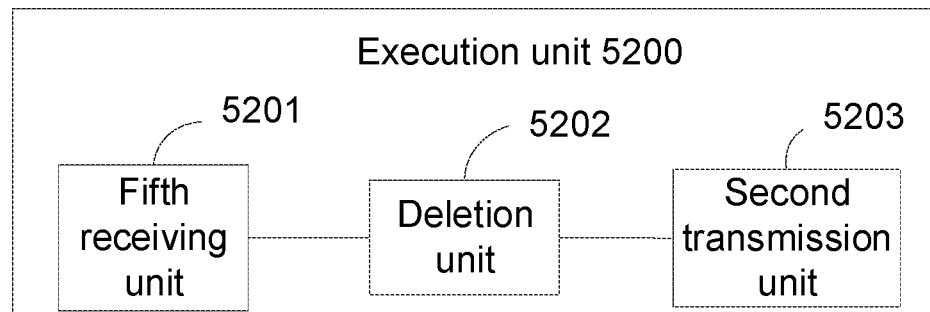
FIG. 5E is a schematic diagram of an execution unit of a device control apparatus according to some embodiments of the present disclosure.

FIG. 5E is a schematic diagram of an execution unit of a device control apparatus according to some embodiments of the present disclosure.

As shown in FIG. 5E, the execution unit 5200 may include a fifth receiving unit 5201, a deletion unit 5202, and a second transmitting unit 5203. The fifth receiving unit 5201 may be configured to receive a user account deletion instruction for deleting a second target user account. In some embodiments, the second target user account may be associated with the first device included in the set. In some embodiments, a control authority of the second target user account over the first device may be lower than a control authority of the first target user account. The deletion unit 5202 may be configured to delete the second target user account from user accounts associated with the first device according to the user account deletion instruction. The second transmission unit 5203 may be configured to send a control authority deletion instruction to the processing device 112. In some embodiments, the control authority deletion instruction may be configured to control the processing device 112 to delete the control authority of the second target user account over the first device. For detailed descriptions of the operating processes of the fifth receiving unit 5201, the deletion unit 5202, and the second transmitting unit 5203, please refer to FIG. 12 and the descriptions thereof.

Figure 5F:
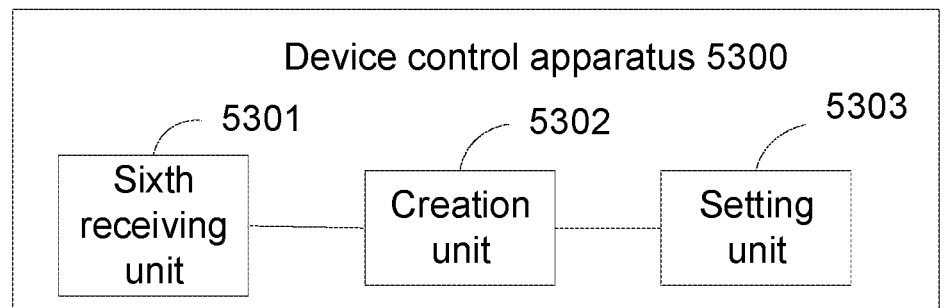
FIG. 5F is a schematic diagram of a device control apparatus according to some embodiments of the present disclosure.

FIG. 5F is a schematic diagram of a device control apparatus according to some embodiments of the present disclosure.

As shown in FIG. 5F, the apparatus 5300 may include a sixth receiving unit 5301, a creation unit 5302, and a setting unit 5303. The sixth receiving unit 5301 may be configured to receive a sharing request for sharing a device sent by a user terminal device (e.g., the second user terminal device). The sharing request may carry an identifier of the shared device, a set identifier and configuration information of a first set corresponding to the shared device, setting information of an original user account corresponding to the shared device, or the like, or a combination thereof. The creation unit 5302 may be configured to create a new set with the set identifier of the first set corresponding to the shared device as a set identifier. In some embodiments, the creation unit 5302 may determine the configuration information of the first set corresponding to the shared device as configuration information of the new set. The setting unit 5303 may be configured to include the shared device into the new set and set the control authority of the shared device so that the control authority of the shared device meets a requirement of the setting information of the original user account corresponding to the shared device. For detailed descriptions of the operating processes of the sixth receiving unit 5301, the creation unit 5302, and the setting unit 5303, please refer to FIG. 11 and the descriptions thereof.

It should be noted that the above descriptions of the device control apparatuses, modules, and units are merely for the convenience of description and cannot limit the present disclosure to the scope of the embodiments. It should be understood that for those skilled in the art, after understanding the principle of the system, they may arbitrarily combine various modules or form a subsystem to connect with other modules without departing from this principle. For example, the first receiving unit 501, the second receiving unit 503, the third receiving unit 5001, the fourth receiving unit 5101, the fifth receiving unit 5201, and the sixth receiving unit 5301 in FIG. 5A to FIG. 5F may be different modules in a system, or a single module that may realize functions of two or more of the above-mentioned modules. As another example, the including unit 502, the including unit 5002, the determining unit 5102, and the deleting unit 5202 may be different modules in a system, or a single module that may realize functions of two or more of the above-mentioned modules. As further an example, the configuration unit 504, the configuration unit 5302, and the setting unit 5303 may be different modules in a system, or a single module that may realize functions of two or more of the above-mentioned modules. As further another example, the modules may share a storage module, or each module may have its own storage module. Such deformation is within the protection scope of the present disclosure.

Figure 6:
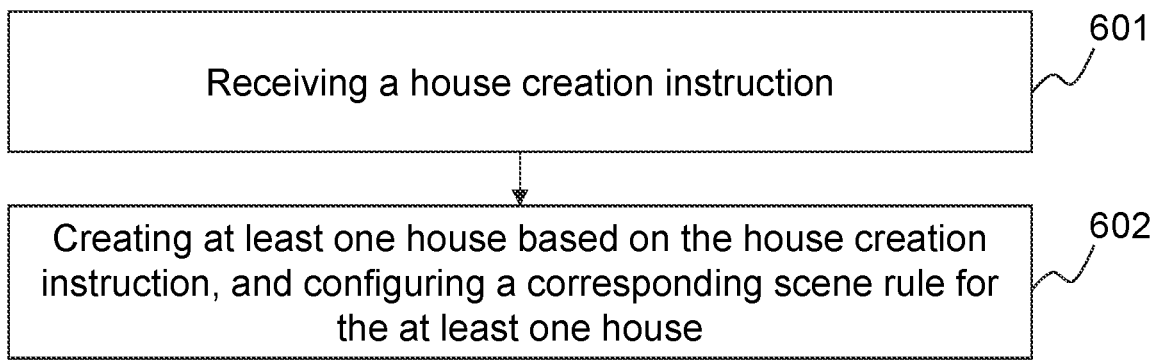
FIG. 6 is a flowchart illustrating an exemplary process for creating a set according to some embodiments of the present disclosure.

FIG. 6 is a flowchart illustrating an exemplary process for creating a set according to some embodiments of the present disclosure. In some embodiments, the process 600 may be an exemplary embodiment of the operation 401 in the process 400.

In some embodiments, the process 600 may be executed by a processing logic, the processing logic may include hardware (e.g., a circuit, a dedicated logic, a programmable logic, a microcode, etc.), software (instructions running on a processing device to execute hardware simulation), or the like, or any combination thereof. One or more operations illustrated in FIG. 6 for creating a set may be implemented by the device control system 100 shown in FIG. 1. For example, the process 600 may be stored in a storage device in a form of instructions, which are retrieved and/or executed by the processing device 112. In some embodiments, the process 600 may be executed before receiving a device including instruction for including a device to be included into a specified set. For example, the process 600 may be executed before receiving the device including instruction (e.g., the process 700 in FIG. 7) for including a smart home device into a house. As another example, the process 600 may be executed before receiving the device including instruction to include an on-board device into a vehicle. For the convenience of description, the creation of a house is taken as an example to illustrate the creation process of the set.

In 601, the processing device 112 may receive a house creation instruction. In some embodiments, operation 601 may be performed by the second receiving unit 503.

In some embodiments, a user may log in to a server using a user account at the first terminal device and create at least one house. In some embodiments, the user may create the house according to an actual situation of the user. For example, if the user has two houses, the user may create two houses in the server, which is not limited here. Specifically, when the user creates the house using the first terminal device, he/she may also select a preset room type stored in the first terminal device in advance. If there is no room type among the preset room types stored in the first terminal device, he/she may add or draw his/her own room type.

In 602, at least one house may be created based on the house creation instruction, and a corresponding scene rule may be configured for the at least one house. The house scene rule (also known as a preset rule) may be understood as a working mode of the house determined based on information such as a house name, an application scenario, a type, a location, a usage time, etc.

In some embodiments, in a process of building the house by the first terminal device, the scene rule of the house may need to be configured. The scene rule may indicate the working mode of the house. Each device in the house may need to work according to the working mode of the house. It should be understood that a relationship between the scene rule and the house may be preset, that is, the first terminal device may create the house, and the scene rule of the house may be automatically configured. Of course, the scene rule of the created house may be modified by the user through the first terminal device. In some embodiments, different houses may have the same or different scene rules. For example, a first house and a second house may be both bedrooms. A scene rule of the first house may be in a reading mode, and a scene rule of the second house may be in a sleep mode.

Figure 8:
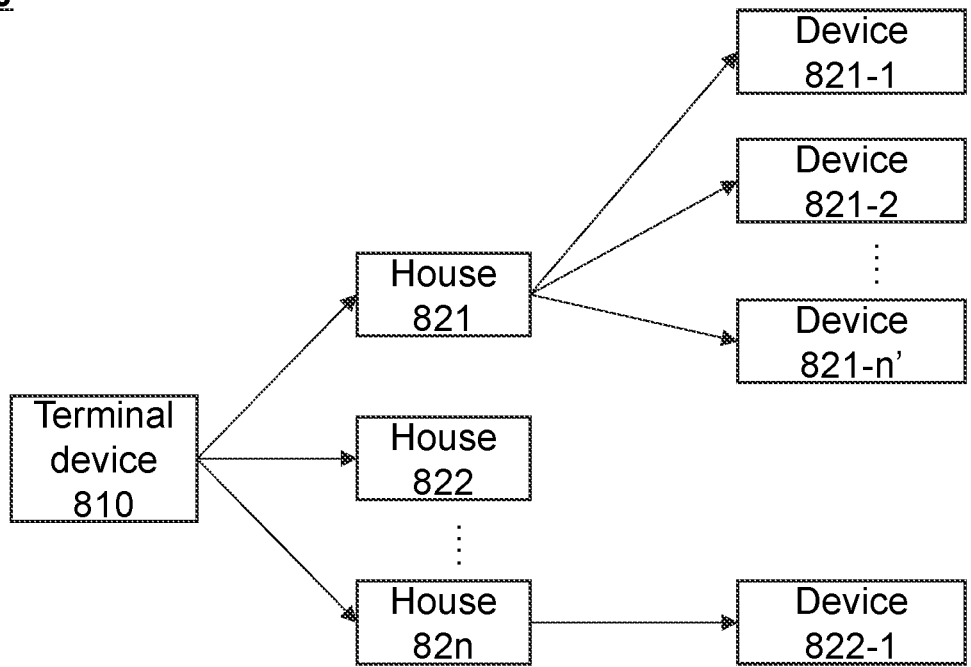
FIG. 8 is a schematic diagram illustrating a relationship between at least one house and at least one device according to some embodiments of the present disclosure.

FIG. 8 is a schematic diagram illustrating a relationship between at least one house and at least one device according to some embodiments of the present disclosure. As shown in FIG. 8, houses 821, 822, . . . , and 82n are created on the terminal device 810. Houses 821, 822, . . . , and 82n may have scene rules each of which corresponds to one of the houses 821, 822, . . . , and 82n, respectively. Devices 821-1, 821-2, . . . , and 821-n' are included into the house 821. Devices 821-1, 821-2, . . . , and 821-n' may work according to a scene rule of the house 821. The device 822-1 is included into the house 82n. The device 822-1 may work according to a scene rule of the house 82n. In some embodiments, the same device may not be included into multiple houses at the same time, that is, the same device may only be in one house, and may be adjusted or deleted according to the actual situation. In some embodiments, the same device may be included into multiple houses at the same time.

It should be noted that the above description is merely for the convenience of description and does not intend to limit the present disclosure to the scope of the embodiments. It may be understood that for those skilled in the art, after understanding the principle of the system, they may make various modifications and changes to the above methods and systems in form and detail without departing from the principle.

Figure 7:
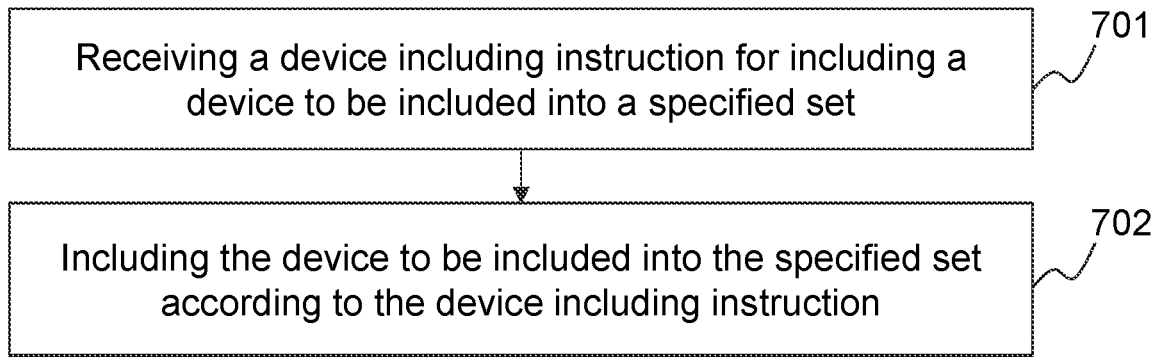
FIG. 7 is a flowchart illustrating an exemplary process for including a device into a set according to some embodiments of the present disclosure.

FIG. 7 is a flowchart illustrating an exemplary process for including a device into a set according to some embodiments of the present disclosure. In some embodiments, the process 700 may be an exemplary embodiment of the operation 402 in the process 400. In some embodiments, the process 700 may be applied to the first terminal device (also referred to as a first user terminal device).

In some embodiments, the process 700 may be executed by a processing logic, the processing logic may include hardware (such as a circuit, a special purpose logic, a programmable logic, a microcode, etc.), software (instructions running on a processing device to execute hardware simulation), or the like, or any combination thereof. One or more operations illustrated in FIG. 7 for including a device into a set may be implemented by the device control system 100 shown in FIG. 1. For example, the process 700 may be stored in a storage device in a form of instructions, which are retrieved and/or executed by the processing device 112.

In 701, the processing device 112 may receive a device including instruction for including a device to be included (e.g., the first device in FIG. 4) into a specified set (e.g., a house). Operation 701 may be performed by the first receiving unit 501.

In some embodiments, the device to be included may be a device bound to a user account corresponding to the first terminal device. In some embodiments, the specified set may be configured with a corresponding scene rule. In some embodiments, the device to be included may include a smart electrical device (e.g., a camera, a smart lock, a doorbell, a smart peephole, a smart air-conditioner, a smart refrigerator, a smart curtain, a smart TV, a smart stereo, a gas stove, etc.), a control device of the smart electrical device, a safe-box, a portable cabinet, a gun cabinet, a lockbox, a smart delivery cabinet, a smart lighting device, a smart monitoring device (e.g., a smart camera, a camera, a peephole, etc.), a walkie-talkie, a smart sensor (e.g., a gyroscope, an accelerometer, a motion sensor, a positioning system (e.g., a GPS, a Beidou satellite navigation system), a pressure sensor, a light sensor, a temperature sensor, a carbon monoxide detector, a smoke detector, a sound sensor, a fingerprint sensor, an image sensor, an iris sensor, or the like, or any combination thereof), and other different kinds of devices, which is not limited here. In some embodiments, the first terminal device may receive an identifier of the device that the user binds through a gateway, a base station, or the Bluetooth. In some embodiments, after the identifier of the device is bound to the user account, the processing device 112 may generate configuration information of the device, and the configuration information of the device may be used to control the work of the device.

In some embodiments, when the user binds the device to his/her own account, the user may be the owner of the bound device and have the highest authority over the device. A scope of the highest authority may be reflected in that only the owner of the device may share the device with other users. In some embodiments, when the device is shared with other users, the configuration information of the shared device may also be shared.

In some embodiments, the first terminal device may be an application program (APP) installed on a variety of devices that may control the device in the set, or other software that may control the device in the set. An apparatus that may install the first terminal device may include but be not limited to a smart phone, a tablet, a personal computer, a laptop, a virtual reality terminal device, an augmented reality terminal device, etc. It should be noted that terminal devices are named as a first terminal device, a second terminal device, or a third terminal device, just to distinguish a plurality of terminal devices and have no practical meaning. Functions of the first terminal device, the second terminal device, and the third terminal device may be the same or similar, and there may be more terminal devices, such as a fourth terminal device, a fifth terminal device, etc., which are not limited here.

In some embodiments, the first terminal device may receive various operation instructions in real time. When the first terminal device receives the device including instruction indicating to include the device to be included into the specified set, operation 702 may be executed.

In 702, the processing device 112 may include the device to be included into the specified set according to the device including instruction. Operation 702 may be performed by the second receiving unit 502.

In some embodiments, the device included in the specified set may be controlled by the first terminal device according to the scene rule corresponding to the specified set.

It should be noted that the first terminal device may use the scene rule of each set to control the device included in the set. In some embodiments, the scene rule of each set may include several preset types of scene rules, such as a party mode, a warm mode, a night mode, etc., or scene rules customized in advance by the user. Whenever a new device is included in the set, the processing device 112 may change configuration information of the device newly included into the set according to the scene rule of the current set to make the configuration information of the newly included device conform to the scene rule of the current set, and manage the identifier of the device included in each set. In other words, the identifiers of devices included in each set may be stored, so that operations such as retrieving, deleting, etc., can be performed on the device. For example, the scene rule of the first set may include a do-not-disturb mode, and the device to be included may work according to a sleep mode in the do-not-disturb mode of the first set. The scene rule of the specified set may include a party mode. The device to be included to the specified set may work in the party mode. Merely by way of example, the device to be included may be a smart lamp. In the first set, the configuration information of smart lamp may include a soft light and a low brightness. In the specified set, the configuration information of smart lamp may include a multi-color mode, a flash mode, etc. As another example, the scene rule of the first set may include a common mode, and the device to be included may work in the common mode of the first set according to a common prevention and control mode. The scene rule of the specified set may include a safe mode, and the device to be included in the specified set may work in the safe mode. Merely by way of example, the device to be included may include a smart lock (for example, a smart lock of a safe-box, a portable cabinet, a gun cabinet, a lockbox, a smart delivery cabinet, a door, etc.). In the first set, the configuration information of the smart lock may include a common protection mode (for example, a mode in which the administrator or other users may open the smart lock). In the specified set, the configuration information of the smart lock may be a safe mode (for example, a mode in which only the administrator may open the smart lock, or only a mechanical key or other specified manners may open the smart lock, etc.).

In some embodiments, the device to be included may be included into the specified set according to position information of the specified set in the device including instruction. In some embodiments, the device to be included may only be included into one specified set.

Figure 9:
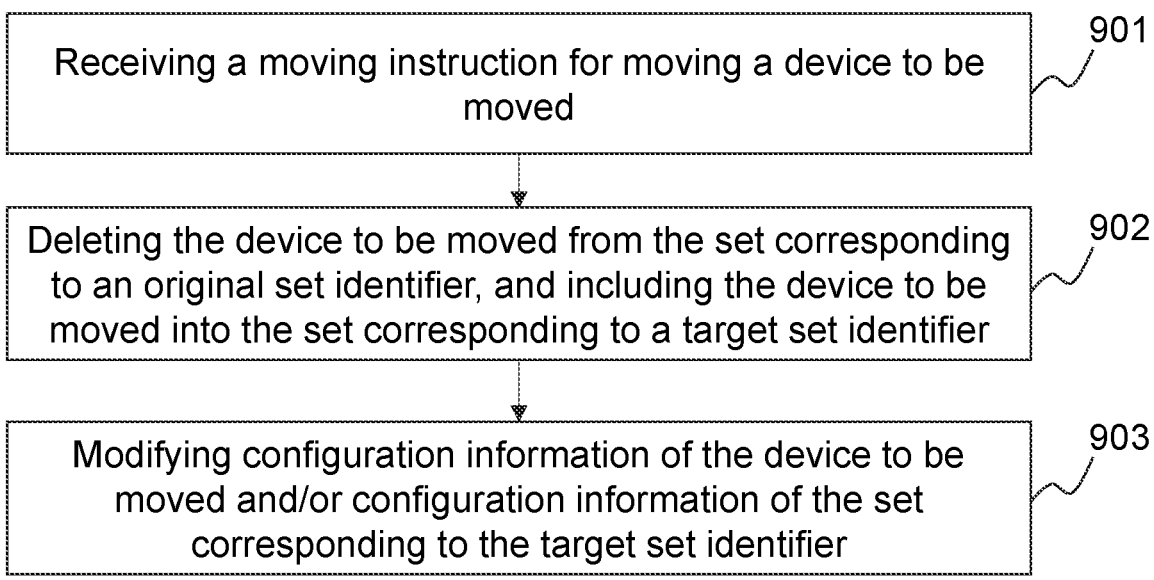
FIG. 9 is a flowchart illustrating an exemplary process for moving a device in a set according to some embodiments of the present disclosure.

FIG. 9 is a flowchart illustrating an exemplary process for moving a device in a set according to some embodiments of the present disclosure.

In some embodiments, the process 900 may be executed by a processing logic, which may include hardware (for example, a circuit, a special purpose logic, a programmable logic, a microcode, etc.), software (instructions running on a processing device to execute hardware simulation), or the like, or any combination thereof. One or more operations illustrated in FIG. 9 for adding one or more devices into a set may be implemented by the device control system 100 shown in FIG. 1. For example, the process 900 may be stored in a storage device in a form of instructions, which are retrieved and/or executed by the processing device 112.

In 901, the processing device 112 may receive a moving instruction for moving a device to be moved (e.g., one or more devices in the first devices) in a set. Operation 901 may be performed by the third receiving unit 5001.

In some embodiments, the moving instruction may carry a set identifier of an original set (which may also be understood as a set of the device before moving) of the device to be moved and a set identifier of a target set (which may also be understood as a set of the device after moving, and may also be referred to as a designated set or new set). The moving instruction may be a moving instruction issued by the server (for example, the server 110) to the first terminal device, or a moving instruction issued by the user using the first terminal device, or a moving instruction sent by other terminal devices (for example, a second terminal device, a third terminal device, and so on). For example, the moving instruction may be a moving instruction input by the user through an input/output device of the first terminal device (or other terminal devices). Merely by way of example, the user may input the moving instruction by long pressing and dragging the identifier of the device to be moved. As another example, the user may select a moving button in a menu corresponding to the device to input the moving instruction. As further another example, the user may input information including information of the device to be moved, the target set, etc., through voice to input the moving instruction.

In some embodiments, when the moving instruction is a moving instruction issued by the user using the first terminal device, that is, when the user sets the set of his/her own account, the user may freely move the device in each set of his/her own account, and freely modify the configuration information of the device. For example, the user may move a desk lamp from the original set to the target set. Specifically, the user may input a movement requirement via a front interface of the first terminal device. The moving instruction may be generated according to the movement requirement entered by the user and be sent to the first terminal device, i.e., a terminal device of the user. The configuration information of the device in different scenarios may be modified. For example, in a warm mode of the set, the light of a desk lamp may be set to a warmer color, while in a party mode, the light of the desk lamp may flash at a preset flickering frequency. As another example, in the party mode, a smart lock or access control may be normally opened within a certain preset time, while in a safe mode, the smart lock or access control may only be opened by the administrator.

In some embodiments, the moving instruction may be sent by other terminal devices, such as a second terminal device. The processing device 112 may first need to determine whether the second terminal device has the authority to move the device in the first terminal devices. For example, the user of the user account corresponding to the first terminal device (hereinafter referred to as the user of the first terminal device) is the owner of the device. When the second terminal device sends a moving instruction to the first terminal device, the user consent of the first terminal device is required, and the device needs to follow the scene rule of the set of the first terminal device by default. If the user of the user account corresponding to the second terminal device (hereinafter referred to as the user of the second terminal device) is the owner of the device, the first terminal device does not need to verify the permission information of the device's moving instruction, but needs to follow the scene rule of the set of the first terminal device. The user of the second terminal device may apply to the user of the first terminal device for moving or modifying the device.

In some embodiments, the moving instruction may be a moving instruction sent by the server, and the user of the first terminal device needs to follow the moving instruction sent by the server.

In 902, the device to be moved is deleted from the set corresponding to an original set identifier, and the device to be moved is included into the set corresponding to a target set identifier. Operation 902 may be performed by the including unit 5002.

In some embodiments, one device may be included into different sets. In some embodiments, the same device may only be included into one set. In this case, when including the identifier of the device to be moved into the set corresponding to the target set identifier, the identifier of the device to be moved needs to be deleted from the set corresponding to the original set identifier.

When deleting the identifier of the device to be moved from the set corresponding to the original set identifier, the user may be prompted that the identifier of the device to be moved will be deleted from the set corresponding to the original set identifier through pop-up, voice, or other manners. In some embodiments, the user may set that when including the identifier of the device to be moved into the set corresponding to the target set identifier, the identifier of the device to be moved is deleted from the set corresponding to the original set identifier by default. For detailed descriptions for deleting the identifier of the device to be moved from the original set, please refer to FIG. 10 and the descriptions thereof.

In 903, the processing device 112 may modify configuration information of the device to be moved and/or configuration information of the set corresponding to a target set identifier, so that the current configuration information of the device to be moved matches the scene rule of the set corresponding to the target set identifier. Operation 903 may be performed by the modification unit 5003.

In some embodiments, the device included in each set may follow the scene rule of the set. The scene rules of different sets are not necessarily the same. If the scene rule of the original set to which the device to be moved belongs are different from the scene rule of the target set to which the device to be moved needs to be moved, the configuration information of the device to be moved needs to be modified, or the configuration information of the set corresponding to the target set identifier needs to be modified, or the configuration information of the device to be moved and the configuration information of the set corresponding to the target set identifier needs to be modified, so that the current configuration information of the device to be moved matches the current scene rule of the set corresponding to the target set identifier. For example, the processing device 112 may modify the location of the set where the device to be moved is located, the connection with other devices, the bound account, the working mode, and the like.

In some embodiments, the configuration information of the set corresponds to the scene rule of the set. Using the configuration information of the set, the scene rule corresponding to the set may be generated. The configuration information of the set may be understood as information of the set or devices in the set, for example, a quantity of devices, a type of a device, a location of the device, a function of the device, the terminal device where the set is located, a user account related to the set, a working mode of the set, or the like, or a combination thereof. After the configuration information of the set corresponding to the target set identifier is modified, the scene rule corresponding to the set is adjusted accordingly.

It should be noted that the above description is merely for the convenience of description and does not intend to limit the present disclosure to the scope of the embodiments. It may be understood that for those skilled in the art, after understanding the principle of the system, they may make various modifications and changes to the above methods and systems in form and detail without departing from the principle. For example, the same device may be located in different sets. For example, a smart curtain may be located in a set corresponding to a bedroom or a set corresponding to the safe mode. In some embodiments, whether to delete the identifier of the device to be moved from the original set may be manually determined by the user of the terminal device 130, or automatically or semi automatically determined by the processing device 112. For example, the processing device 112 may determine whether to delete the identifier of the device to be moved from the original set based on the user's historical operations, user preferences, and the like. As another example, the user may set a rule whether to delete the identifier of the device to be moved from the original set, and the processing device 112 may semi automatically determine whether to delete the identifier of the device to be moved from the original set according to the rule set by the user.

Figure 10:
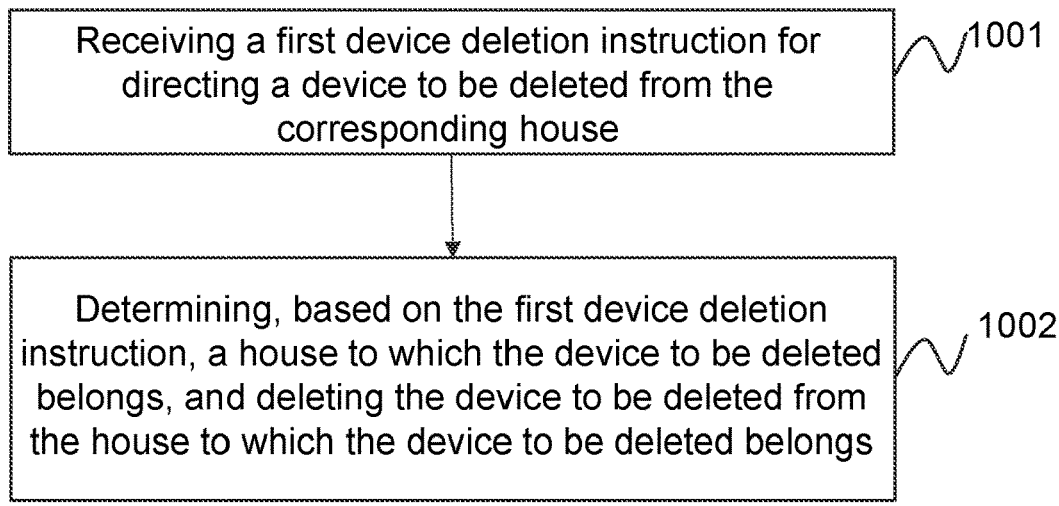
FIG. 10 is a flowchart illustrating an exemplary process for creating a set according to some embodiments of the present disclosure.

FIG. 10 is a flowchart illustrating an exemplary process for creating a set according to some embodiments of the present disclosure.

In some embodiments, the process 1000 may be executed by a processing logic, which may include hardware (e.g., a circuit, a dedicated logic, a programmable logic, a microcode, etc.), software (instructions running on a processing device to execute hardware simulation), or the like, or any combination thereof. One or more operations illustrated in FIG. 10 for including a device into a set may be implemented by the device control system 100 in FIG. 1. For example, the process 1000 may be stored in a storage device in a form of instructions, which are retrieved and/or executed by the processing device 112.

In 1001, the processing device 112 may receive a first device deletion instruction for deleting a device to be deleted from the corresponding set. Operation 1001 may be performed by the fourth receiving unit 5101.

The first device deletion instruction comes from a first target user account. In some embodiments, the first target user account may be the owner bound to the device. In some embodiments, the first target user account may be an administrator controlling the device. In some embodiments, the first target user account has a relatively high control authority over the device. For example, the first target user account has the highest control authority over the device to be deleted.

For the convenience of description, the present disclosure may take the example that if a user binds the device under his/her own account, he/she is the owner of the bound device and has the highest control authority over the device, to illustrate the deletion of the device to be deleted from the corresponding set. In this step, the deletion instruction of the first device may be input by the user on the human-computer interaction interface of the first terminal device. In such cases, the user account corresponding to the first terminal device is the first target user account. In some embodiments, the deletion instruction of the first device may also be transmitted from other terminal devices, and correspondingly, the user account corresponding to that terminal device is the first target user account.

In 1002, the processing device 112 may determine, based on the first device deletion instruction, a set to which the device to be deleted belongs and delete the device to be deleted from the set to which the device to be deleted belongs. Operation 1002 may be performed by the determination unit 5102.

In some embodiments, the first device deletion instruction may carry configuration information of the device to be deleted (e.g., an identifier, a position, a name, a bound account, connection information with other devices, etc. of the device to be deleted). Thus, after the first terminal device receives the first device deletion instruction, the configuration information of the device to be deleted may be determined by parsing the first device deletion instruction, and then the device to be deleted may be searched from the created set to determine the set to which the device to be deleted belongs. Finally, the device to be deleted may be deleted from the set to which the device to be deleted belongs. For example, when a user of a second terminal device shares a device in a set on the second terminal device to a user of the first terminal device, the user of the first terminal device may create a set that is the same as the set to which the shared device belongs, and include an identifier of the shared device to the set that is the same as the set to which the shared device belongs. If the user of the second terminal device no longer wants the user of the first terminal to continue to use the device, or if the user of the second terminal device deletes the device associated with his/her own account, the user of the second terminal device may send a deletion instruction to the user of the first terminal device, and the deletion instruction carries the configuration information of the device to be deleted. After the first terminal device receives the deletion instruction, the processing device 112 may search for the identifier of the device to be deleted among all the sets created by the first terminal device, and determine the set to which the device to be deleted belongs. The processing device 112 may delete the device to be deleted from the set to which the device to be deleted belongs.

In some embodiments, if there is only one device in the set to which the device belongs, after the device is deleted from the set to which it belongs, the user or the processing device 112 may delete the set. In some embodiments, the user or the processing device 112 may determine whether a current set includes a device included by the user based on a count of devices included into the set. In response to determining that the count of devices in the current set is zero, the processing device 112 may determine that all devices included into the set are deleted and the set may be deleted. In other words, the user or the processing device 112 may determine whether any set of the user account is necessary for existence. The user or the processing device 112 may determine whether the set includes a device included by the user. If all the devices included by the user into the set are deleted, the user or the processing device 112 may delete the set. Optionally, the user or the processing device 112 may also determine whether a set needs to be deleted based on actual needs, for example, a set containing the device or a set not containing the device.

In some embodiments, if the first target user account is a user account corresponding to the first terminal device, and a set created by the second terminal device communicating with the first terminal device includes the device to be deleted, after operation 1002, the process 1000 further includes the following steps.

a second device deletion instruction for deleting the device to be deleted may be sent to the second terminal device (also be referred to as a second user device) by the first terminal device (also be referred to as a first user device), so that the second terminal device may delete the device to be deleted from the set to which the device to be deleted belongs based on the second device deletion instruction. For example, when the user of the first terminal device shares a device in his/her own set to the user of the second terminal device, the user of the second terminal device may create a set that is the same as the set to which the shared device belongs, and include the shared device to the created set. If the user of the first terminal device does not want the user of the second terminal device to continue to use the device, or if the user of the first terminal device deletes the device associated with his/her own account, the user of the first terminal device may send a deletion instruction to the user of the second terminal device, and the deletion instruction carries the identifier of the device to be deleted. After the second terminal device receives the second device deletion instruction, the processing device 112 may search for the device to be deleted among all the sets (e.g., houses) created by the second terminal device, and determine the set to which the device to be deleted belongs. The processing device 112 may delete the device to be deleted from the set to which the device to be deleted belongs.

Figure 11:
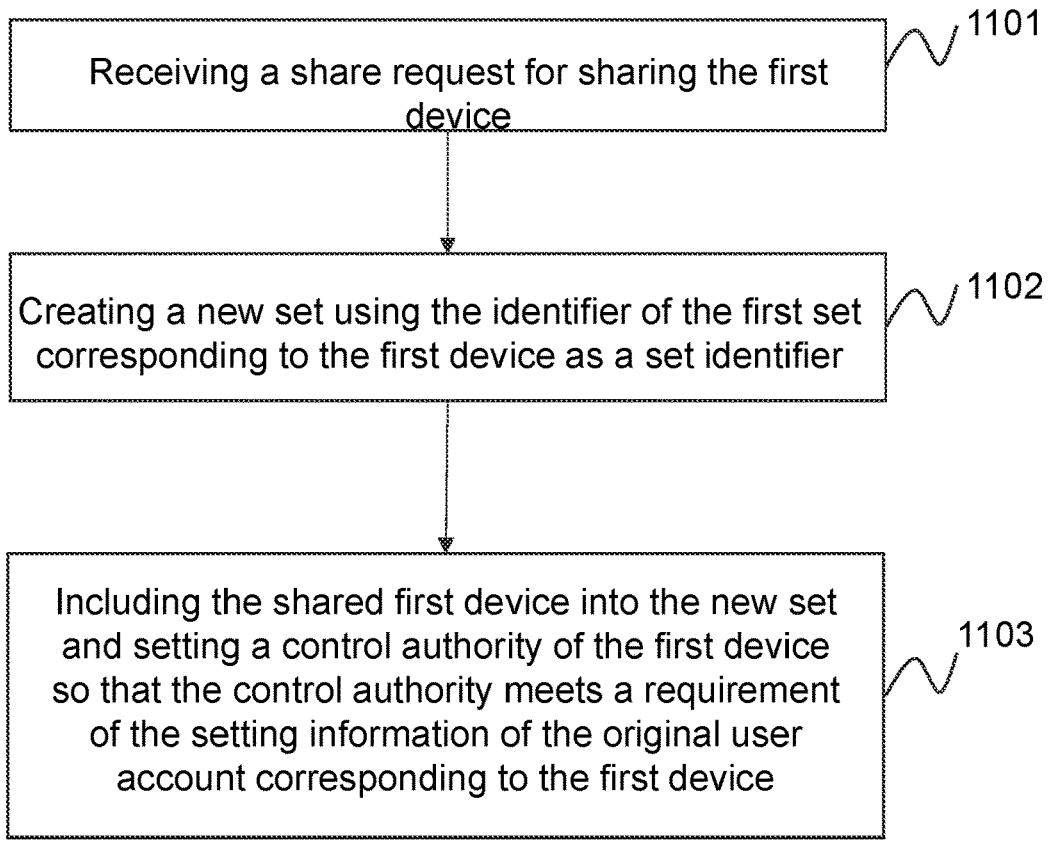
FIG. 11 is a flowchart illustrating an exemplary process for sharing devices among different accounts according to some embodiments of the present disclosure.

FIG. 11 is a flowchart illustrating an exemplary process for sharing devices among different accounts according to some embodiments of the present disclosure.

In some embodiments, the process 1100 may be executed by a processing logic that may include hardware (e.g., a circuit, a dedicated logic, a programmable logic, a microcode, etc.), software (instructions that running on a processing device to execute hardware simulation), etc., or any combination thereof. One or more of the operations shown in FIG. 11 for including a device into a set may be implemented by the device control system 100 in FIG. 1. For example, the process 1100 may be stored in a storage device in a form of instructions and/or executed by the processing device 112.

In 1101, the processing device 112 may receive a sharing request for sharing a first device. Operation 1101 may be performed by the sixth receiving unit 5301.

In some embodiments, the sharing request may include an identifier of the first device, an identifier and configuration information of a first set corresponding to the first device, setting information of an original user account corresponding to the first device, etc., or a combination thereof. In some embodiments, the sharing request of the first device may be sent by a server (e.g., the processing device 112).

In some embodiments, the user of the shared device (i.e., the user of a first terminal device) may have information of multiple sets, so the user of the first terminal device needs to specify the device to be shared, and which of the sets (e.g., houses) of the user identified by the device being shared the device is in.

In some embodiments, the user of the shared device may set the control authorities of different users over the shared device. For example, if the shared user is a visitor, the shared user has no authority to change any configuration information of the shared device. If the shared user is a family member, the shared user has authority to change the configuration information of the shared device. Since the setting information of the user account of the user sharing the device is used to indicate the control authorities of different users over the shared device, the sharing request of the device may also need to include the setting information of the original user account corresponding to the shared device.

In 1102, the processing device 112 or a user (e.g., a second terminal device) may create a new set using an identifier of a first set corresponding to the first device as a set identifier. Operation 1102 may be performed by the creation unit 5302.

In some embodiments, the processing device 112 or the user of the second terminal device may create the new set on the second terminal device with the identifier of the first set corresponding to the first device as the set identifier.

In some embodiments, the processing device 112 may determine the configuration information of the first set (i.e., the original set) as the configuration information of the new set. Specifically, the second terminal device, as the terminal device being shared, may create the new set with an identifier of the original set corresponding to the device being shared as the set identifier after receiving the sharing request for sharing the device. The configuration information of the set created by the second terminal device may further be set as the configuration information of the first set corresponding to the shared device.

In 1103, the user (e.g., a user of the second terminal device) or the processing device 112 may include the shared first device into the new set and set the configuration information (e.g., a control authority, a position, a name, an identifier, etc.) of the first device being shared such that the control authority meets the requirements of the setting information of the original user account corresponding to the shared first device. Operation 113 may be performed by the setting unit 5303.

After the second terminal device creates the set, the identifier of the shared first device may be included into the created new set. In some embodiments, the setting information of the original user account corresponding to the first device illustrates the control authority of the user of the second terminal to the shared device. The second terminal device may use the requirements of the setting information of the original user account corresponding to the shared device to set the control authority of the shared device, and determine whether the second terminal device itself has the authority to modify the configuration information of the shared device. If the second terminal device has the authority to modify the configuration information of the shared device, the modification of the configuration information of the shared device may be realized by interacting with the user of the first terminal device.

The present embodiment is illustrated by way of example, if the first terminal device shares a device, such as a desk lamp (e.g., a smart desk lamp), to the second terminal device, the second terminal device may send a sharing request to share the desk lamp with the first terminal device to the server and the server may send the sharing request to the first terminal device after receiving the sharing request. After receiving the sharing request, the first terminal may create a set in the second terminal device that is the same as the set to which the desk lamp belongs in the first terminal device according to the set identifier of the set (e.g., a house) to which the desk lamp belongs in the first terminal device included in the sharing request. The configuration information of the newly created set is the same as the configuration information of the first terminal device. The second terminal device may include the identifier of the desk lamp into the newly created house and set the control authority of the desk lamp, so that the control authority of the desk lamp matches the setting information of the desk lamp in the corresponding account in the first terminal device. As another example, the first terminal device may share a device, for example, a smart lock, with the second terminal device. The second terminal device may send a sharing request for sharing the smart lock with the first terminal device to the server, and the server may send the sharing request to the first terminal device after receiving the sharing request. After receiving the sharing request, the first terminal device may create a set in the second terminal device that is the same as the set to which the smart lock belongs in the first terminal device based on the set identifier of the set (for example, a vehicle, a safe-deposit box, a safe-box, a portable cabinet, a gun cabinet, a lockbox, a smart delivery cabinet, etc.) to which the smart lock belongs in the first terminal device included in the sharing request. The configuration information of this newly created set is consistent with the configuration information of the first terminal device. The second terminal device may include the identifier of the smart lock into this newly created set and set the control authority of the smart lock, so that the control authority of the smart lock matches the setting information of the smart lock in the corresponding account of the first terminal device.

Figure 12:
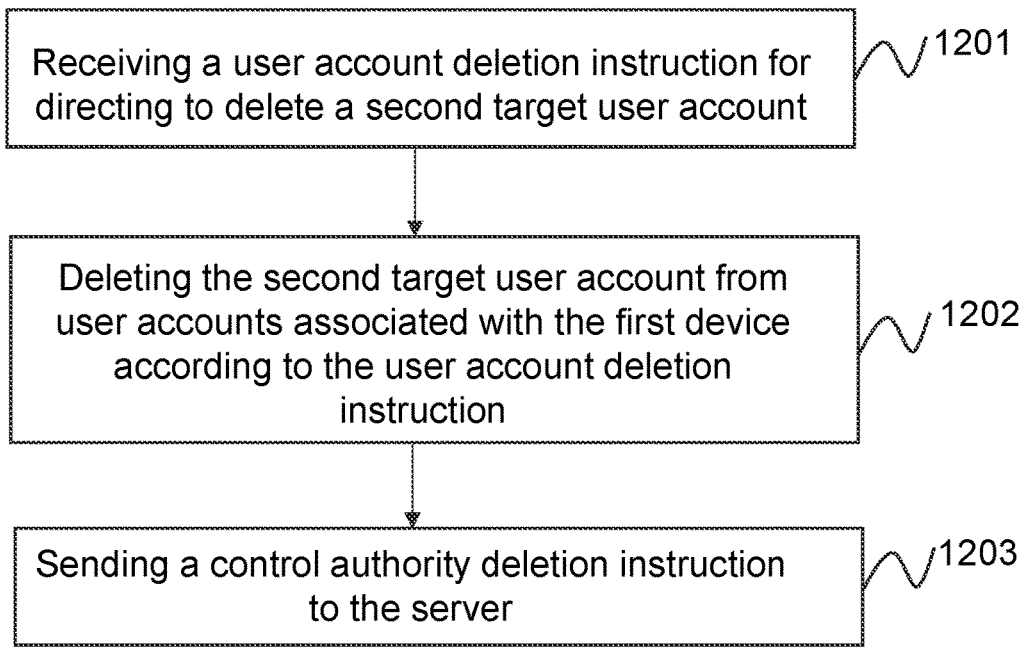
FIG. 12 is a flowchart illustrating an exemplary process for deleting an account corresponding to a device according to some embodiments of the present disclosure.

FIG. 12 is a flowchart illustrating an exemplary process for deleting an account corresponding to a device according to some embodiments of the present disclosure.

In some embodiments, the process 1200 may be executed by a processing logic that may include hardware (e.g., a circuit, a dedicated logic, a programmable logic, a microcode, etc.), software (instructions that running on a processing device to execute hardware simulation), etc., or any combination thereof. One or more of the operations shown in FIG. 12 for including a device into a set may be implemented by the device control system 100 shown in FIG. 1. For example, the process 1200 may be stored in a storage device in a form of instructions and executed by the processing device 112.

In 1201, the processing device 112 may receive a user account deletion instruction for deleting a second target user account.

In some embodiments, the second target user account is associated with a first device included into the set (e.g., the house) and the second target user account does not have the highest control authority over the first device. For example, the second target user account has a lower control authority over the first device than the first target user account (i.e., a user account corresponding to a first terminal device) over the first device.

In some embodiments, if a device is bound to a user account, the device may be then associated with the user account. A device may be associated with one or more user accounts, i.e., the device may be bound to multiple user accounts. In some embodiments, the user accounts that bind the device may form a user account list, which may record multiple user accounts established by the device. In some embodiments, the user account list may be stored in the first terminal device, the second terminal device, and/or a storage device of the device. For example, the user account list bound to the device may be stored in the configuration information of the device.

In some embodiments, the user account in the user account list may also be deleted, that is, a binding relationship between the device and the user account is released. In some embodiments, after the binding relationship between the device and the user account is released, a terminal device corresponding to the user account cannot perform any control operation on the device.

In some embodiments, the user account deletion instruction which includes the second target user account to be deleted may be input by the user at the human interaction interface of the first terminal device. In this case, the user account corresponding to the first terminal device may have a relatively high control authority, e.g., the highest control authority, over the first device.

In 1202, the processing device 112 may delete the second target user account from the user accounts associated with the first device. Operation 1202 may be performed by the deletion unit 5202.

In 1203, the first target user account may send a control authority deletion instruction to a server (e.g., the processing device 112). In some embodiments, the control authority deletion instruction is used to control the server to delete the control authority of the second target user account on the first device.

This embodiment is illustrated by way of an example. If a user of a second terminal device comes to the home of a user of a first terminal device, and the user of the second terminal device wants to use a smart device, such as a smart air conditioner, in the current house of the user of the first terminal device. The user of the first terminal device may share a control authority to the user of the second terminal device so that he/she can use the smart air conditioner. When the user of the second terminal device leaves the current house of the user of the first terminal device, the user of the first terminal device can find a target user account that has the control authority of the smart air conditioner (i.e., the target user account of the user of the second terminal device) in the user account list of the smart air conditioner. The user of the first terminal device may delete the target user account of the user of the second terminal device, and use the processing device 112 to delete the control authority of the second terminal device on the smart air conditioner by sending a delete instruction to the processing device 112.

In some embodiments, the device control system and method provided in the present disclosure may enable safe management of a device by means of instructions. The instruction may be a control instruction for turning on a certain mode, turning off a certain mode, etc., or may be an instruction to parse a human speech and obtain a semantic result, etc. The device may be a lock such as a smart lock, a smart car lock, a smart cabinet lock, etc., or may be a device that needs to be protected such as a smart lathe, a smart robot, etc. The safe management may be to disable electronic control of the device, to verify the identification and authority of the user when the user requests to control the device, to verify the legitimacy of request information of the user, etc.

In some embodiments, the system and method in the present disclosure may be applied to a lock to enable the safe management of the lock. For example, the system may be applied to a smart door lock of a house. The user may issue an instruction to turn on a safe mode, and the system may turn on the safe mode by verifying the identification and authority of the user. In response to determining that the verification is passed, the system may turn on the safe mode, otherwise the safe mode is not turned on.

In some embodiments, the system and method in the present disclosure may be applied to a device that needs to be protected to enable the safe management of the device. For example, the system may be applied to a smart lathe in an industrial workshop. An administrator can set the smart lathe to enter the safe mode during the off-duty time every day, so as to avoid accidental touching by personnel and damage to personnel and machines. For the convenience of description, the application of the system is described below by taking the application of a lock to realize the safe management of the lock as an example, which is not intended to be limiting. The system can be applied to other aspects.

Figure 13:
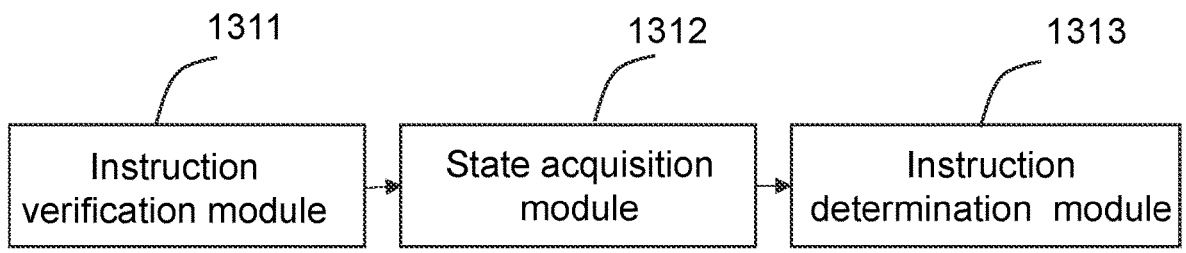
FIG. 13 is a schematic diagram illustrating a device control apparatus according to some embodiments of the present disclosure.

FIG. 13 is a schematic diagram illustrating a device control apparatus according to some embodiments of the present disclosure.

As shown in FIG. 13, the device control apparatus 1300 may include an instruction verification module 1311, a state acquisition module 1312, and an instruction determination module 1313.

In some embodiments, the instruction verification module 1311 may obtain a control instruction used by a user to control a first device, and verify whether the control instruction meets a preset condition. In some embodiments, the first device control instruction may include a local control instruction or a control instruction received via a communication manner (e.g., a wired communication manner, a wireless communication manner, etc., or a combination thereof).

In some embodiments, the first device control instruction may be a control instruction for turning on a preset mode. The preset mode may include a safe mode, a do-not-disturb mode, a specific user control mode, or a user self-setting mode. Merely by way of example, when the first device is a smart lock, the preset mode may be an electronic anti-locking mode of the smart lock. As another example, when the first device includes a smart lock, a camera, etc., the preset mode may be an armed mode. As further an example, when the first device includes a smoke alarm, a temperature sensor, a power supply, a gas stove, etc., the preset mode may be a fire monitoring mode. As further another example, when the first device is a safe-deposit box, the preset mode may be a safe mode (e.g., a mode in which only the administrator may open the safe-deposit box, or only a mechanical key or other specified manners may open the safe-deposit box, etc.). In some embodiments, the first device control instruction may also be an instruction for management of the smart device. For example, the first device control instruction may be used for turning on, turning off, or locking the smart device, or performing other user-defined functions of the smart device, which is not limited here.

In some embodiments, the instruction verification module 1311 may be used to obtain a control instruction for turning on the preset mode and determine whether the control instruction is sent by a preset terminal device to obtain a verification result. The control instruction includes a rule for turning on and/or off the preset mode.

In some embodiments, the instruction verification module 1311 may obtain the control instruction for turning on and/or off the preset mode generated in response to the user operating an operating component of the first device, and determine whether the control instruction is generated when the operating component corresponding to the preset mode is adjusted to a position indicating that the preset mode is turned on and/or off to obtain the verification result.

In some embodiments, the state acquisition module 1312 may be used to obtain a state of the first device.

In some embodiments, the instruction determination module 1313 may be used to determine whether to respond to the first device control instruction based on the verification result, the state of the first device, and the control instruction.

In some embodiments, the instruction determination module 1313 may be used to determine whether the current state of the first device is a locked state, and whether the verification result is a first preset result (e.g., the control instruction for turning on the preset mode is sent by a first terminal device having authority, the control instruction is generated based on the user's operation on the operating component of the first device, etc.). If the state is a locked state, and the verification result is the first preset result, the smart lock control instruction may be responded. If the state is not the locked state, or the verification result is not the first preset result, the smart lock control instruction may be filtered.

In some embodiments, the device control apparatus 1300 may include a first working state control module and an image acquisition module. The first working state control module may be used to control the first device to be in a working state of the preset mode. The image acquisition module may be used to determine whether a preset scene occurs based on an image captured by the image acquisition device, and if so, the image acquisition module may control the image acquisition device to perform an image acquisition operation according to a preset image acquisition rule.

In some embodiments, the first device control instruction may be a control instruction for turning off the preset mode. The instruction verification module 1311 may be used to obtain the control instruction for turning off the preset mode and determine whether the control instruction is sent by the preset terminal device to obtain a verification result. The control instruction may include a rule for turning off the preset mode. In some embodiments, the instruction verification module 1311 may obtain the control instruction for turning off the preset mode generated after a preset component set on the first device is triggered, and determine whether control information of the control instruction satisfies the preset rule to obtain the verification result. In some embodiments, the instruction verification module 1311 may obtain a state change instruction of the first device and determine whether the state change trend in the state change instruction of the first device changes from a locked state to an unlocked state to obtain the verification result. In some embodiments, the instruction verification module 1311 may obtain a control instruction for turning off the preset mode input by a user via an input/output device (e.g., a smart lock panel), and determine whether a content in the control instruction is a preset content to obtain the verification result.

In some embodiments, the instruction determination module 1313 may be used to determine whether the state of the first device is a normal working state and whether the verification result is a second preset result. In response to determining that the state of the first device is the normal working state and the verification result is the second preset result, the instruction determination module 1313 may determine to respond to the smart lock control instruction. In response to determining that the verification result is not the second preset result, the instruction determination module 1313 may filter the control instruction of the first device. The second preset result may be that the control instruction for turning off the preset mode is sent by the first terminal device with authority, the control instruction is generated based on a user's operation on an operating component of the first device, the state change trend in the state change instruction of the smart lock is to change from the locked state to the unlocked state, the content in the control instruction input by the user contains the preset content, etc.

In some embodiments, the device control apparatus 1300 may include a second working state control module and a third working state control module.

In some embodiments, the second working state control module may be used to control the first device in a working state of a non-preset mode. In some embodiments, the first device control instruction may be a control instruction for turning off the preset mode. For the convenience of description, turning off an electronic anti-locking function of the smart lock may be taken as an example for illustration. The instruction verification module 1311 may be used to obtain a local unlocking instruction input by the user. In some embodiments, the local unlocking instruction may include unlocking information. The instruction verification module 1311 may verify whether the unlocking information is unlocking information with an unlocking authority, if so, the instruction verification module 1311 may verify whether the unlocking information is the unlocking information corresponding to a preset user identifier to obtain the verification result.

In some embodiments, the third working state control module may be used to perform an unlocking operation in response to the local unlocking instruction, and turn off the preset mode after successful performing the unlocking operation. For example, the third working state control module may determine whether a preset bolt of the smart lock is retracted to determine whether the unlocking operation is successfully performed. If the preset bolt of the smart lock is successfully retracted, the third working state control module may determine that the unlocking operation is successfully executed.

The first device control instruction obtained in this embodiment may be a local control instruction or a control instruction received via a communication manner Whether to respond to the first device control instruction may be determined based on the verification result of the first device control instruction and the state of the first device. In the present disclosure, the first device control instruction may be either a local control instruction or a control instruction received by a communication manner. The manners are various and flexible, so that a manner suitable for the user can be selected according to the user's needs, thereby improving the user experience.

In some embodiments, the device control apparatus 1300 may include a chip, a component, a module, etc., or a combination thereof. In some embodiments, the device control apparatus 1300 may also include a processor and a storage device. The instruction verification module 1311, the state acquisition module 1312, the instruction determination module 1313, the first working state control module, the second first working state control module, or third working state control module, etc., may all be as program units stored in the storage device, and the processor may execute the aforementioned program units stored in the storage device to implement the corresponding functions.

The processor may contain a kernel, and the kernel may retrieve the corresponding program units from the storage device. The kernel may be set to one or more, and parameters of the kernels may be adjusted so that the first device control instruction is either a local control instruction or a control instruction received by a communication manner. The manners are various and flexible, so that a manner suitable for the user can be selected according to the user's needs, thereby improving the user experience.

The storage device may include a form of non-permanent memory, random access memory (RAM), and/or non-volatile memory in a computer readable medium, such as the storage device may a read-only memory (ROM) or a flash memory (flash RAM). The storage device includes at least one memory chip.

In some embodiments, the first device may be provided with a control password. For example, in some embodiments, a user of the first device may set a temporary control password for a temporary user. If the temporary password is leaked, the first device may be illegally controlled, resulting in lower security. For the convenience of description, the first device being a smart lock may be taken as an example. A user of the smart lock (e.g., the owner of the smart lock) may set an unlocking password for the smart lock. In some embodiments, the owner of the smart lock may set a temporary password for a temporary user, such as a visitor or a cleaning person. If the temporary password is leaked, the smart lock may be opened illegally, resulting in lower security. In addition, although the temporary password is set for the temporary person, and if the temporary person unlocks the smart lock and enters the home with the temporary password when the owner does not want to be disturbed, it may make the user feel bad. In some embodiments, the temporary password is a password or Bluetooth key provided by the administrator for a member that can open the door for a short period of time and is valid for a period of time. In some embodiments, the smart lock includes, but is not limited to, a smart door lock, a smart lock on a safe-deposit box, an indoor smart lock, a window lock, a garage lock, a car door lock, etc. The temporary password or passcode includes, but is not limited to, a text password (e.g., a numeric password, an alphabetic password, etc.), a biometric password (e.g., a facial recognition password, an iris recognition password, a voice recognition password, a fingerprint recognition password, etc.), a gesture action password, a voice password, etc.

In order to solve the technical problem of temporary password leakage and the possibility that someone using the temporary password may enter the home when the user does not want to be disturbed, the user may turn on the safe mode of the smart lock. The safe mode may be an electronic anti-locking mode, or a vacation mode (in which the preset password is disabled), etc. Thus, when the user does not want to be disturbed, or want to improve the door opening security, the user may turn on the function of the safe mode, such as the electronic anti-locking function, so that users other than the administrator cannot unlock the smart lock. The electronic anti-locking function refers to locking the electronic unlocking mode of the smart lock, and only a mechanical key or a specific manner can open the door. The administrator is an owner of the smart lock, that is, the user to which the smart lock is bound.

In some cases, the user may turn on and off the electronic anti-locking function by a fixed button on the smart lock. However, such approach is less flexible, thereby decreasing the user experience. In order to improve the flexibility of the electronic anti-locking function of the smart lock and the user experience, the present disclosure provides a method and system that can control the electronic lock by a local control instruction or by a control instruction received by a communication manner. The method for controlling a smart lock provided in the present disclosure may be applied to a controller of the first device. The controller of the first device may turn on or turn off a preset mode based on a preset control instruction response rule that is set in advance. Taking the safe mode as the electronic anti-locking as an example for illustration, there may be two ways to realize the electronic anti-locking control of the smart lock, one is to turn on the electronic anti-locking function, and the other is to turn off the electronic anti-locking function. After turning on the electronic anti-locking function, the electronic anti-locking function may be marked at position 1 to indicate that the electronic anti-locking function has been turned on. After turning off the electronic anti-locking function, the electronic anti-locking function may be marked at position 0 to indicate that the electronic anti-locking function has been turned off. In some embodiments, the smart lock control method provided by this application may be applied to a safe-box, a portable cabinet, a gun cabinet, a lockbox, a smart delivery cabinet, a room door, a window, a garage, a car door, etc., or any other device having a smart lock and achieve the same control function.

Figure 14:
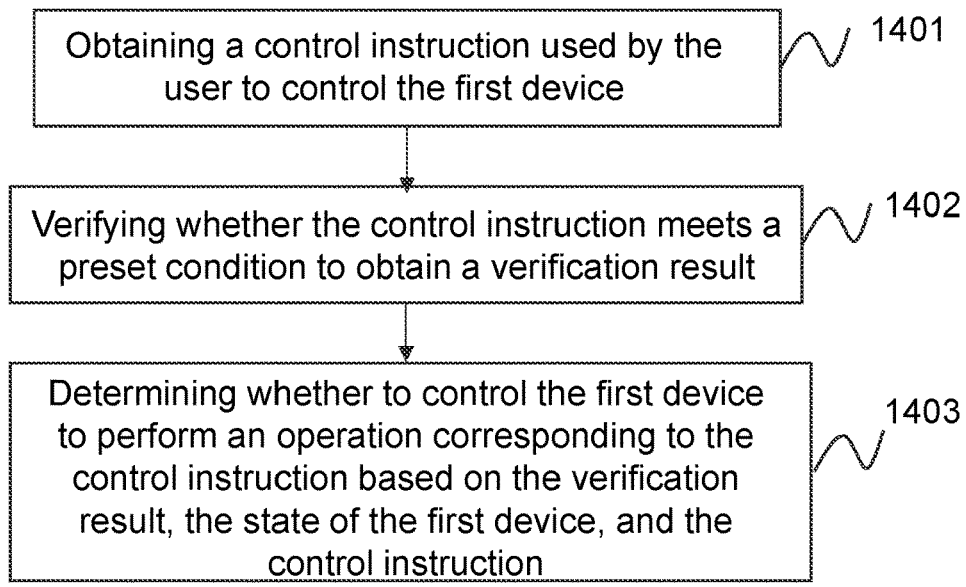
FIG. 14 is a flowchart illustrating an exemplary process for controlling a device according to some embodiments of the present disclosure.

FIG. 14 is a flowchart illustrating an exemplary process for controlling a device according to some embodiments of the present disclosure.

In some embodiments, the process 1400 may be executed by a processing logic, which may include hardware (e.g., a circuit, a dedicated logic, a programmable logic, a microcode, etc.), software (instructions running on a processing device to execute hardware simulation), or the like, or any combination thereof. One or more operations illustrated in FIG. 14 for controlling a smart lock may be implemented by the device control system 100 in FIG. 1. For example, the process 1400 may be stored in a storage device in a form of instructions, which are retrieved and/or executed by the processing device 112. In some embodiments, the process 1400 may be used to control the smart lock, for example, the process 1400 can be applied to the controller in the smart lock.

In 1401, the processing device 112 may obtain a control instruction used by a user to control a first device. Operation 1401 may be performed by the instruction verification module 1311.

In some embodiments, the control instruction of the first device may include an instruction for turning on and/or turning off a preset mode of the first device. The preset mode of the first device may include a safe mode, a do-not-disturb mode, a specific user control mode, a user self-setting mode, or the like. Merely by way of example, the first device may include a smart lock. The preset mode may be a certain mode of the smart lock, such as an electronic anti-locking mode, a safe mode in which only the administrator can open the door, or a self-setting safe mode of the user, etc. In each mode, an actual application function corresponding to the mode is included. For example, for the electronic anti-locking mode, it corresponds to two kinds of functions, namely, turning on and turning off the electronic anti-locking function.

The smart lock control instruction includes a local control instruction or a control instruction received by a communication manner. The communication manner may include a wired communication manner, a wireless communication manner, or the like, or a combination thereof. The wired communication manner may include a metallic cable, an optical fiber cable, a hybrid cable, or the like, or any combination thereof. The wireless communication manner may include a local area network (LAN), a wide area network (WAN), a Bluetooth network, a ZigBee network, a near-field communication (NFC) network, etc., or any combination thereof. The local control instruction may be generated based on a user's operation on an operating component of the first device. For example, if the preset mode is a mode to turn on the electronic anti-locking function, the user may operate a button used to control the electronic anti-locking function, or the user may input a local function code that can control the electronic anti-locking function on a panel of the smart lock or on a terminal device bound to the smart lock, etc.

In some embodiments, the smart lock may also be connected to an external terminal device by means of wired communication or wireless communication. The external terminal device includes, but is not limited to, a smart device such as a cell phone, a laptop, a smart watch, a stereo, etc. In this embodiment, the external terminal device may communicate with the first device and issue a control instruction. The control instruction may be an instruction to control the preset mode of the first device to turn on or off. The control instruction may also carry a time period of turning on or off, such as turning on every Sunday, etc. In addition, the control instruction may also carry a turn-on mode, such as turning on immediately, turning on from a specific day, turning on according to a fixed cycle or every day, etc. Similarly, the control instruction may also carry a turn-off mode.

In 1402, the processing device 112 may verify whether the control instruction satisfies a preset condition to obtain a verification result. Operation 1402 may be performed by the instruction verification module 1311.

In some embodiments, if the control instruction is sent by the user via the first terminal device, the verifying whether the control instruction satisfies the preset condition may include verifying whether the first terminal device has an authority to perform an operation corresponding to the control instruction. If the control instruction of the first device is a control instruction for turning on the preset mode, the verification whether the control instruction satisfies the preset condition may include the following steps.

The processing device 112 may obtain the control instruction for turning on the preset mode, and determine whether the control instruction is sent by the preset terminal device to obtain the verification result.

In some embodiments, when turning on a preset function of the first device, a control instruction sent by the first terminal device may be received by means of communication with the first terminal device (e.g., an external terminal device, etc.). In such a case, the first terminal device is the preset terminal device of this embodiment. In some embodiments, the first device may be controlled by a first device control software program, such as an APP, on the first terminal device. That is, only the first terminal device installed with the first device control APP and registered with the information of the first device in the APP has the authority to control the first device.

In some embodiments, in response to receiving the control instruction for turning on the preset mode, the processing device 112 may determine whether the control instruction is sent by the first terminal device that has installed with the first device control APP and registered with the information of the first device in the APP. If yes, the control instruction satisfies the preset condition. Merely by way of example, the control instruction for turning on the preset mode generally carries an identifier of the sender. For example, if the sender is a cell phone, the control instruction may carry information such as an ID number of the cell phone. The processing device 112 may verify whether the ID number is an ID number of the first terminal device that installed with the first device control APP and registered with the information of the first device in the APP. If yes, the processing device 112 may determine that the control instruction satisfies the preset condition and the verification result is the first preset result, and the verification is passed. If not, the processing device 112 may determine that the control instruction does not satisfy the preset condition, and the verification fails.

After determining that the control instruction for turning on the preset mode is sent by the preset terminal device, the processing device 112 may parse the content of the control instruction. In some embodiments, the control instruction may include a turning on rule of the preset mode, such as turning on in real time or in a preset time period.

In some embodiments, if the control instruction is generated based on a user's operation on an operating component of the first device, the verifying whether the control instruction satisfies the preset condition includes verifying whether the operating component is located at a preset position. If the control instruction of the first device is a control instruction for turning on the preset mode, the verification whether the control instruction satisfies the preset condition may include the following steps.

In some embodiments, the operating component on the first device for turning on the preset mode may include a button, a knob, a paddle switch, etc., or a combination thereof. Taking the preset mode as an electronic anti-locking function an example, the operating component in this embodiment may also be a knob type component, and the operating component has two different sign positions, one sign position indicates that the electronic anti-locking function is turned on and the other sign position indicates that the electronic anti-locking function is turned off. When the user adjusts the operating component to the sign position for turning on the electronic anti-locking function, the electronic anti-locking function may be turned on, and when the user adjusts the operating component to the sign position for turning off the electronic anti-locking function, the electronic anti-locking function may be turned off. For example, when the operating component is a knob type component, the electronic anti-locking function may be turned on or off by turning the knob type component left or right. As another example, the operating component may also be a physical button or paddle. When the paddle is toggled up, it indicates that the electronic anti-locking function is turned on, and when the paddle is toggled down, it indicates that the electronic anti-locking function is turned off. As a further example, the operating component may also be a paddle. If a red arrow on the paddle is toggled to a direction same as a direction of the handle, it indicates that the electronic anti-locking function is turned on, and if the red arrow on the paddle is toggled to a direction opposite to the direction of the handle, it indicates that the electronic anti-locking function is turned off. In this embodiment, there is no limitation on the specific implementation manner, as long as the manner that can control the preset mode to turn on is within the protection scope of the present disclosure.

For ease of description, taking the operating component is a button as an example for illustration and assuming that the button is generally in an unpressed state, when the button is pressed by a user, it means that the button is adjusted to a position representing the preset mode is turned on. At this time, the processing device 112 may obtain the control instruction for turning on the preset mode generated in response to the user operating the operating component on the smart lock, and the control instruction is a control instruction for turning on the preset mode.

After receiving the control instruction, the processing device 112 may determine the identification information of the sender of the control instruction. In some embodiments, the control instruction may carry identification information of the sender, such as, ID information, password information used by the user, or the like. The processing device 112 may determine, based on the identification information, whether the control instruction is generated when the operating component (which may also be referred to as the preset component) is adjusted to a position representing turning on the preset mode. If yes, the processing device 112 may determine that the control instruction satisfies the preset condition, the first preset result is legal, and the verification is passed; if not, the processing device 112 may determine that the control instruction does not satisfy the preset condition and the verification fails.

It should be noted that two implementation manners are given above, the first implementation manner belongs to automatic turning on the preset mode, such as the electronic anti-locking function, and the second implementation manner belongs to manual turning on the preset mode, such as the electronic anti-locking function. In addition, the turning on of the preset mode may also support remote control. For example, responding to the user's configuration request through Software-as-a-Service (SaaS) can support remote turning on, thereby ensuring the reliability and timeliness of controlling the preset mode when the user is far away from the first device. Alternatively, the preset mode may also be controlled by means of, for example, a local instruction issued by a user with administrator authority to turn off the preset mode, such as the electronic anti-locking function.

When the control instruction of the first device is a control instruction for turning off the preset mode, the verification whether the control instruction satisfies the preset condition may include the following steps.

The processing device 112 may obtain the control instruction for turning off the preset mode and verify whether the control instruction is sent by the preset terminal device to obtain a verification result. The control instruction includes a turning off rule for the preset mode.

The obtained control instruction for turning off the preset mode is similarly to the control instruction for turning on the preset mode described above. The difference is that one is for turning on the preset mode, such as the electronic anti-locking function, and the other is for turning off the preset mode, such as the electronic anti-locking function. The details are referred to above and may not be repeated herein.

In some embodiments, a mobile terminal software program may be connected to the first device by wired or wireless manners to control the first device such as, turning the preset function of the first device on or off, and realize the switching of the preset function of the first device between on and off states. In the mobile terminal software program, a turning-on period and a turning-on duration may be input into a display interface that is used to set the turning-on or turning-off of the preset function of the first device, and the setting data may be sent to the processing device 112 by clicking an OK button. The processing device 112 may turn off the preset function of the first device at the set period and the turning-on duration.

For ease of description, turning off an anti-lock mode of a smart lock may be illustrated as an example. In some embodiments, the processing device 112 may turn off the preset mode, such as turning off the electronic anti-locking function, when determining that the door is opened from the inside. Specifically, the user may perform a door opening operation indoors, the processing device 112 may release the electronic anti-locking state, i.e., turn off the electronic anti-locking mode, and synchronize the associated information to an APP. In practice, the way of detecting whether the smart lock is unlocked from indoor may be realized by a device such as a sensor, which may be described as follows.

A magnet is provided on an operator (e.g., a handle holder, a knob, a handle, etc.) set inside the door, and a reed switch is placed around the operator. When the operator set inside the door rotates, the reed switch, or a button, or an infrared sensor can detect that the door is opened from the inside. Alternatively, a transmitter device and a receiver device for infrared rays can be installed in the door frame and the door inside or outside the door, respectively. When the transmitter device and the receiver device detect a change in distance, the processing device 112 may determine that the door is opened from the inside. As another example, the reed switch and a permanent magnet may be used to detect whether the door is opened from the inside. As further another example, a button may be provided inside or outside the door, so that the user may confirm that the door is opened from the inside through the button.

In some embodiments, the magnet, the reed switch, the infrared sensor, the transmitter device, and the receiver device as described above, may serve as the operating components provided on the smart lock in this embodiment. After the operating component is triggered, the smart lock may generate a control instruction for turning off the preset mode. Upon receiving the control instruction, the processing device 112 may verify whether the control instruction is generated due to the user's operation on the operating component, and determine whether the control information of the control instruction satisfies the preset condition to obtain the verification result. If the control instruction satisfies the preset condition and the verification result is the second preset result, the second preset result is legal, and the verification is passed. If the control instruction does not satisfy the preset condition, the verification fails.

The verifying whether the preset condition is satisfied may be done by judging whether the content in the control instruction, i.e., the control information, generated by triggering the operating component is a preset change law. For example, taking the operating component is the transmitter device and the receiver device as an example, during a process of opening the door from indoor, the transmitter device and the receiver device keep moving away from each other. At this time, the strength of a signal received by the receiver device is constantly decreasing, so the change law of the transmitter device and the receiver device is that the strength of the received signal is constantly decreasing. If the change law is satisfied, the preset condition is considered to be satisfied. It should be noted that other operating components may likewise have corresponding change laws, and the processing device 112 may determine whether a preset rule is satisfied by judging whether the change law is satisfied. Optionally, when a fingerprint or password is used to authenticate and unlock the door, the door is considered to be opened from the outside, and when the door is opened without fingerprint or password authentication, the door is considered to be opened from the inside, at this time the smart lock anti-locking mode is also turned off.

In the above embodiment, the control instruction for turning off the preset mode may be generated by merely operating the preset component. In some embodiments, an electronic button may be provided on the smart lock for operational security, and the control instruction for turning off the preset mode may be generated only if both the electronic button and the operating component are simultaneously actuated.

In some embodiments, the processing device 112 may determine a state change of the first device (e.g., an operating component of the first device). In response to determining that the state change of the first device satisfies a preset condition, the processing device 112 may determine that the verification is passed.

For ease of description, turning off the anti-lock mode of the smart lock may be illustrated as an example. As long as a condition that the door is opened from the inside is met, the preset mode is turned off, such as turning off or disabling the electronic anti-locking function. In some embodiments, the processing device 112 may obtain a smart lock state change instruction and determine whether a state change trend in the smart lock state change instruction is changed from a locked state to an unlocked state to obtain a verification result.

In some embodiments, the bolt of the smart lock is provided with a sensor. The sensor is arranged on the bolt inside the door. When the door is opened from the inside, the sensor may detect the change of the bolt when the bolt is retracted, and the door is considered to be opened from the inside. Specifically, at this time, the data outputted by the sensor to the processing device may be the smart lock state change instruction, and the smart lock state change instruction carries a state change trend of the bolt. If the state change trend is changed from a locked state to an unlocked state, that is, the door is considered to be opened from the inside, the verification result is passed. If the state change trend is not changed from a locked state to an unlocked state, the verification fails.

In some embodiments, the user may input (e.g., via a panel, a button, etc., of the smart lock) the control instruction for turning off the preset mode. In response to determining that the content input by the user satisfies the preset condition, the processing device 112 may determine that the verification is passed.

Merely by way of example, a password number of an online unlocking password is 1001-1050, and a password number of an activation code password is 3001-3048. In practice, the user may set an activation code password in the APP. The activation code password may be one of the password numbers 3001-3048 described above, and may be used to turn on or off the preset mode, such as turn off the electronic anti-locking function. In some embodiments, the activation code password may also be used to control a mode (e.g., the current mode (e.g., the mode currently performed by the first device), a user-defined mode, a safe mode, a do-not-disturb mode, etc.) of one or more devices (e.g., the smart device 130 in FIG. 1) in the first devices. For example, the activation code password may be used to turn the first device on and/or off. As another example, the activation code password may be used to turn on/or turn off the mode of the first device.

The user may input a series of numbers on a smart lock panel of the smart lock. At this time, the processing device 112 may receive a control instruction for turning off the preset mode. The control instruction carries the numbers input by the user. The processing device 112 may determine whether the data is a preset content set in advance, such as the activation code password set by the user as described above, and if so, the verification is passed, or if not, the verification fails.

It should be noted that in this embodiment, after the preset mode, such as the electronic anti-locking function, is turned on, a dynamic password or a Bluetooth password cannot open the door. However, a fingerprint password can open the door normally After turning on the electronic anti-locking function, an online normal password, an activation code employee password, an activation code tenant password, a temporary password, and a one-time password cannot open the door. After turning off the electronic anti-locking function, all the passwords can realize the door opening operation.

In some embodiments, the processing device 112 may obtain a local unlocking instruction input by the user. The local unlocking instruction may include unlocking information. The processing device 112 may verify whether the unlocking information is the unlocking information with unlocking authority. If yes, i.e., in response to determining that the unlocking information is the unlock information with unlocking authority, the processing device 112 may verify whether the unlocking information is unlocking information corresponding to a preset user identifier to obtain a verification result.

In practical applications, the user may input information, such as a fingerprint, a password, etc., on a control area (e.g., a control area of smart lock on the door where the smart lock is installed, a display of the smart lock on a safe-deposit box, a display on a delivery cabinet, an additional control area having a signal connection with the smart lock, etc.) of the smart lock. The information may be referred to as unlocking information. In addition, this embodiment may be extended to a scenario of Bluetooth unlocking or RF card unlocking. After the user inputs the unlocking information, the controller may receive a local unlocking instruction that includes the unlocking information. When the unlocking information is the unlocking information corresponding to the preset user identifier, the verification is passed. For more descriptions about the determining the unlocking authority, please refer to FIG. 15 and the descriptions thereof.

In 1403, the processing device 112 may determine whether to control the first device to perform an operation corresponding to the control instruction based on the verification result, the state of the first device (e.g., the smart lock), and the control instruction.

In some embodiments, the state of the first device may include a working mode of the first device (e.g., a locking mode of a smart lock, a shooting mode of a camera, an anti-locking mode of a smart lock, etc.).

In some embodiments, the processing device 112 may determine whether a state of the operating component provided on the first device satisfies a preset condition.

In some embodiments, the processing device 112 may obtain the state of the first device collected in real time, the state of the first time collected at intervals of a preset time (e.g., every 3 seconds, every 5 seconds, every 10 seconds, etc.), etc. For example, the processing device 112 may obtain a state of a bolt captured by a bolt sensor of the smart lock and determine whether the smart lock is in a locked or unlocked state. Merely by way of example, the processing device 112 may obtain the latest bolt state stored in the history captured by the sensor and determine the latest bolt state as the state of the smart lock.

In practical applications, the smart lock control instruction is a control instruction for turning on or off the preset mode. In this embodiment, the verification result, the state of the smart lock, and a preset control instruction response rule may be combined to determine whether to execute the smart lock control instruction, specifically whether to turn on or off the preset mode.

In some embodiments, when the control instruction is an instruction for turning on an anti-locking instruction function of the smart lock, the determining whether the smart lock control instruction needs to be executed includes the following steps.

In some embodiments, the processing device 112 may determine whether the state of the smart lock is the locked state, and determine whether the verification result is passed. In response to determining that the state of the smart lock is the locked state, and the verification result is passed, the processing device 112 may determine to respond to the smart lock control instruction. In response to determining that the state of the smart lock is not the locked state or the verification result fails, the processing device 112 may filter the smart lock control instruction.

In some embodiments, if the preset mode is turned on, taking turning on the electronic anti-locking function as an example, when the electronic anti-locking function is turned on, the smart lock is required to be in the locked state, i.e., only in the locked state, the electronic anti-locking function is allowed to be turned on.

In response to determining that the verification result is the first preset result, i.e., only if the current state is the locked state and the verification result is the first preset result, the smart lock control instruction can be responded to turn on the preset mode and control the smart lock to be in the working state of the preset mode, specifically, such as to turn on the electronic anti-locking function.

For example, in the case of turning on the electronic anti-locking function, the control instruction sent by the preset terminal device may include the preset mode, such as a turning-on rule of the electronic anti-locking function. Specifically, in some embodiments, the turning-on rule may include a first turning-on rule. In some embodiments, the first turning-on rule may be a real-time turning-on rule. That is, after receiving the control instruction and determining that the control instruction is sent by the preset terminal device, if the state of the smart lock is determined to be the locked state and the verification result is the first preset result, at this time, the content of the control instruction may be parsed. If the turning-on rule is the real-time turning-on rule, the preset mode, such as the electronic anti-locking function, may be turned on immediately.

In some embodiments, the turning-on rule may include a second turning-on rule. The second turning-on rule may be a preset time period turning-on rule, i.e., the electronic anti-locking function is valid for a preset time period. Being valid for a preset time period refers that after the processing device 112 receives the control instruction sent by the preset terminal device, verifies whether the control instruction satisfies the preset condition, and determines that the smart lock is in the locked state, the processing device 112 may record an effective time (i.e., corresponding an effective time period, and the effective time period is a time range for turning on the preset mode) and an expiration time, then the preset mode may be turned on (e.g., turn on the electronic anti-locking function) or turned off (e.g., turn off the electronic anti-locking function) according to the preset rule. For example, the user may set the electronic anti-locking function or the safe mode to be turned on from 0:00 to 6:00 every night. As another example, the user may set a time period and a cycle (such as every night 20:00 to 8:00 a.m.) for automatically turning on the preset mode. If the local time of the smart lock is within this range, the electronic anti-locking function may be turned on. If the local time of the smart lock exceeds this range, the electronic anti-locking function may be turned off. It should be noted that the control of the first device can be applied to the control of other devices. For example, the first device may be a sweeping robot. The processing device 112 may control the sweeping robot to perform an operation (e.g., charging, sweeping, mopping, etc.) corresponding to a control instruction based on the verification result and a state (e.g., a sleep state, a standby state, a charging mode, etc.) of the sweeping robot.

In some embodiments, during a time period in which the preset mode (e.g., the electronic anti-locking function) is turned on, the controller of the smart lock can still recognize the information carried by the unlocking instruction such as the fingerprint password, but if the information is not the administrator's, the response is not performed.

In some embodiments, the content carried by the control instruction may be to control the smart lock to always be in the electronic anti-locking state, and an execution effective time period and an execution ineffective time period for the electronic anti-locking function are set. During the execution effective time period, if the state of the smart lock is the locked state and the verification result is the first preset result, only a password of the administrator identity and a key can unlock the smart lock, and the unlocking instruction can be responded to during the execution ineffective time period.

In some embodiments, after turning on the preset mode, such as after turning on the electronic anti-locking function, at this time, a password of the non-administrator identity or a key is not able to open the door. However, in practical applications, in order to monitor whether other personnel have performed the unlocking action after the electronic anti-locking function is turned on, or whether there are thieves and other illegal personnel who have performed illegal unlocking actions, an image acquisition device, such as a camera, may be controlled at this time for monitoring. In some embodiments, the image acquisition device may be integrated with the smart lock or may be set separately. In some embodiments, when the smart lock is in the electronic anti-locking state, a monitoring level of the camera may be increased (e.g., to increase the resolution, expand the shooting angle, etc.) to strengthen the monitoring.

In some embodiments, the image acquisition device may capture an image. The processing device 112 may receive the image captured by the image acquisition device and determine whether a preset scene occurs based on the image captured by the image acquisition device. The preset scene may include a scene of an abnormal situation, a user-defined scene, etc., or a combination thereof. The abnormal situation may include a stranger unlocking a door, a stranger appearing indoors and/or outdoors, a user without authority controlling a device, occurrence of fire, gas leakage, occurrence of flood, occurrence of smoke, an accident of an object (e.g., a monitored elderly person, a child, a pet, etc.), or the like, or a combination thereof. For example, the processing device 112 may determine, based on the image captured by the image acquisition device, whether there is a person in the image, i.e., determine whether there is a person outside the door. If there is a person, the processing device 112 may determine that a preset scene has occurred. At this time, the image acquisition device may be controlled to perform an image acquisition operation according to a preset image acquisition rule. For example, a video recording function of the image acquisition device may be turned on, and a recording time duration may be longer than a usual recording time duration. In addition, the controller may also push a strong reminder to the user APP, so that the user can instantly understand the unlocking situation and improve security.

In some embodiments, if the state of the smart lock is not the locked state or the verification result is not verified, the processing device 112 may not turn on the preset mode. The processing device 112 may filter the smart lock control instruction or set the validity of the smart lock control instruction to invalid, so as to avoid falsely sounding the control instruction.

In some embodiments, the control instruction of the smart lock is a control instruction for turning off the preset mode. The determining whether the smart lock performs the operation corresponding to the control instruction may include the following steps.

In some embodiments, the processing device 112 may determine whether the state of the smart lock is a normal working state, and whether the verification result is a second preset result. In response to determining that the state of the smart lock is the normal working state and the verification result is the second preset result, the processing device 112 may determine to respond to the smart lock control instruction. In response to determining that the verification result of the smart lock is not the second preset result, the processing identification 112 may filter the smart lock control instruction. In some embodiments, when turning off the preset mode, the state of the smart lock is not limited, as long as the smart lock does not fail, that is, the smart lock is in the normal working state. Specifically, whether the smart lock is in the locked state or the unlocked state is not limited in this embodiment. In response to determining that the state of the smart lock is the normal working state and the verification result is the second preset result, that is, the verification is passed, the processing device 112 may determine to respond to the control instruction. Specifically, the processing device 112 may control the smart lock to be in a working state of a non-preset mode. In response to determining that the verification result is a failed verification, the processing device 112 may filter the control instruction.

In some embodiments, the preset mode is the electronic anti-locking function may be illustrated as an example. In the case of obtaining the local unlocking instruction input by the user, the administrator has the highest unlocking authority. As long as the smart lock is unlocked by the administrator and the smart lock is in the normal working state, the smart lock may be unlocked directly regardless of the preset mode (e.g., the state of the electronic anti-locking function). In the case that the smart lock is not unlocked by the administrator, the state of the electronic anti-locking function and whether the smart lock is in the normal working state may be considered. When the state of the electronic anti-locking function is on, unlocking is prohibited. When the state of the electronic anti-locking function is off, if the smart lock is in the normal working state, unlocking is allowed.

More specifically, if the unlocking information does not have unlocking authority, it indicates that the input unlocking password is incorrect, and the unlocking operation may not be performed. If the unlocking information has unlocking authority and corresponds to the preset user identifier, it indicates that the smart lock is unlocked by the administrator, and if the smart lock is in the normal working state, the smart lock may respond to the local unlocking instruction and perform the unlocking operation. Specifically, the smart lock may perform the door opening operation by driving a motor to rotate. In some embodiments, after successfully performing the unlocking operation, the preset mode can still be turned on and the temporary user is not allowed to open the door. In some embodiments, after successfully performing the unlocking operation, the preset mode (e.g., the electronic anti-locking function) can be turned off to allow the temporary user to open the door. In this regard, when determining whether the unlocking operation is successfully performed, it can be judged by the state of the bolt. Specifically, whether the preset bolt is retracted may be determined; if so, the successful execution of the unlocking operation is determined.

If the unlocking information has unlocking authority but does not correspond to the preset user identifier, it indicates that the smart lock may be unlocked by a temporary user. When the electronic anti-locking state is on, which indicates that the user does not like to be disturbed. In order to avoid disturbing the user by a temporary user (e.g., a cleaning staff), the processing device 112 may not respond to the local unlocking instruction at this time. Specifically, the processing device 112 may filter the local unlocking instruction, thereby the unlocking operation may not be performed. When the electronic anti-locking state is off, which indicates that the user allows the temporary user to enter the door. In such cases, if the smart lock is in the normal working state, the processing device 112 may perform the unlocking operation at this time.

In practical applications, after the user input the unlocking information on the smart lock input panel each time, the controller of the smart lock may determine the correctness of the unlocking information. If the input unlocking information is correct, the controller may obtain the state of the electronic anti-locking function once and judge the state (e.g., the electronic anti-locking function is turned on). The controller may further determine whether the smart lock is unlocked by the administrator and whether the smart lock is in the normal working state. If so, the smart lock may be unlocked and the electronic anti-locking function may be turned off. If not, the controller may not control the motor to rotate. In addition, if the electronic anti-locking function is turned off, the controller of the smart lock may control the motor to rotate to open the door.

In some embodiments, according to the embodiments of the present disclosure, by turning on the above-mentioned electronic anti-locking function, all smart unlocking manners of the smart lock may be disabled, including Bluetooth, fingerprint, password, RFID, etc. For some hackers who crack a password or a Bluetooth open key of the smart lock by illegal means, the design described in the preset disclosure may completely prohibit all electronic unlocking methods, even if someone knows the smart lock password, he/she cannot unlock the smart lock.

In addition, in terms of the application of the technical solution of the present disclosure, the smart lock supports issuing a short-term password such as a temporary password, a periodic password, etc. After the user issues a temporary password to a nanny or cleaning staff, or when the user wants to prevent a person who has been issued the password from entering his/her home within a certain period of time, he/she can use the electronic anti-locking function to lock the smart lock and disable all electronic unlocking methods.

It should be noted that the above embodiments describe unlocking the smart lock by electronic manners such as a fingerprint, a digital password, etc. In addition, the smart lock can also be unlocked by a key, as long as the key can be inserted into the keyhole and the smart lock can be unlocked. At this time, if the smart lock is in the normal working state, the unlocking is considered successful, it is considered that the unlocking is successful, and the preset mode (e.g., the electronic anti-locking function) may also be turned on.

The smart lock control instruction obtained in this embodiment may be a local control instruction or a control instruction received by a communication manner, and then whether to respond to the smart lock control instruction may be determined based on a verification result of the smart lock control instruction and a state of the smart lock. In the present disclosure, the smart lock control instruction may be either a local control instruction or a control instruction received by a communication manner. The manners are various and flexible, so that a manner suitable for the user can be selected according to the user's needs to realize the turning on or off a mode, thereby improving the user experience.

Figure 15:
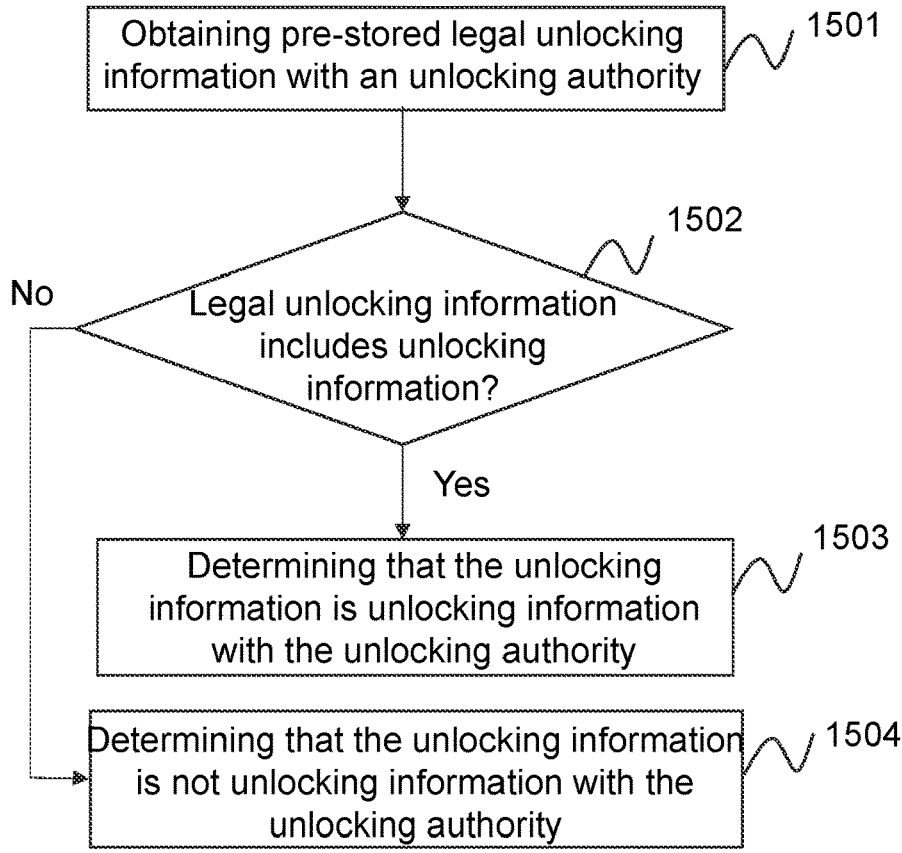
FIG. 15 is a flowchart illustrating an exemplary process for verifying unlocking authority of a user according to some embodiments of the present disclosure.

FIG. 15 is a flowchart illustrating an exemplary process for verifying unlocking authority of a user according to some embodiments of the present disclosure.

In 1501, the processing device 112 may obtain pre-stored legal unlocking information with unlocking authority.

In some embodiments, the legal unlocking information with unlocking authority may be pre-stored in a smart lock (e.g., a controller of the smart lock). The legal unlocking information with unlocking authority may be inputted by the user via a cell phone APP or be inputted in a local input interface by the user. For example, the user may set the legal unlocking information with unlocking authority, a user identifier corresponding to the legal unlocking information (e.g., an administrator, a family member, a normal user, a temporary user, etc.), or whether it is a temporary password, etc.

In 1502, the processing device 112 may determine whether the legal unlocking information includes unlocking information.

In some embodiments, the unlocking information may be unlocking information corresponding to a preset user identifier. For example, when an anti-locking mode of the smart lock is turned on, the corresponding preset user may be an administrator of the smart lock. As another example, when the anti-locking mode of the smart lock is turned off, the corresponding preset user may be an administrator of the smart lock, a normal user, a temporary user, etc. If the legal unlocking information includes the unlocking information, operation 1503 may be executed. If the legal unlocking information does not include the unlocking information, operation 1504 may be executed.

In 1503, the processing device 112 may determine that the unlocking information is the unlocking information with unlocking authority.

In 1504, the processing device 112 may determine that the unlocking information is not the unlocking information with unlocking authority.

In some embodiments, the processing device 112 may determine whether the legal unlocking information includes the unlocking information. If the legal unlocking information includes the unlocking information, the legal unlocking information is unlocking information with unlocking authority. If the legal unlocking information does not include the unlocking information, the legal unlocking information is unlocking information without unlocking authority.

After determining that the unlocking information is unlocking information with unlocking authority, the processing device 112 may verify whether the unlocking information is unlocking information corresponding to the preset user identifier to obtain a verification result.

In some embodiments, the process of verifying whether the unlocking information is the unlocking information corresponding to the preset user identifier may be similar to the process of verifying whether the unlocking information is unlocking information with unlocking authority. The process may include the following steps.

The processing device 112 may obtain target unlocking information corresponding to the preset user identifier and determine whether the target unlocking information includes the unlocking information. If the target unlocking information includes the unlocking information, the processing device 112 may determine that the unlocking information is the unlocking information corresponding to the preset user identifier. If the target unlocking information does not include the unlocking information, the processing device 112 may determine that the unlocking information is not the unlocking information corresponding to the preset user identifier, and obtain the verification result.

The device management system and method provided in the present disclosure may also be used for device arming and disarming, combined with information collected by a sensor, to secure the device and/or the scene in which the device is used. The device may be a lock such as a smart door lock, a smart car lock, a smart device lock, etc. The device may also be a security device such as a smart camera, a smart burglar detector, etc. The device may also be a box that protects specific items, such as a smart safe-deposit box, a smart gun cabinet, etc. The sensor may include different types of sensors such as a temperature sensor, a battery power sensor, an infrared sensor, a sound sensor, etc. The scene may be anti-theft and protection of homes, cars, etc., or may be protection of smart devices such as a safe-deposit box, a gun cabinet, etc.

In some embodiments, the present system may perform arming and disarming operations locally. In some embodiments, the present system may perform the arming and disarming operations by executing an arming and disarming instruction from a server. In some embodiments, the present system may perform the arming and disarming operations locally or in combination with the server.

In some embodiments, using the present system, the arming and disarming operations may be performed manually. In some embodiments, using the present system, the arming and disarming operations may be performed automatically. In some embodiments, using the present system, the arming and disarming operations may be performed in combination manually and automatically.

In some embodiments, the system can be applied to locks to implement anti-theft and protection for homes, cars, and the like. For example, the system may be applied to a smart door lock in a home to arm the smart door lock. Further, the system may detect whether there is a human voice in the house by a sound sensor, and may realize the monitoring and alarming of abnormal conditions such as human voice in the door, lock picking outside the door, etc. The system may detect, by a temperature sensor, whether an indoor temperature is too high, whether a concentration of carbon monoxide exceeds the corresponding standard, or whether a concentration of smoke exceeds the corresponding standard, and issue a fire alarm in time.

In some embodiments, the present system may be applied to a security device to achieve anti-theft and protection of a home, a car, etc. For example, the present system may be applied to a security device of a car. According to an instruction from a server, a smart camera, a smart burglar detector, etc., in the car may enter an armed state to monitor in real time whether an abnormal condition (e.g., a stranger approaching, violent shaking of the car, etc.) occurs.

In some embodiments, the present system may be applied to a box that protects a specific item to achieve the protection of the box. For example, the present system may be applied to a safe-deposit box to arm the box of the safe-deposit box and monitor in real time for the occurrence of an abnormal condition such as violent knocking, long-distance transportation, etc.

For ease of description, the application of the present system is described below by taking applying to a lock to achieve anti-theft and protection of a home, a car, etc., as an example, which is not intended to be limited, and the present system may be applied to other aspects.

Figure 16:
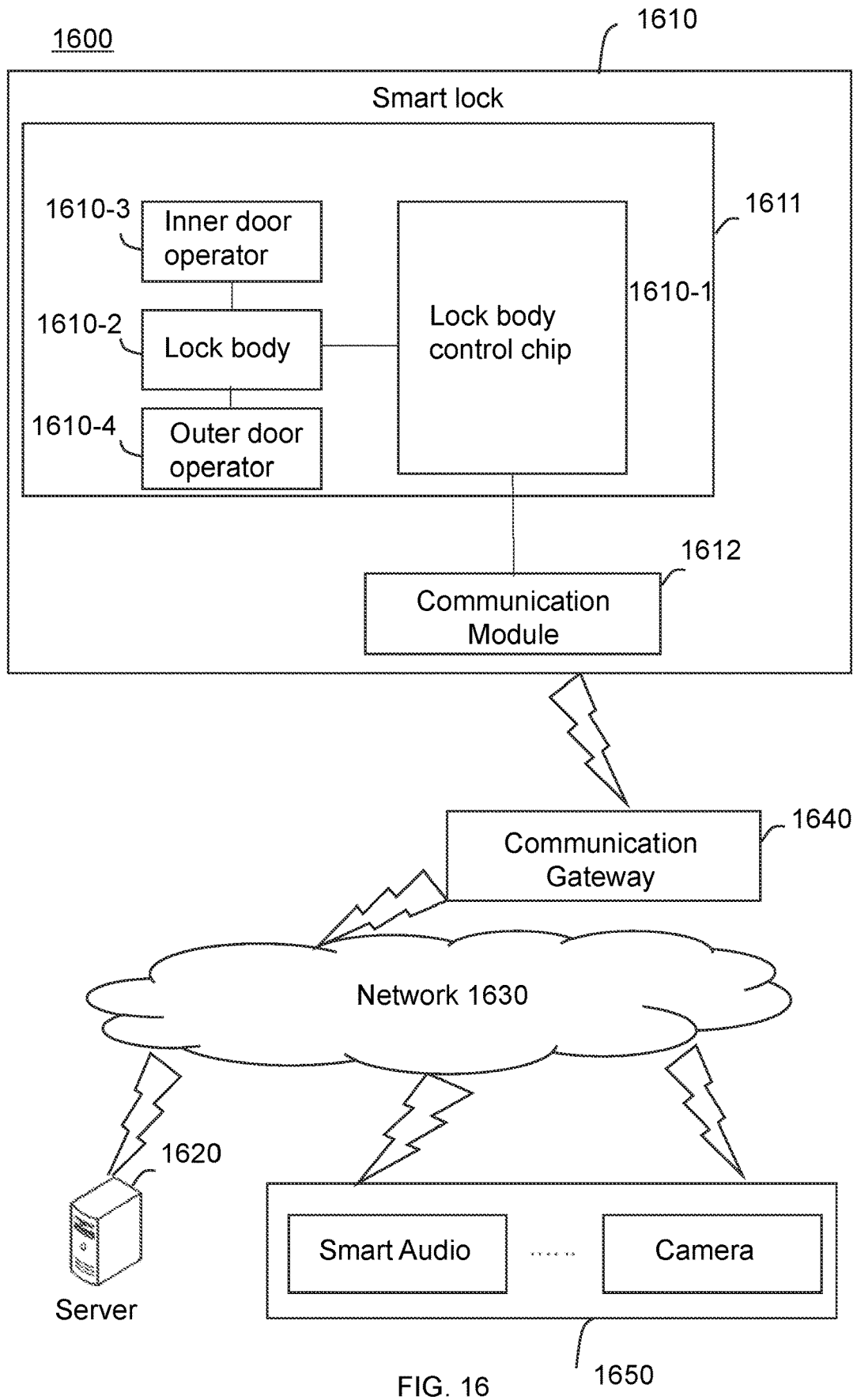
FIG. 16 is a schematic diagram illustrating an application scenario of a control system of a smart lock according to some embodiments of the present disclosure.

FIG. 16 is a schematic diagram illustrating an application scenario of a control system of a smart lock according to some embodiments of the present disclosure.

As shown in FIG. 16, the control system 1600 may include a smart lock 1610, a server 1620, a network 1630, a communication gateway 1640, and a smart device 1650. In some embodiments, one or more components of the control system 1600 may communicate via wired or wireless manners.

In some embodiments, the smart lock 1610 may include a lock such as a smart door lock, a smart car lock, or a smart device lock (e.g., a lock of the smart device 130 in FIG. 1). In some embodiments, the smart lock 1610 may include a lock member module 1611 and a communication module 1612. The lock member module 1611 may include a lock body control chip 1611-1 and a lock body 1611-2.

For ease of description, the smart lock is a smart door lock may be illustrated as an example. The smart lock 1610 may also include an inner door operator 1611-3 (e.g., an inner door handle) and an outer door operator 1611-4 (e.g., an outer door handle) that are coupled to the lock body. The inner door operator refers to a component that is used by a user to operate to control the smart lock in the room when the door is closed. The outer door operator refers to an operating component of the smart lock outside when the door is closed. In some embodiments, the inner door operator 1611-3 may include an inner door handle, a display, a button, a knob, a key, a sensing device, etc., or a combination thereof. The outer door operator 1611-4 may include a display, an outer door handle, a button, a key, a knob, etc., or a combination thereof. If the smart lock 1610 is a smart door lock, the lock member module 1611 may also be referred to as a door lock member module, and the lock body control chip 1611-1 may also be referred to as a door lock control chip.

In some embodiments, the lock body 1611-2 may include a body, a bolt, and a lock core (not shown in the figure). The lock body control chip 1611-2 may control the contraction and ejection of the bolt in the lock body to realize the unlocking and locking of the door lock. The locking refers to controlling the door to be in a closed state using the smart lock 1610. The inner door operator 1611-3 refers to one or more components of the smart lock 1610 located indoors when the smart lock 1610 is installed on the door and the door is in a closed state. Correspondingly, the outer door operator 1611-4 refers to one or more components of the smart lock 1610 located outdoors when the smart lock 1610 is installed on the door and the door is in the closed state. In some embodiments, the user may utilize the inner door operator 1611-3 to achieve door-opening by rotating the inner door operator 1611-3. In some embodiments, the user may control the smart lock 1610 to unlock or lock by means of electronic verification (e.g., a password, biometric information, Bluetooth, NFC, a local area network, etc.). In some embodiments, the user may achieve locking of the smart lock 1610 through the outer door operator 1611-4 (e.g., lifting the outer door handle). It could be understood that since the smart lock 1610 may not be provided with the outer door operator, in this case, the locking may be achieved by operating a touch panel, etc., of the smart lock 1610 outside the door. In some embodiments, the user may lock the smart lock by electronic verification manners (e.g., biometric, password verification, card swiping, Bluetooth of a cell phone, etc.). In some embodiments, the smart lock 1610 may be automatically locked.

In some embodiments, the smart lock 1610 may also be provided with different kinds of sensors to sense the state of the bolt of the smart lock, or to sense the operation behavior of the user of the smart lock, or to sense the room temperature of the premises where the smart lock door is located, etc.

In some embodiments, the smart lock 1610 may also include a motor for powering the smart lock 1610, and a display for displaying information such as prompt information, a password keypad, etc.

In some embodiments, the smart lock 1610 may also include a monitoring device. The monitoring device may be a camera, so as to capture images of the inside or the outside of the door via the camera. The monitoring device may also be other body sensing devices, such as an infrared camera, an ultrasonic device, a radio positioning device, a radar positioning device, a laser detection device, a sensor (e.g., a sound sensor, an odor sensor, a motion sensor, etc.), etc., or a combination thereof, which is not limited here.

In some embodiments, the smart device 1650 may be arranged in the room corresponding to the door where the smart lock 1610 is located. For more descriptions about the smart device 1650, please refer to the smart device 130 in FIG. 1 and the descriptions thereof.

In some embodiments, the smart device 1650 and the server 1620 may be communicatively connected via the network 1630. For example, the server 1620 may obtain a lock state of the smart lock 1610, e.g., a locked state of the lock, an unlocked state of the lock, etc. The server 1620 may control the smart device 1650 to be in the working state based on the lock state of the smart lock.

In some embodiments, the server 1600 may be the same as or similar to the server 110 in FIG. 1. In some embodiments, the server 1620 may be a specific embodiment of the server 110. In some embodiments, the server 1620 may be hardware or software. When the server 1620 is hardware, the server 1620 may be implemented as a distributed server cluster consisting of multiple servers, or may be implemented as a single server. When the server 1620 is software, the server 1620 may be implemented as multiple software or software modules (e.g., used to provide a distributed service), or the server 1620 may be implemented as a single software or software module. There are no specific limitations here. In some embodiments, the user may also not deploy the smart device indoors, in which case the control system 1600 may also not include the server 1620.

In some embodiments, the communication module 1612 of the smart lock 1610 may establish a communication connection with the server 1620 via the network 1630. In some embodiments, the communication module 1612 of the smart lock 1610 may be a short-range wireless communication module. In such cases, the communication gateway 1640 may include a short-range wireless communication gateway. The short-range wireless communication module of the smart lock 1610 may communicate with the short-range wireless communication gateway via a short-range wireless network, and the short-range wireless communication gateway may establish a communication connection with the server 1620 via the network 1630. Correspondingly, the smart lock 1620 may establish a communication connection with the server 1620 via the short-range wireless communication gateway. For example, the short-range wireless communication module of the smart lock 1610 may be a Bluetooth module, and correspondingly, the short-range wireless communication gateway may be a Bluetooth gateway. In such a case, the Bluetooth module of the smart lock may communicate with the Bluetooth gateway, and the Bluetooth gateway may establish a communication connection with the server 1620 via the network 1630. As another example, the short-range wireless communication module of the smart lock may also be a ZigBee module, and the short-range wireless communication gateway may be a ZigBee gateway. The ZigBee module uses the ZigBee technology. The ZigBee technology is a two-way wireless communication technology with short-range, low-complexity, low-power, low-rate, low-cost, etc.

It should be understood that the smart lock 1610, the network 1630, and the server 1620 in FIG. 16 are merely schematic. In practical applications, the smart lock may have other components, and similarly, the number of networks 1630 and servers 1620 may be set as desired.

With the development of smart technology, smart devices, e.g., smart locks, have been commonly used in various places such as banks, hotels, and residential houses. The smart lock can provide the user with intelligent access management control. Due to the high security of the smart lock, a security door with a smart lock can effectively reduce the situation of illegal persons entering the room through the security door. However, after the user goes out, even if the smart lock of the security door is in the locked state, illegal persons such as thieves can still enter the room and unlock the smart lock indoors through other means, thereby affecting the safety of indoor property. Some embodiments of the present disclosure provide a smart lock control system, which can conveniently use the smart lock to reduce the situation of illegal personnel unlocking the lock indoors when the user needs to go out, and improve the personnel and property safety of the user.

Figure 17:
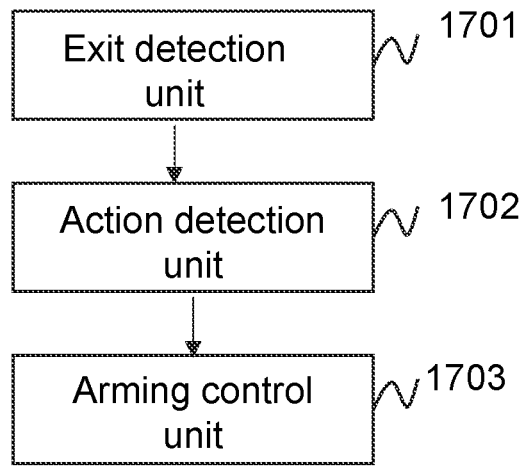
FIG. 17 is a schematic diagram illustrating a smart lock control apparatus according to some embodiments of the present disclosure.

FIG. 17 is a schematic diagram illustrating a smart lock control apparatus according to some embodiments of the present disclosure. In some embodiments, the smart lock may include a lock such as a door lock, a car lock, a cabinet lock, etc. For ease of description, the smart lock being a door lock may be taken as an example.

As shown in FIG. 17, the smart lock control apparatus 1700 may include an exit detection unit 1701, an action monitoring unit 1702, and an arming control unit 1703. The exit detection unit 1701 is configured to detect an exit action behavior of a user. The action monitoring unit 1702 is configured to monitor an action of a trigger component (e.g., an anti-theft trigger component, an arming operator, etc.) of the smart lock in response to the exit action behavior of the user. The arming control unit 1703 is configured to control the smart lock in the armed state if the action of the trigger component is detected to meet a predetermined condition. When the smart lock is in the armed state, if the smart lock detects an unlocking action in the door, the alarm operation is performed.

Figure 18:
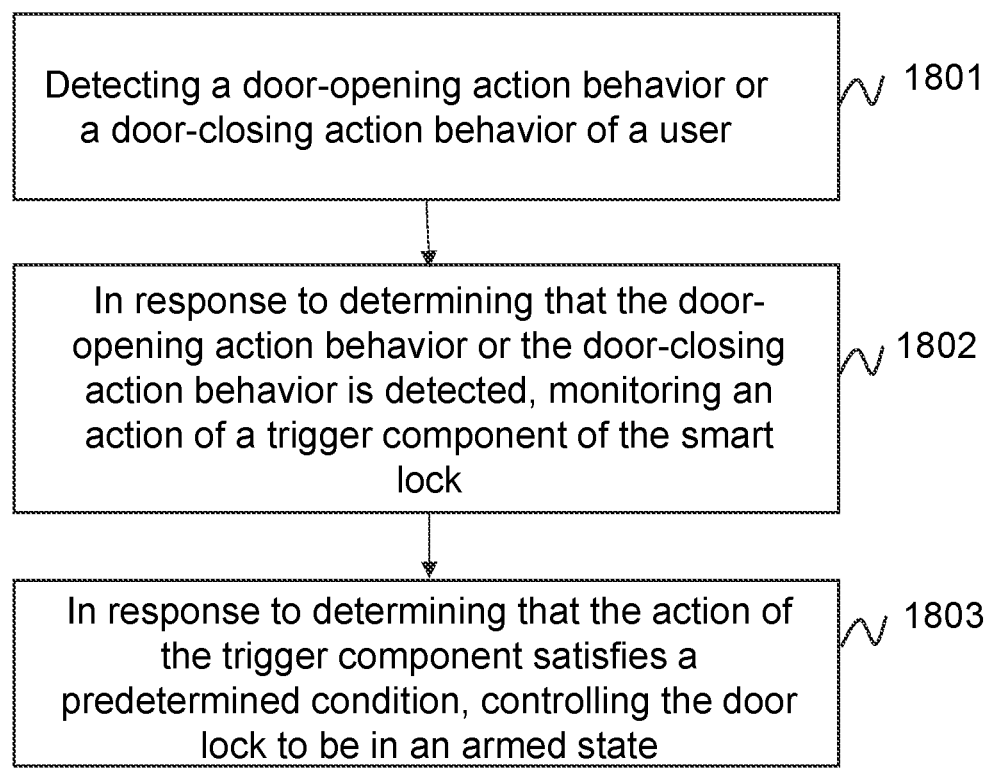
FIG. 18 is a flowchart illustrating an exemplary process for controlling a smart lock according to some embodiments of the present disclosure.

In this embodiment, the specific operating processes of the exit detection unit 1701, the action monitoring unit 1702, and the arming control unit 1703 and the technical effects thereof may be referred to the relevant descriptions of the corresponding embodiments in operation 1801, operation 1802, and operation 1803 in FIG. 18, respectively, which are not repeated herein.

In some embodiments, the exit detection unit 1701 may include a first exit detection unit and/or a second exit detection unit. The first exit detection unit is configured to detect a door-opening action of an inner door operator of the smart lock. The second exit detection unit is configured to detect the door-opening action of the inner door operator of the smart lock and/or sense the user's exit via a designated sensor.

In some embodiments, the action monitoring unit 1702 may include a first action monitoring unit. The arming control unit 1703 may include a first arming control unit. The first action monitoring unit is configured to monitor an action (e.g., a key action) of a trigger component of the smart lock in response to the exit action behavior of the user. The first arming control unit is configured to control the smart lock to be in the armed state if the trigger component is detected to be pressed.

In some embodiments, the action monitoring unit 1702 may include a second action monitoring unit. The arming control unit 1703 may include a second arming control unit. The second action monitoring unit is configured to monitor an action of the outer door operator of the smart lock in response to the exit action behavior of the user. Correspondingly, the second arming control unit is configured to control the smart lock to be in the armed state if a locking action of the outer door operator is detected.

In some embodiments, the action monitoring unit 1702 is configured to start a timer in response to the exit action behavior and monitor the action of the trigger component of the smart lock within a set time period corresponding to the timer. Correspondingly, the arming control unit 1703 is configured to control the smart lock to be in the armed state detect in response to determining that the action of the trigger component (e.g., a security trigger component, an arming trigger component, etc.) satisfies a predetermined condition within a set time period.

In some embodiments, the smart lock control apparatus 1700 may further include an arming request unit. The arming request unit is configured to in response to determining that the action of the trigger component (e.g., a security trigger component, an arming trigger component, etc.) satisfies the predetermined condition, send an arming request to a server to cause the server to control at least one smart device to be in the armed state based on the arming request. If the smart device senses a preset abnormal condition (e.g., an abnormal burglary behavior) while the smart device is in the armed state, an alarm operation may be performed.

In some embodiments, the smart lock control apparatus 1700 may further include a doorbell reminder unit. The doorbell reminder unit is configured to in response to determining that a doorbell button associated with the smart lock is touched, send a doorbell reminder message to the server to cause the server to send the doorbell reminder message to a user terminal device bound to the smart lock. The doorbell reminder message may be used to indicate that the doorbell has been touched.

In some embodiments, the smart lock control apparatus 1700 may further include a doorbell output unit. The doorbell output unit is configured to output a doorbell ringtone through a speaker of the smart lock if it is detected that the current moment does not fall within a set doorbell do-not-disturb time period.

It should be noted that the smart lock control apparatus 1700 may be a chip, a component, a module, etc., or a combination thereof. The smart lock control apparatus 1700 may include a processor and a storage device. The exit detection unit 1701, the action monitoring unit 1702, the arming control unit 1703, the arming request unit, the doorbell reminder unit, the doorbell output unit, etc., may be stored in the storage device as program units, and the processor may execute the above program units stored in the storage device to achieve the corresponding functions.

The processor may contain a kernel, and the kernel may retrieve the corresponding program units from the storage device. The kernel may be set to one or more, and parameters of the kernels may be adjusted so that an alarm may be output in time for the indoor unlocking behavior of illegal personnel, which is conducive to reducing the indoor unlocking of illegal personnel.

The storage device may include a form of non-permanent memory, random access memory (RAM), and/or non-volatile memory in a computer readable medium, such as the storage device may a read-only memory (ROM) or a flash memory (flash RAM). The storage device includes at least one memory chip.

The smart lock control apparatus 1700 provided in the above embodiment of the present disclosure can control the smart lock to be in the armed state using the arming control unit 1703 if the action monitoring unit 1702 determines that the action of the trigger component (e.g., the security trigger component) meets the predetermined condition after the exit action behavior of the user is detected by the exit detection unit 1701. Therefore, after going out, the user only needs to perform the corresponding operation on the trigger component, and the smart lock can perform the alarm operation after detecting the indoor unlocking action, so that the alarm can be output in time for the indoor unlocking behavior of illegal personnel, which is conducive to reducing the indoor unlocking of illegal personnel.

It should be noted that the above description of the smart lock control apparatus 1700 and the modules/units thereof is merely for the convenience of description and does not intend to limit the present disclosure to the scope of the embodiments. It may be understood that for those skilled in the art, after understanding the principle of the system, they may arbitrarily combine various modules/units or form a subsystem to connect with other modules without departing from this principle. For example, the exit detection unit 1701 may also be used to detect the door-opening action behavior or door-closing action behavior of the user. Such deformation is within the protection scope of the present disclosure.

FIG. 18 is a flowchart illustrating an exemplary process for controlling a smart lock according to some embodiments of the present disclosure. In some embodiments, the process 1800 may be performed by the smart lock control apparatus 1700.

In 1801, the processing device 112 may detect an exit action (or a door-opening action) behavior or a door-closing action behavior of a user. In some embodiments, the processing device 112 may detect an exit action of the user. For example, when the smart lock is a door lock, a car lock (e.g., when the user unlocks the smart lock from inside the car), etc., the processing device 112 may detect the door-opening action behavior of the user. As another example, when the smart lock is a cabinet lock (e.g., a lock of a safe-box, a portable cabinet, a gun cabinet, a lockbox, a smart delivery cabinet, etc.), a car lock (e.g., when the user unlocks the smart lock from outside the car), etc., the processing device 112 may detect the door-closing action behavior of the user. For the convenience of description, a door lock control method is illustrated as an example and is not intended to limit the scope of protection of this present disclosure. The smart lock control method can be applied to other locks such as car locks and cabinet locks.

Operation 1801 may be performed by the exit detection unit 1701 in the smart lock control apparatus 1700.

In some embodiments, the processing device 112 may detect the exit action of the user by detecting the door-opening action of the inner door operator of the door lock, sensing that the user is out of the door by a sensor, etc., or a combination thereof.

In some embodiments, an execution subject of the smart lock control method (e.g., the processing device 112, the smart lock control apparatus 1700 in FIG. 17, the server 1620, etc.) may sense an action of the inner door operator so that a door-opening action of a user opening the door via the inner door operator may be sensed. For example, a sensor on the inner door operator may sense a rotation action of the inner door operator, and upon detecting the rotation action of the inner door operator, the sensor may transmit the sensed information to the processing device 112. The processing device 112 may determine that the door-opening action is detected based on the sensed information. As another example, upon detecting that a rotation amplitude of the rotation action with exceeds a set amplitude, the processing device 112 may determine that the door-opening action of the inner door operator is detected. As a further example, when the user presses down the inner door operator with his/her hand, an oblique bolt of the smart lock may to retracted, thereby causing the door to open. Therefore, the rotation action of the inner door operator may indicate that the user needs to open the door, which also indicates that the user has a need or intention to go out.

In some embodiments, the execution subject of the door lock control method may sense the action behavior of the user by at least one sensor of the smart lock and obtain the exit action behavior of the user. The at least one sensor may include an infrared sensor, a gyroscope, an accelerometer, a motion sensor, a positioning system (e.g., GPS, BeiDou satellite navigation system, etc.), an acoustic sensor, a pressure sensor, a light sensor, a temperature sensor, an image sensor, a fingerprint sensor, an iris sensor, etc., or a combination thereof.

The exit action behavior of the user may include at least one action that the smart lock determines that the user is going out. For example, the actions involved in the user's going out may include a variety of actions such as the user operating the inner door operator (e.g., the user pressing the inner door handle, pressing the unlocking button, rotating the unlocking knob, etc.), the user unlocking the lock by means of electronic verification (e.g., password, biometric information, Bluetooth, NFC, LAN, etc.), the user opening the door body, the user passing through the door frame, etc. Therefore, the exit action behavior of the user may include one or more of these actions. For example, an infrared sensor may obtain an infrared image of the user, and the processing device 112 may determine the action behavior of the user based on the obtained infrared image. As another example, the smart lock may detect that the user goes out by setting a sensor (e.g., an infrared sensor) in the lock slot of the smart lock. If the sensor detects a human body, it is determined that the user is going out. As a further example, the bolt of the smart lock may be provided with a position sensor. The position sensor may detect the ejection of the bolt in place and retraction. If the position sensor senses the retraction of the bolt, the door installed with the smart lock is determined to have opened, and it can be considered that the user is detected to go out. As still a further example, the smart lock may detect that the user goes out by a gyroscope set in the smart lock. The gyroscope may detect an angle of the door, and when the angle of the door meets a preset condition, the door installed with the smart lock is determined to have opened, and it can be considered that the user is detected to go out. As still another example, the smart lock may detect that the user goes out by an accelerometer set inside the smart lock. The accelerometer may detect an acceleration of the door, and when the acceleration of the door meets a preset condition, the door installed with the smart lock is determined to have opened, and it can be considered that the user is detected to go out.

In 1802, in response to the exit action behavior of the user, the processing device 112 may monitor an action of a trigger component of the smart lock. Operation 1802 may be performed by the action monitoring unit 1702.

In this embodiment, after the exit action behavior is detected, the processing device 112 may initiate monitoring actions of the trigger component (e.g., a security trigger component, an arming trigger component, an anti-control trigger component, etc.), so as to subsequently determine whether the smart lock needs to enter an armed state for preventing a preset action such as indoor unlocking.

In some embodiments, the trigger component may be an arming operator provided in the smart lock for triggering entry into the armed state. Whether the user wishes to enter the armed state may be represented by the user's operation action on the arming operator. For example, the trigger component may also be an outer door operator or a lock body of the smart lock. It should be understood that after the user goes out, the user may control the lock body to perform the locking action by the outer door operator or other means, so that the main lock body pops out, which means that the user is currently out and there is no one in the room. In such cases, it is necessary to prevent illegal persons such as thieves from entering the room and unlocking the smart lock indoors.

In some embodiments, the monitoring the action of the trigger component may also include monitoring a control instruction sent by a user terminal device of the door lock for controlling the action of a security guard component. For example, the user terminal device may send an action instruction for triggering the action of the security guard component to the door lock via an application associated with the door lock on the user terminal device.

In 1803, in response to the action of the trigger component satisfying a predetermined condition, the processing device 211 may control the first device to be in an armed state.

In this embodiment, the predetermined condition to be satisfied by the action of the trigger component is a condition indicating that the current state meets the condition for entering the armed state. In practical applications, the predetermined condition may vary depending on the trigger component. For example, the trigger component may include an outer door operator or a lock body, and the predetermined condition may include the locking action of the outer door operator or the lock body. As another example, the trigger component may include an arming button, and the predetermined condition may include the arming button being in a position corresponding to arming. For more descriptions about the trigger component, please refer to FIG. 21 and its related description.

In some embodiments, when the first device in the armed state, the processing device 112 may detect whether there is an abnormal condition. In response to determining that the abnormal condition is detected, the processing device 112 may control one or more smart devices (e.g., the first device in the first set in FIG. 4) to perform a corresponding action based on a preset rule corresponding to the abnormal condition. For example, the door lock detects a preset action and an alarm action may be performed. The preset action may indicate the presence of an illegal indoor operation, such as an illegal person entering the room and then opening the door indoors, or an illegal person performing a risky operation indoors on an indoor object or device. For example, the preset action may be an opening action inside the door. As another example, the preset action may also be the detection of an illegal person entering the room or in the room by a monitoring device such as a camera device, etc. In some embodiments, after the door lock activates the armed state, the door lock may monitor the lock body and related components of the door lock at regular intervals or in real time, and perform an alarm operation if a preset action such as an unlocking action inside the door is monitored. Taking the predetermined condition as an unlocking action inside the door as an example, in some embodiments, the way for the door lock to detect the unlocking in the door may include sensing the rotation of the inner door operator by a sensor on the inner door operator, sensing an unlocking action of an inner lock member by a sensor on an inner door lock knob, or detecting an unlocking operation other than an unlocking operation outside the door. There may be other possible cases in which the door lock determines the presence of an unlocking action inside the door, which is not limited in the present disclosure.

In this embodiment, the alarm operation performed by the door lock in the armed state may also have a variety of possibilities. For example, the alarm operation performed by the door lock may include outputting an alarm bell (or alarm voice), sending an indoor unlocking alarm to one or more user terminal devices bound to the door lock, security authorities (e.g., building security personnel or offices, police departments, etc.) and/or a server (e.g., the processing device 112), etc., controlling delayed unlocking, controlling (e.g., linkage controlling) one or more other smart devices to perform corresponding operations, etc., or a combination thereof. In some embodiments, the processing device 112 may determine a specific abnormal condition based on an audible signal and/or other information from the smart device (e.g., a sound from an alarming device). For more descriptions about the detection of the abnormal condition, please refer to FIGS. 28 and 29 and their related descriptions.

In some embodiments, the door lock may be integrated with a monitoring device such as a camera device. In the present disclosure, the processing device 112 may also control the camera device integrated in the door lock to be in an armed state if the action of the trigger component is detected to meet a predetermined condition. When the camera device is in the armed state, the camera device may perform an image acquisition, and perform the alarm operation when an abnormal person is determined to exist based on the acquired image. For example, the camera device may acquire the image of the side of the door lock facing the room. Therefore, the camera device may monitor the state of the room in real time or at regular intervals. If it is detected that there is a person in the room or there is a person who does not belong to the set user without removing the armed state, the processing device 112 may determine that there is an abnormal person who illegally entered the room. As another example, the camera device may also acquire the image of the side of the door lock facing the outdoors. Abnormal behaviors such as lock picking or unlocking by an illegal person other than the set user outdoors may be detected based on the image captured by the camera device.

According to the embodiments of the present disclosure, after the door lock detects the exit action of the user, and if the action of the trigger component is monitored to meet the predetermined condition, the door lock may be controlled to be in the armed state. Therefore, after going out, the user only needs to perform the corresponding operation on the trigger component, and the smart lock can perform the alarm operation after detecting the preset action such as the indoor unlocking action, so that the alarm can be output in time for the illegal actions such as the indoor unlocking behavior of illegal personnel, which is conducive to reducing the indoor unlocking of illegal personnel. In addition, in the present disclosure, only after detecting the exit action of the user can the door lock be controlled in the armed state, thereby reducing the possibility of triggering the door lock to enter the armed state due to the accidental or malicious operation of the anti-theft touch components by others outdoors, and reducing the situation of misoperation.

It should be noted that the above description is merely for the convenience of description and does not intend to limit the present disclosure to the scope of the embodiments. It may be understood that for those skilled in the art, after understanding the principle of the system, they may make various modifications and changes to the above methods and systems in form and detail without departing from the principle. In some embodiments, in 1802, in response to detecting the door-opening action behavior (or door-closing action behavior) of the user, the processing device 112 may automatically trigger the arming operation of the first device in accordance with a preset rule. For example, after the door-opening action behavior of the user is detected, the processing device 112 may control the first device to enter the armed state after a certain preset time. As another example, the processing device 112 may control the first device to enter the armed state after detecting the door-opening action and the exit action of the user. As another example, the processing device 112 may control the first device to enter the armed state after detecting the door-opening action and the door-closing action of the user.

Figure 19:
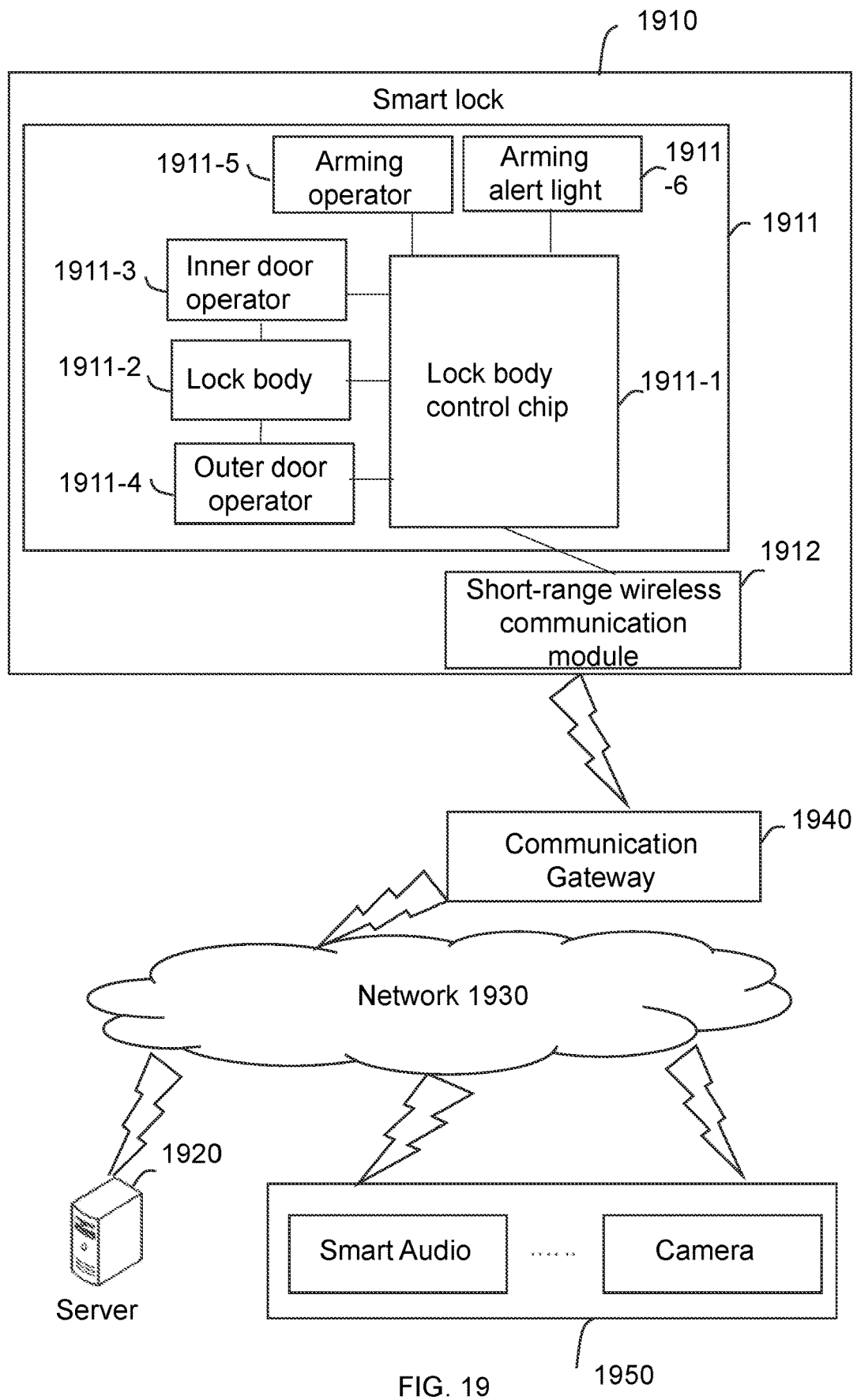
FIG. 19 is a schematic diagram illustrating an application scenario of a smart lock control system according to some embodiments of the present disclosure.

FIG. 19 is a schematic diagram illustrating an application scenario of a smart lock control system according to some embodiments of the present disclosure.

Similar to the control system 1600 of the smart lock shown in FIG. 16, the control system 1900 may include a smart lock 1910, a server 1920, a network 1930, a communication gateway 1940, and a smart device 1950. Different from the control system 1600, the smart lock 1910 may not only include part or all of a lock body control chip 1911-1, a lock body 1911-2, and an inner door operator 1911-3 and an outer door operator 1911-4 connected to the lock body, but also include an arming operator 1911-5 and an arming alert light 1911-6.

The arming operator 1911-5 may include an arming button, an arming touch area, an arming knob, or the like. In some embodiments, the arming operator 1911-5 and the smart lock may be set on the door body on the side facing the outside. The arming operator 1911-5 may be connected to the lock body control chip 1911-1. For example, in the case where the smart lock 1910 has the outer door operator 1911-4, the arming operator 1911-5 may be provided on the same side of the door body as the outer door operator 1911-4. That is, in the case where the smart lock 1910 is provided on the door body, the arming operator 1911-5 is provided on the side of the door body facing the outside. For example, the arming operator 1911-5 may be connected to the lock body control chip 1911-1 of the smart lock 1910 and set on the side of the door body that is outside. Alternatively, the arming operator 1911-5 may be set on the lock body 1911-2 of the smart lock 1910 and set on the same side of the lock body 1911-2 as the outer door operator 1911-4.

In some embodiments, after detecting the exit action behavior of the user, the smart lock 1910 may control the arming alert light 1911-6 to flash to alert the user that the smart lock 1910 may currently be set to enter the armed state.

Figure 20:
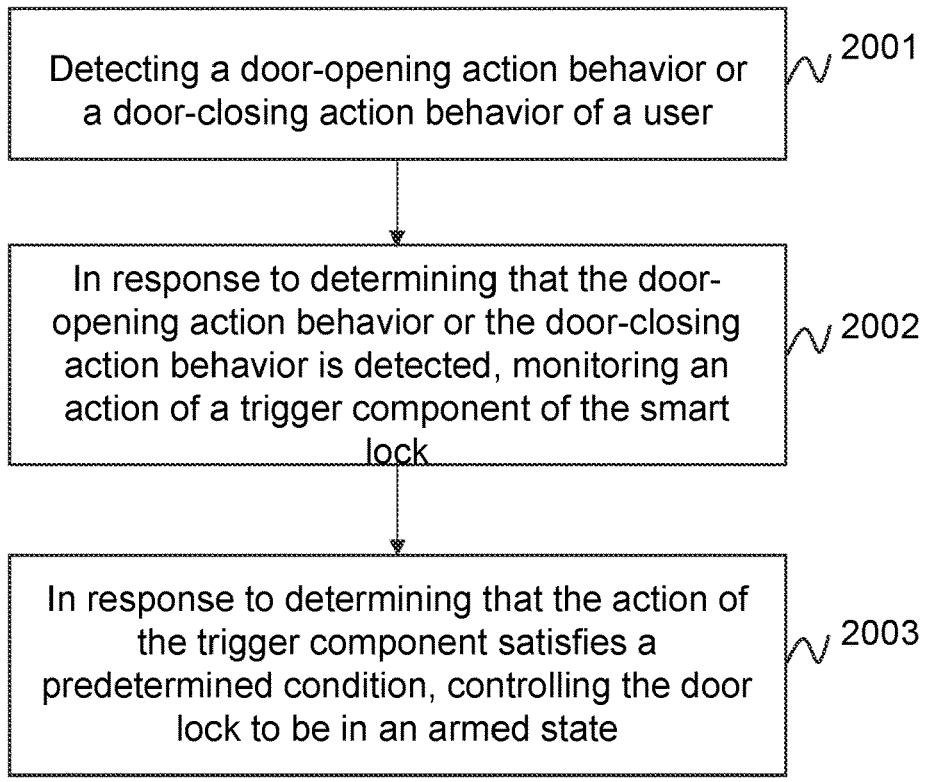
FIG. 20 is a flowchart illustrating an exemplary process for controlling a smart lock according to some embodiments of the present disclosure.

FIG. 20 is a flowchart illustrating an exemplary process for controlling a smart lock according to some embodiments of the present disclosure. The process 2000 may be applied to a door lock. In some embodiments, the process 2000 may be performed by the smart lock control apparatus 1700.

In 2001, the processing device 112 may detect a door-opening action of an inner door operator of the smart lock. Operation 2001 may be performed by the exit detection unit 1701 in the smart lock control apparatus 1700.

For more descriptions about the door-opening action of the inner door operator of the smart lock, please refer to operation 1801 and the descriptions thereof.

In 2002, the processing device 112 may control an arming alert light to flash in response to the door-opening action of the inner door operator and monitor an operating action of a trigger component (e.g., an arming operator) of the smart lock.

After determining that there is a door-opening action of the inner door operator, the processing device 112 may control the arming alert light to flash to draw the attention of the user who has gone out, thereby realizing the purpose of prompting the user to set the armed state of the smart lock. In some embodiments, considering that the user generally leaves the home within a short period of time after going out, if the action of the arming operator of the smart lock is not detected for a longer period of time, it means that the user may only go out for a short period of time and does not need to set the armed state of the smart lock. In this case, in order to avoid power consumption caused by long-time flashing of the arming alert light, and to avoid misoperation caused by other false touches when the user has left the door, the execution subject of the smart lock control method of this embodiment may also start a timer after detecting the door-opening action of the inner door operator, control the arming alert light to flash within a set time period of the timer, and monitor the operation of the arming operator.

It should be noted that in operation 2002, the controlling the flashing of the arming alert light is only to remind the user, and in practical applications, the operation may also not be performed as required.

In 2003, in response to detecting that the arming operator is triggered, the processing device 112 may control the smart lock to be in an armed state. Operation 2003 may be performed by the arming control unit 1703.

Triggering the arming operator refers to performing an operating behavior on the arming operator for triggering initiation of the armed state. For example, if the arming operator is an arming button, the arming operator may be triggered when the arming button is detected to be touched. In some embodiments, the processing device 112 may monitor the operation action of the arming operator within a set time period corresponding to the timer, and then if the arming operator is detected to be triggered within the set time period corresponding to the timer, the execution subject of this embodiment may control the smart lock to be in the armed state.

As can be seen from FIG. 20, compared to the corresponding embodiment of FIG. 18, the smart lock control method in this embodiment highlights that the smart lock achieves the arming control based on the triggering action of the trigger component (e.g., an arming operator). Since the trigger component is set on the door body facing the outside side of the door, after the door-opening action of the inner door operator is detected and if the trigger component is detected to be pressed, it indicates that the user has gone out and wishes to activate the armed mode of the smart lock. Thus, the solution of this embodiment allows the user to control the smart lock to enter the armed state by manually touching the trigger component after the door is opened by the inner door operator, thereby achieving a more convenient control of the armed state of the smart lock.

Meanwhile, compared with touching the trigger component alone, this embodiment only may respond to the triggering action of the trigger component after detecting the door-opening action of the inner door operator, which can effectively ensure that the user goes out and actively sets the armed state of the smart lock, thereby avoiding others from mistakenly or maliciously operating and causing the smart lock to enter the armed state.

Figure 21:
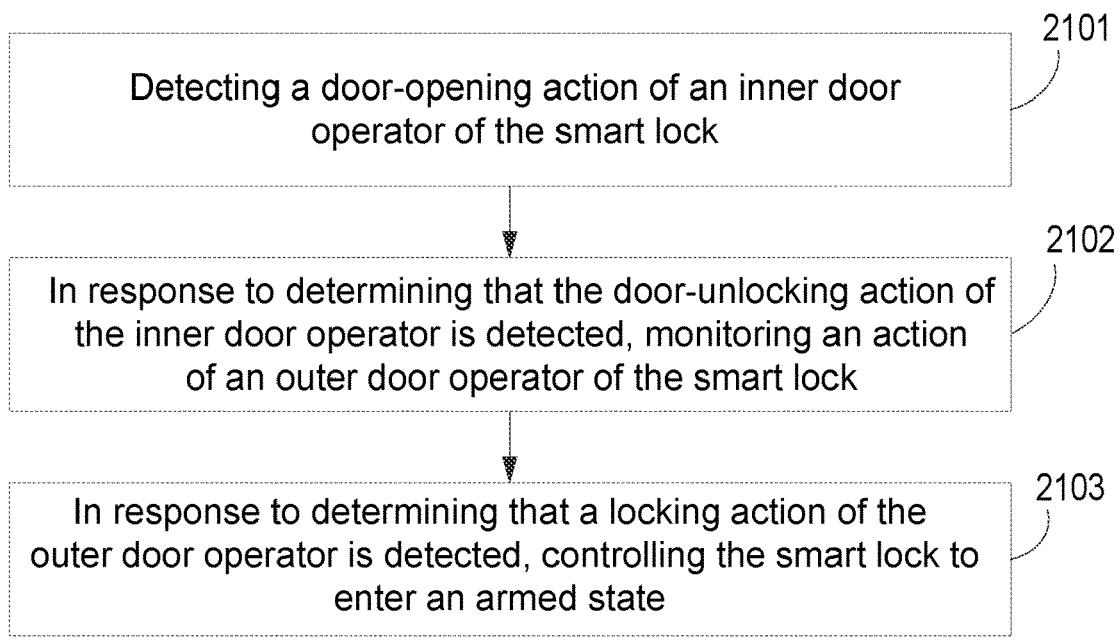
FIG. 21 is a flowchart illustrating an exemplary process for controlling a smart lock according to some embodiments of the present disclosure.

FIG. 21 is a flowchart illustrating an exemplary process for controlling a smart lock according to some embodiments of the present disclosure. The process 2100 may be applied to a door lock. In some embodiments, the process 2100 may be performed by the smart lock control apparatus 1700.

In 2101, the processing device 112 may detect a door-unlocking action of an inner door operator of the smart lock. Operation 2001 may be performed by the exit detection unit 1701 in the smart lock control apparatus 1700.

For the detection of the door-unlocking action of the inner door operator of the smart lock, please refer to operation 1801 and the descriptions thereof. Specifically, the execution subject may detect the door-unlocking action of the inner door operator of the smart lock and sense that the user goes out by a designated sensor. For more descriptions, please refer to the embodiments in FIG. 20.

In 2102, in response to determining that the door-unlocking action of the inner door operator is detected, the processing device 112 may monitor an action of an outer door operator of the smart lock. Operation 2102 may be performed by the action monitoring unit 1702.

After determining that the door-unlocking action of the inner door operator is detected, the execution subject of this embodiment may monitor the action of the outer door operator to determine whether the user needs to lock the door to go out.

In 2103, in response to determining that a locking action of the outer door operator is detected, the processing device 112 may control the smart lock to enter an armed state.

For example, the locking action of the outer door operator is actually a door locking action that triggers the locking of the door. The locking action of the outer door operator may include lifting the outer door operator. In this case, a sensor on the outer door operator may sense the rotation of an outer door handle to determine that the lifting of the outer door operator is sensed. Obviously, for different types of smart locks, the door-locking actions of the outer door operators may also be different, which is not limited in the present disclosure.

In some embodiments, in response to determining that a user's going out action is detected, the processing device 112 may detect an action of a trigger component of the door lock within a preset time period. The execution subject of this embodiment may start a timer in response to the door-unlocking action, and monitor the action of the outer door operator within the preset time period of the timer. Correspondingly, in response to determining that the door-locking action of the outer door operator is detected within the preset time period of the timer, the execution subject may control the smart lock to be in the armed state.

As can be seen from FIG. 21, compared with the embodiments in FIG. 18, the door lock control method in this embodiment highlights that after detecting the door-unlocking action of the inner door operator and in response to determining that the door-locking action of the outer door operator is detected, the smart lock may automatically enter the armed state. According to the solution of the present disclosure, after opening the door by the inner door operator, the user may perform a door locking operation through the outer door operator, so that the smart lock may automatically enter the armed state, which improves the convenience and flexibility of the setting the armed state of the smart lock. Meanwhile, the smart lock can be triggered to enter the armed state only after the user goes out and locks the door through the outer door operator, which may also reduce the possibility of setting the smart lock to enter the armed state due to misoperation.

In some embodiments, in response to determining that the door-unlocking action of the inner door operator is detected, the processing device 112 may monitor the action of the lock body of the smart lock, and control the smart lock to enter the armed state in response to determining that the locking action of the lock body is detected. For example, the trigger component of the smart lock may also include a main bolt of the smart lock. The main bolt refers to a bolt in the smart lock that can be popped out only after the door is locked by the inner door operator or the outer door operator, or when a locking component (e.g., a locking verification component outside the door or a touch operation area, etc.) of the smart lock outside the door is operated to lock the door. In some embodiments, the main bolt may be a three-linked bolt controlled by the inner door operator and the outer door operator.

In such cases, in response to determining that the door-unlocking action of the inner door operator of the smart lock is detected, the processing device 112 may monitor the action of the main bolt of the smart lock. In response to determining that the main bolt pops out, the processing device 112 may control the smart lock to be in the armed state.

It should be understood that the main bolt needs to be controlled by the inner door operator or the outer door operator, and when the user locks the door inside the door, it is not necessary to open the door through the inner door operator first and then use the inner door operator to perform the locking operation to enable the main bolt to pop out, Therefore, after determining that the door-unlocking action of the inner door operator of the smart lock is detected, and if the main bolt pops out, it may be confirmed that the locking action is operated outside the door. In this case, it means that the user has gone out and the smart lock may be controlled to enter the armed state.

In some embodiments, in order to further reduce misoperation, the present disclosure may also monitor the action of the main bolt after determining that the door-unlocking action of the inner door operator of the smart lock is detected and the user goes out, so as to control the smart lock to enter the armed state after determining that the main bolt pops out.

It should be understood that in any of the above embodiments of the present disclosure, in response to determining that the user's going out behavior is detected, the timer may be started, and the action of the trigger component of the smart lock may be monitored within the preset time period set by the timer. In response to determining that the action of the trigger component satisfies a preset condition within the preset time period, the smart lock may be controlled to enter the armed state.

Figure 22:
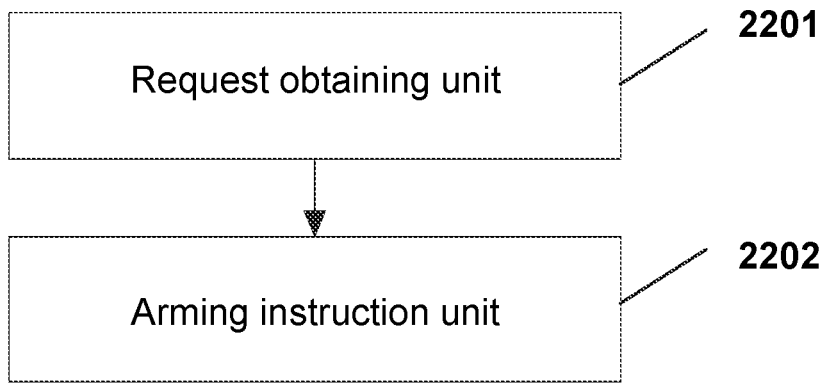
FIG. 22 is a schematic diagram of a smart lock control apparatus according to some embodiments of the present disclosure.

FIG. 22 is a schematic diagram of a smart lock control apparatus according to some embodiments of the present disclosure.

As shown in FIG. 22, the smart lock control apparatus 2200 may include a request obtaining unit 2201 and an arming instruction unit 2202. The request obtaining unit 2201 is configured to obtain an arming request sent by the smart lock. The arming request is generated by the smart lock after determining that the user's going out behavior is detected and/or when detecting that the action of the trigger component of the smart lock satisfies the preset condition. The arming instruction unit 2202 is configured to instruct the smart lock to enter the armed state in response to the arming request. In some embodiments, when the smart lock is in the armed state, in response to determining that an unlocking action inside the door is detected by the smart lock, an alarm operation may be performed.

Figure 23:
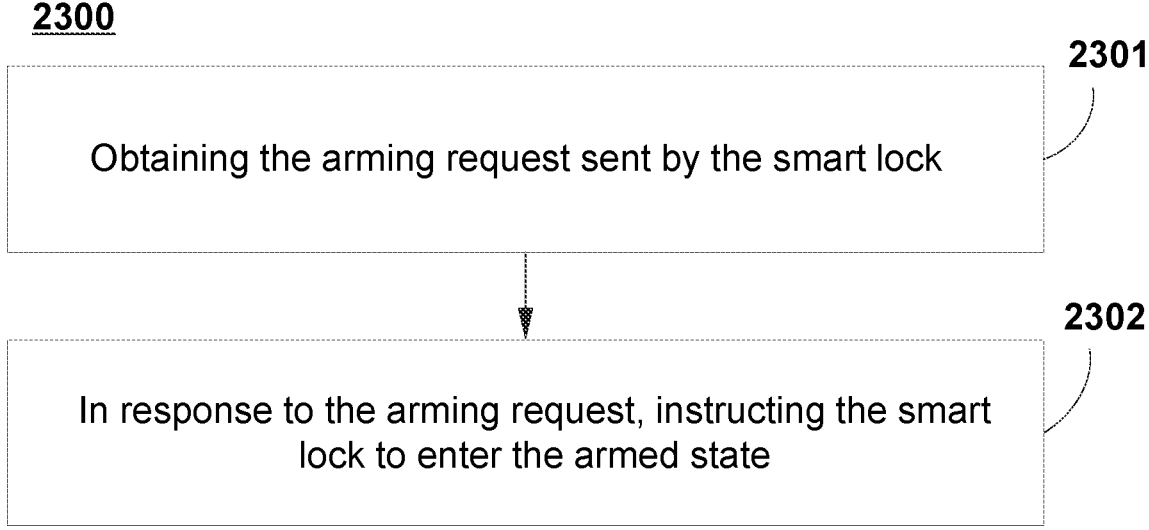
FIG. 23 is a flowchart illustrating an exemplary process for arming controlling of a smart lock according to some embodiments of the present disclosure.

For the specific processes of the request obtaining unit 2201 and the arming instruction unit 2202 and the technical effects brought by them, please refer to the relevant descriptions of the embodiments in operation 2301 and operation 2302 in FIG. 23, which may not be repeated here.

In some embodiments, the smart lock control apparatus 2200 may also include an arming deployment module. The arming deployment module is configured to instruct at least one smart device (e.g., at least one device of the first devices of the first set in FIG. 4) to be in the armed state in response to the arming request. When the smart device is in the armed state, if the smart device senses a preset abnormal condition, the smart device may perform a corresponding operation (e.g., an alarm operation) according to a preset rule corresponding to the abnormal condition.

In some embodiments, the smart lock control apparatus 2200 may further include a message obtaining unit, a doorbell alert unit, etc. The message obtaining unit may be used to obtain a doorbell reminder message sent by the smart lock. The doorbell reminder message is used to alert that someone touches the doorbell. The doorbell reminder message may be generated by the smart lock when the smart lock determines that a doorbell button associated with the smart lock is pressed. The doorbell alert unit may be used to send the doorbell reminder message to a user terminal device and/or other smart devices (e.g., a smart speaker, etc.) bound to the smart lock, so that the user terminal device and/or other smart devices output the doorbell reminder message.

In some embodiments, the doorbell alert unit may include a time detection subunit, a doorbell alert subunit, etc. The time detection subunit may be configured to detect whether the current time belongs to a doorbell do-not-disturb time period corresponding to the smart lock. The doorbell do-not-disturb time period corresponding to the smart lock may be configured by the user terminal device and stored in a server, the processing device 112, or a storage device of the smart lock. The doorbell alert subunit may be configured to send the doorbell reminder message to the user terminal device and/or other smart devices bound to the smart lock, and to send the doorbell reminder message to other smart devices if the current time does not belong to the doorbell do-not-disturb time period corresponding to the smart lock.

In some embodiments, the smart lock control apparatus 2200 may further include a power obtaining unit, an information storage unit, a query receiving unit, a power feedback unit, etc. The power obtaining unit may be configured to obtain a remaining power of a lock member module, a doorbell module, or other modules sent by the smart lock. The information storage unit may be configured to store the remaining power of the lock member module, the doorbell module, and/or other modules. The query receiving unit may be configured to receive a power query request sent by other smart devices or the user terminal device. The power feedback unit may be configured to feedback information of the remaining power of the lock member module, the doorbell module, and/or other modules to other smart devices or the user terminal device in response to the power query request, so that the other smart devices may play the information of the remaining power of the lock member module, the doorbell module, or the other modules.

FIG. 23 is a flowchart illustrating an exemplary process for arming controlling of a smart lock according to some embodiments of the present disclosure. The process 2300 may be applied to a door lock. In some embodiments, the process 2300 may be performed by the smart lock control apparatus 2200.

In some embodiments, the way for the smart lock to enter an armed state may include that the smart lock directly switches to the armed mode, or the smart lock sends an arming request to a server (e.g., the server 110, the server 1620, the server 1920, etc.) and enters the armed state based on the instruction of the server. For the convenience of description, the smart lock is controlled to enter the armed state through the server may be taken as an example.

In 2301, the server may obtain the arming request sent by the smart lock. Operation 2301 may be performed by the request obtaining unit 2201.

The arming request may be configured to request to instruct the smart lock to enter the armed state. In some embodiments, the arming request may be generated by the smart lock after determining that the user's going out action behavior is detected and the action of the trigger component of the smart lock satisfies the preset condition. As shown in the embodiments in FIG. 18, when the smart lock determines that the action of the trigger component satisfies the preset condition in response to the user's going out action behavior, the smart lock may generate the arming request.

In some embodiments, the server may directly obtain the arming request sent by the smart lock. In some embodiments, the server may obtain the arming request sent by the smart lock via a short-range wireless communication gateway equipped with communication connection with the smart lock.

In 2302, in response to the arming request, the server may instruct the smart lock to enter the armed state. When the smart lock is in the armed state, if a preset action is detected by the smart lock, the smart lock may perform an alarm operation.

For more descriptions of the smart lock entering the armed state, please refer to FIG. 21 and the descriptions thereof, which may not be repeated here.

The embodiment mainly focuses on controlling the smart lock to enter the armed state by the server, so that the server can obtain the state of the smart lock in time, and the server is enabled to reasonably control other smart devices based on the armed state of the smart lock.

Figure 24:
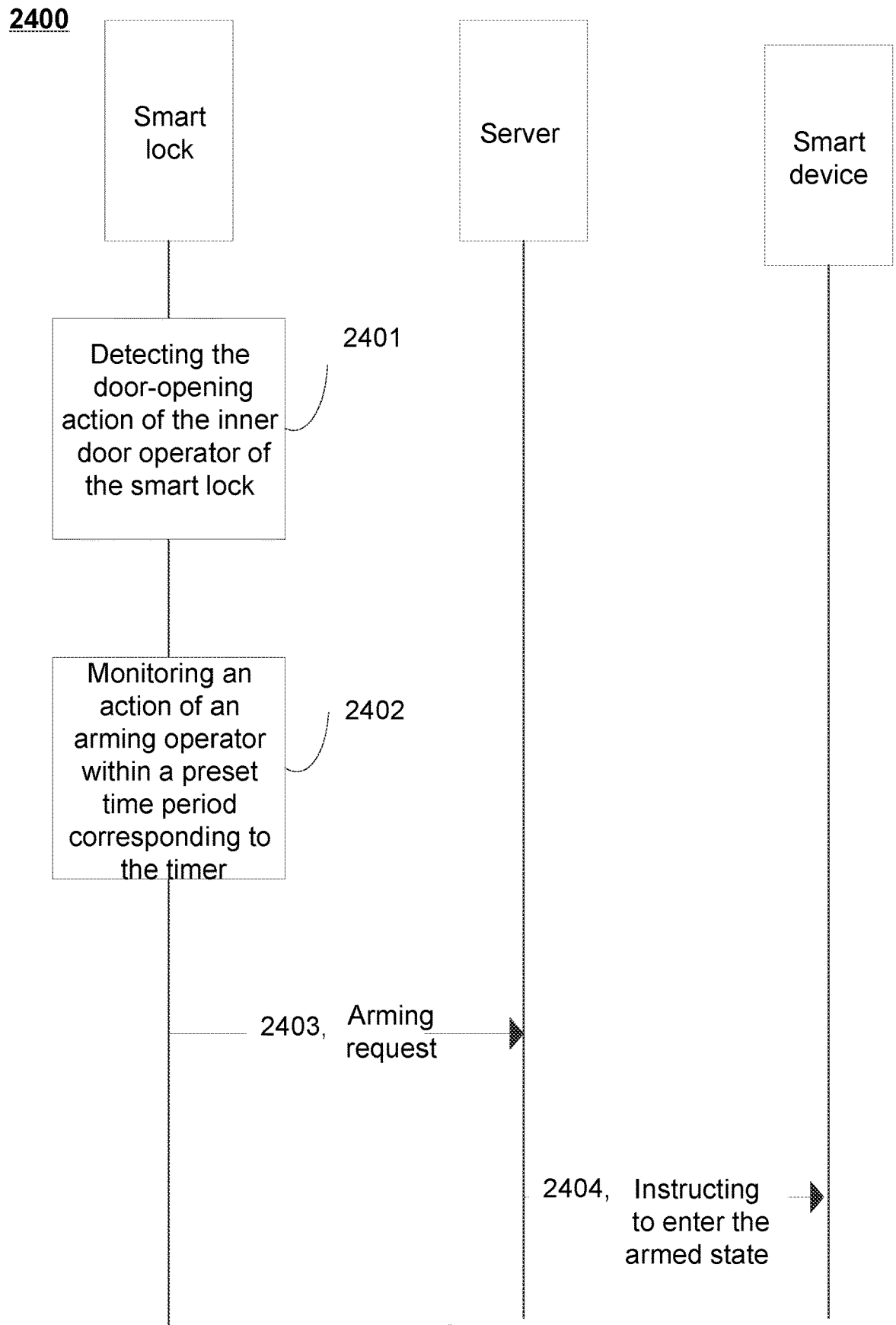
FIG. 24 is a flowchart illustrating an exemplary process for controlling a smart lock according to some embodiments of the present disclosure.

FIG. 24 is a flowchart illustrating an exemplary process for controlling a smart lock according to some embodiments of the present disclosure.

In 2401, the smart lock may detect the door-unlocking action of the inner door operator of the smart lock. In 2402, the smart lock may start the timer in response to determining that the door-unlocking action of the inner door operator is detected, and monitor an operation action of an arming operator within a preset time period corresponding to the timer. It should be understood that if the timer is not started but the action of the arming operator is directly monitored, such a manner is also applicable to this embodiment. It should be noted that for ease of understanding, the embodiments of the present disclosure take the detection of the user's going out action being the detection of the door-unlocking action of the inner door operator as an example, and take the trigger component being the arming operator as an example for description. However, in practical applications, other ways of detecting the user's going out action behavior mentioned in the previous embodiments (e.g., operation 1801 in FIG. 18, operation 2001 in FIG. 20, etc.) are also applicable to this embodiment. Correspondingly, the case where the action of the trigger component satisfies the preset condition being the locking action of the outer door operator, the main bolt, or the lock body is also applicable to this embodiment.

In 2403, in response to determining that a touch/press action of the arming operator is detected within the preset time period, the smart lock may control the smart lock to enter the armed state, and send an arming request to the server. In this embodiment, the smart lock controlling itself to enter the armed state may be taken as an example for illustration, but the sending the arming request to the server to make the server instruct the smart lock to enter the armed state is also applicable to this embodiment. In this embodiment, the arming request is used to request to control the smart device to enter the armed state.

In 2404, the server may instruct at least one smart device to be in the armed state. In this embodiment, the smart device may be a smart device installed in a room corresponding to the smart lock. The smart device may include a smart speaker, a camera, an alarming device, a projector, etc., or a combination thereof.

In some embodiments, when the smart device is in the armed state, if the smart device senses the preset abnormal condition, the smart device may perform an alarm operation.

In some embodiments, the abnormal condition may include an anti-theft abnormal behavior. If the smart device senses the set anti-theft abnormal behavior, it means that there is a preset behavior such as an illegal entry behavior. For example, taking the smart device is a smart camera as an example, when the smart camera is in the armed state, the smart camera may continuously acquire indoor images and analyze the indoor images. If it is determined that there is a user or suspicious person based on the indoor image analysis, the anti-theft abnormal behavior can be determined, and the alarm operation may be performed. For detailed descriptions about the abnormal condition, please refer to FIG. 14 and the descriptions thereof.

The manner in which the smart device performs the alarm operation is similar to the manner in which the smart lock performs the alarm operation. For example, the smart device may send an alarm message, etc., to the bound user terminal device. For detailed descriptions about the processing of the detected abnormal condition, please refer to FIG. 18 and the descriptions thereof.

In some embodiments shown in FIG. 24, after the smart device enters the armed state, the arming request is sent to the server, so that the server can control at least one smart device to be in the armed state based on the arming request. Then the smart device may sense the set anti-theft abnormal behavior and perform the alarm operation, thereby realizing a more comprehensive and reliable anti-theft arming, which is conducive to reducing abnormal conditions such as indoor theft.

Figure 25:
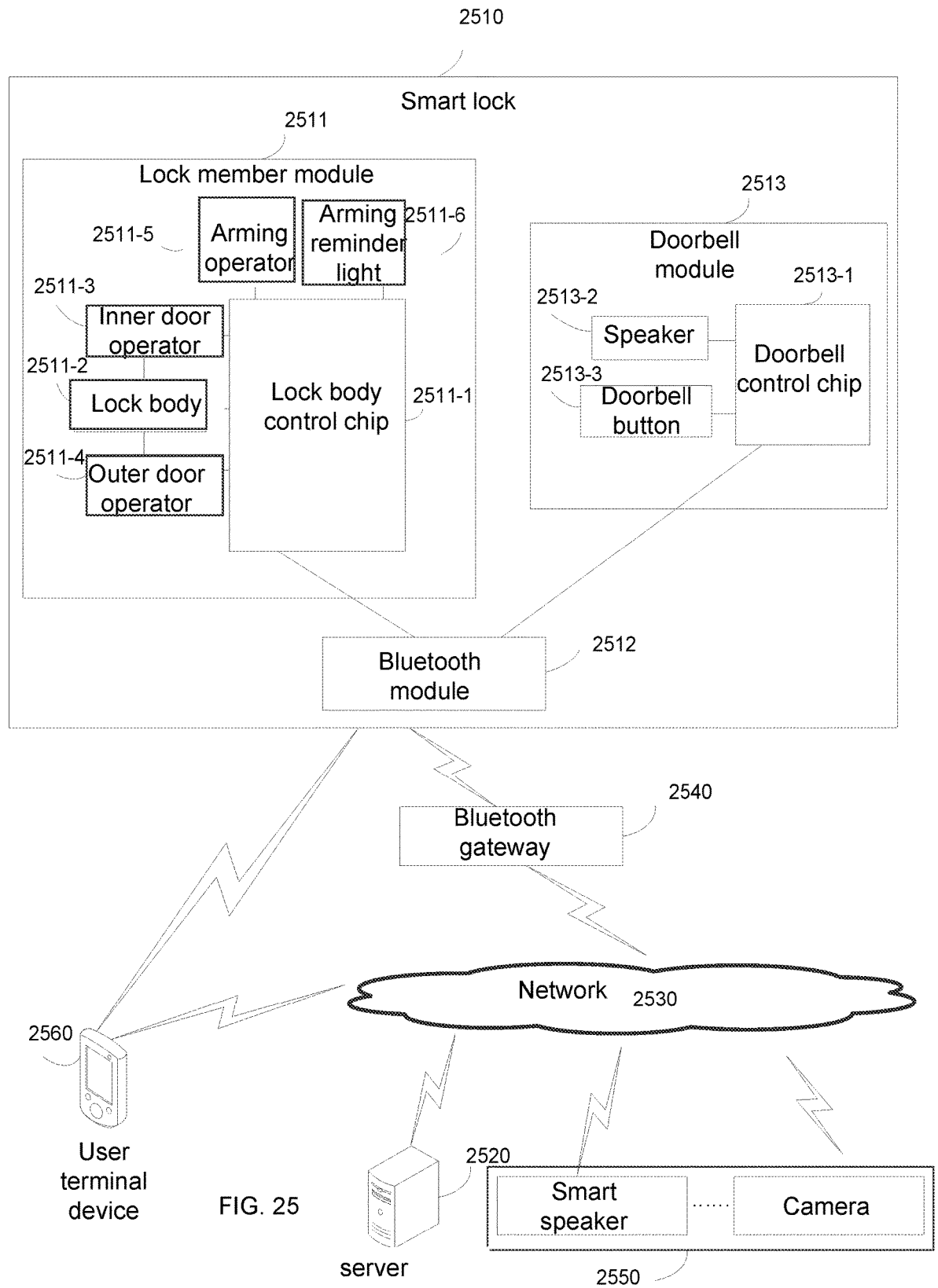
FIG. 25 is a schematic diagram illustrating an application scenario of a smart lock control system according to some embodiments of the present disclosure.

FIG. 25 is a schematic diagram illustrating an application scenario of a smart lock control system according to some embodiments of the present disclosure.

As shown in FIG. 25, the smart lock control system 2500 may include a smart lock 2510, a server 2520, a network 2530, a Bluetooth gateway 2540, a smart device 2550, and a user terminal device 2560. In some embodiments, one or more components in the control system 2500 may be connected in a wired or wireless manner.

In some embodiments, the smart lock 2510 may include a lock member module 2511, a Bluetooth module 2512, and a doorbell module 2513.

In some embodiments, the lock member module 2511 may include a lock body control chip 2511-1, a lock body 2511-2, and components connected to the lock body, such as an inner door operator 2511-3, an outer door operator 2511-4, an arming operator 2511-5, and an arming light 2511-6. For detailed descriptions about the lock member module 2511, please refer to the lock member module 1911 in FIG. 19 and the descriptions thereof.

In some embodiments, the doorbell module 2513 may include a doorbell control chip 2513-1, a speaker 2513-2, and a doorbell button 2513-3. The doorbell control chip 2513-1 is at least configured to control the speaker 2513-2 to play a ringtone in response to a button action of the doorbell button 2513-3.

A communication module of the smart lock 2510 is the Bluetooth module 2512. Correspondingly, the short-range wireless communication gateway of the smart lock control system 2500 is the Bluetooth gateway 2540. In some embodiments, the Bluetooth gateway 2540 may establish a long-range communication connection with the server 2520. In some embodiments, the Bluetooth module 2512 is connected to the lock body control chip 2511-2 of the lock member module 2511 and the doorbell control chip 2513-1 of the doorbell module 2513. In some embodiments, the Bluetooth gateway 2540 may receive information broadcast by the smart lock within a specified range via Bluetooth.

In some embodiments, the server 2520 may establish a communication connection with the communication module (i.e., the Bluetooth module 2512) of the smart lock 2510 via the network 2530. The Bluetooth gateway 2540 may forward the information broadcast by the smart lock to the server 2520. The smart lock 2510 may realize the long-range communication with the server 2520 via the Bluetooth gateway 2540.

The user terminal device 2560 may establish a communication connection with the server 2520 via the network 2530. For example, an application for establishing a communication connection with the server 2520 may be installed and running on the user terminal device 2560, and the communication connection between the user terminal device 2520 and the server 2520 may be implemented by the application. In some embodiments, the user terminal device 2560 establishes a binding with the smart lock 2510 and the Bluetooth gateway 2540, i.e., establishes a binding relationship. The establishing the binding relationship refers to configuring an association relationship between the two devices. For detailed descriptions about the user terminal device, please refer to the user terminal device 140 in FIG. 1 and the descriptions thereof.

In the smart lock control system 2500 shown in FIG. 25, the smart lock 2510 is configured to send the doorbell reminder message to the server 2520 when the doorbell button 2513-3 associated with the smart lock 2510 is detected to be pressed. Correspondingly, in response to receiving the doorbell reminder message, the server 2520 sends the doorbell reminder message to the user terminal device 2560 bound to the smart lock, where the doorbell reminder message is used to prompt that someone presses the doorbell.

In some embodiments, the smart device 2550 may at least include a smart speaker. In some embodiments, the user terminal device 2560 may configure a doorbell alert rule to the server 2520, such as a loudness of the doorbell alert sound, a doorbell alert duration, a doorbell do-not-disturb time period of the doorbell alert, etc. The server 2520 may send the doorbell reminder message to the smart speaker and the user terminal device 2560 according to the configured doorbell alert rule.

Figure 26:
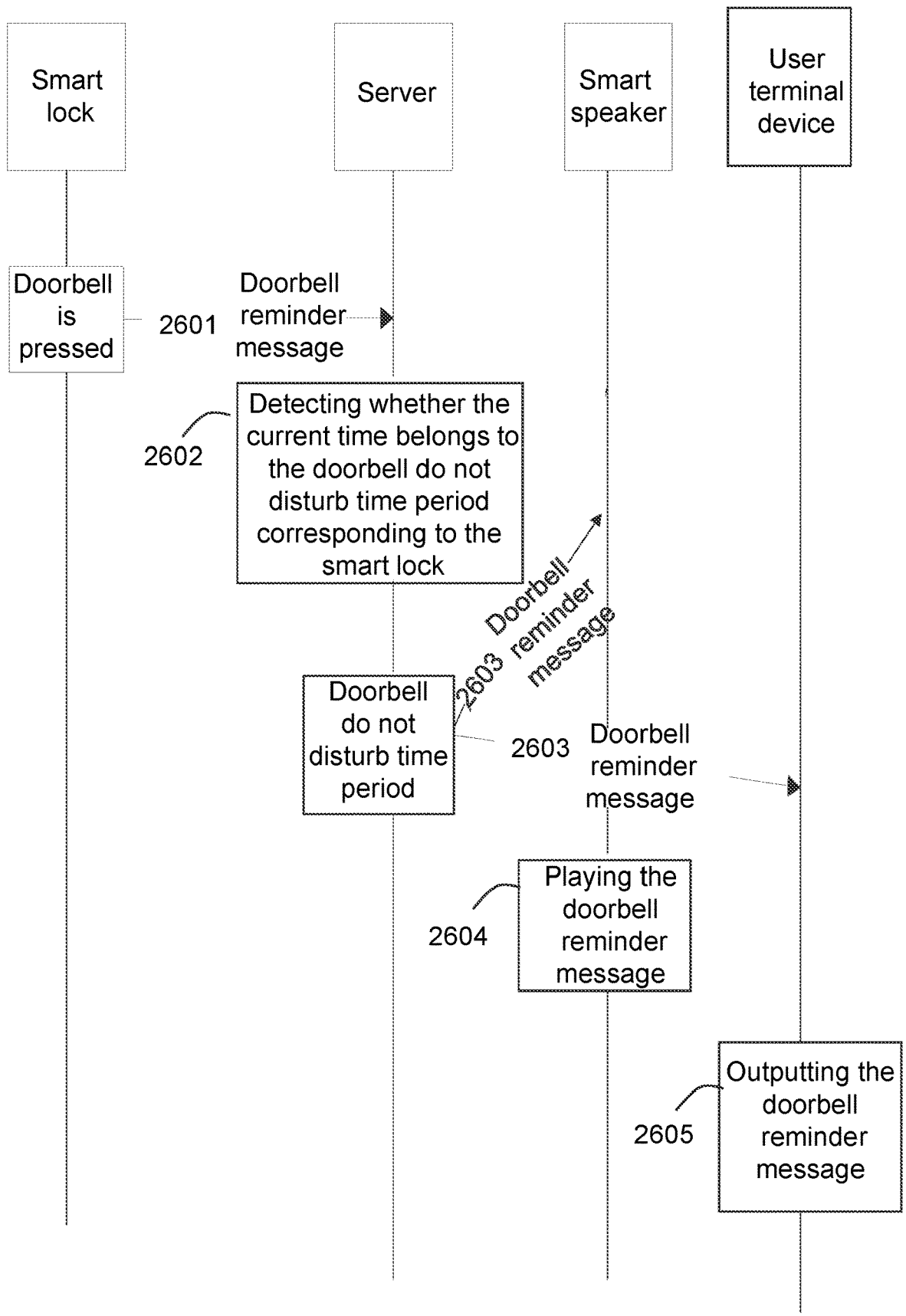
FIG. 26 is a flowchart illustrating an exemplary process for doorbell alerting of a smart lock according to some embodiments of the present disclosure.

FIG. 26 is a flowchart illustrating an exemplary process for doorbell alerting of a smart lock according to some embodiments of the present disclosure.

In 2601, a smart lock sends a doorbell reminder message to a server when the smart lock determines that a doorbell button associated with a smart lock is pressed.

In some embodiments, the doorbell reminder message is used to prompt that someone presses the doorbell. For example, the doorbell reminder message may be a message including a doorbell ringtone, or may be a message including a prompt for prompting that the doorbell is pressed, etc. For example, the smart lock may generate the doorbell reminder message after detecting that the doorbell button is pressed through a doorbell control chip in the doorbell module. Then, the doorbell control chip may transmit the doorbell reminder message to the server through a communication module in the smart lock.

In some embodiments, the user terminal device may also configure a doorbell do-not-disturb time period in the smart lock. The doorbell do-not-disturb time period refers to a time period preset by the user through the user terminal device that the user does not want to be disturbed by the doorbell. For example, assuming that the user does not want to be disturbed by the doorbell between 22:00 and 5:00 every day, the doorbell do-not-disturb time period may be set as the time period between 22:00 and 5:00. Correspondingly, after the smart lock determines that the doorbell button is pressed, if it is detected that the current time does not belong to the preset doorbell do-not-disturb time period, the doorbell ringtone may be outputted through the speaker of the smart lock. If the current time belongs to the preset doorbell do-not-disturb time period, the speaker may not be controlled to output the doorbell ringtone.

In 2602, the server may detect whether the current time belongs to the doorbell do-not-disturb time period corresponding to the smart lock. In some embodiments, the doorbell do-not-disturb time period corresponding to the smart lock may be manually determined by the user, or automatically determined by the processing device 112 or the server of the smart lock control system, or determined by the processing device 112 or the server of the smart lock control system. For example, the doorbell do-not-disturb time period may be configured by the user terminal device bound to the smart lock and stored in the server.

In some embodiments, the user terminal device may configure a doorbell alert rule of the smart lock bound to the user terminal device. The doorbell alert rule may include the doorbell do-not-disturb time period when the user does not want to be disturbed. Of course, the user terminal device may also set information of smart devices such as the smart speaker that need to output the doorbell reminder message. In some embodiments, the server may store doorbell alert rules corresponding to different smart doorbells. Accordingly, after the server receives the doorbell reminder message of the smart lock, the server may query the doorbell alert rule of the smart lock, and obtain the doorbell do-not-disturb time period in doorbell alert rule.

In 2603, if the server determines that the current time does not belong to the doorbell do-not-disturb time period corresponding to the smart lock, the server may send the doorbell reminder message to the user terminal device and the smart speaker bound to the smart lock. In some embodiments, the smart speaker bound to the smart lock may be a pre-bound smart speaker located in the room corresponding to the smart lock.

In 2604, the smart speaker may play the doorbell reminder message. In some embodiments, the smart speaker may play the doorbell reminder message by voice or other means, so that the user may know in time that the doorbell is pressed. In some embodiments, if the smart speaker has a display screen, a prompt content corresponding to the doorbell reminder message may also be outputted on the display screen when the doorbell reminder message is broadcast by voice.

In 2605, the user terminal device may output the doorbell reminder message. In this embodiment, the user terminal device may output the doorbell reminder message on the display screen, or may output the doorbell reminder message by means of voice, or output the doorbell reminder message by means of these two ways at the same time, or output the doorbell reminder message in other ways.

In the embodiments of FIG. 26, after determining that the doorbell button is pressed, the smart lock may send the doorbell reminder message to the server, so that the server may send the doorbell reminder message to the user terminal device and the smart speaker, and the doorbell reminder message may be broadcast timely to the user by the user terminal device and the smart speaker. Thus, the user can know timely the information that the doorbell is pressed, thereby reducing the situation that the user cannot hear the doorbell in time or even cannot hear the doorbell due to the small sound outputted from the speaker of the doorbell.

In some embodiments, the smart lock may send the doorbell reminder message to the server via the short-range wireless communication gateway. Specifically, the short-range wireless communication module of the smart lock broadcasts the doorbell reminder message, and the short-range wireless communication gateway transmits the doorbell reminder message to the server after receiving the doorbell reminder message broadcast by the smart lock.

Figure 27:
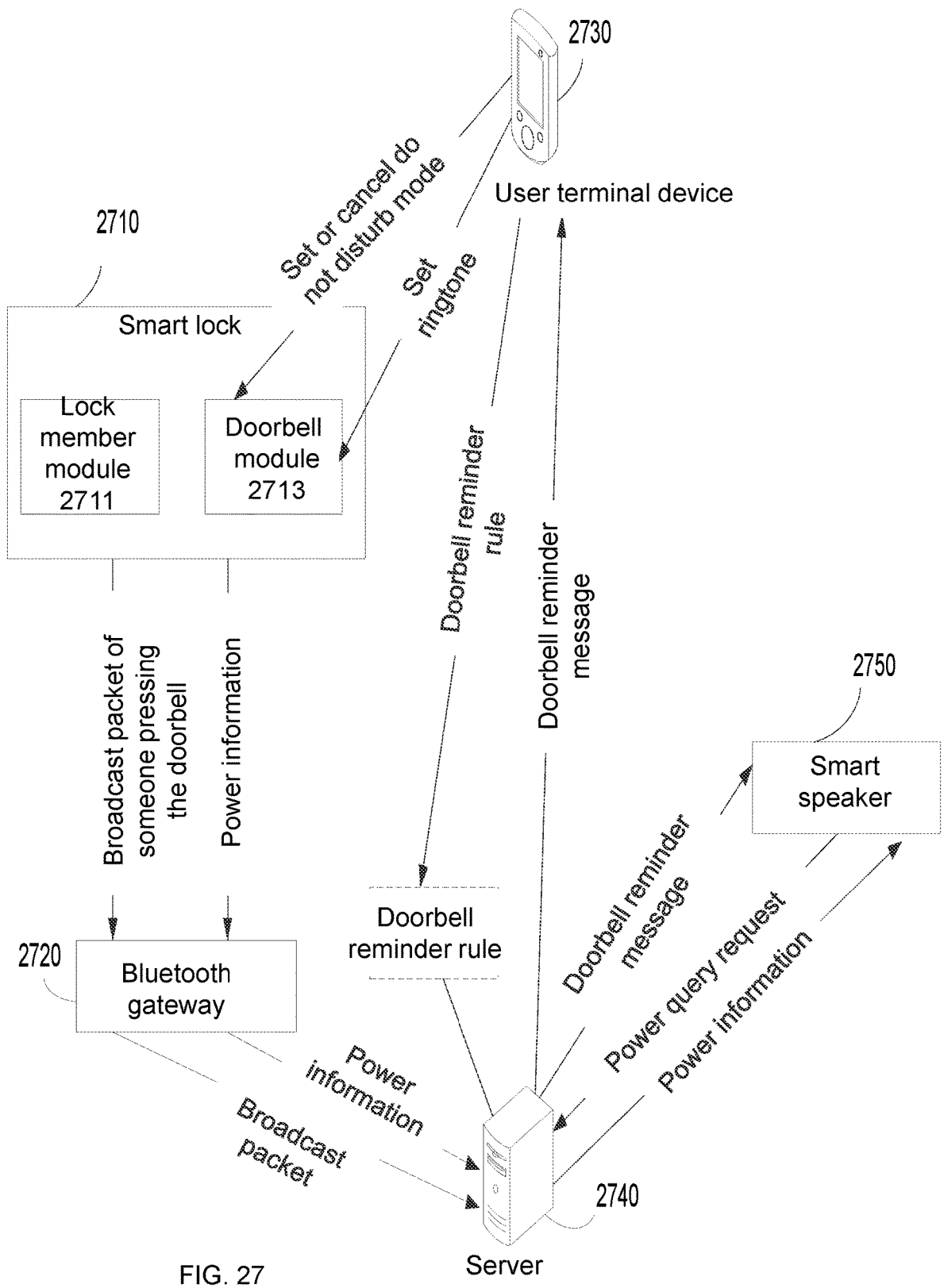
FIG. 27 is a schematic diagram illustrating a doorbell reminder system of a smart lock according to some embodiments of the present disclosure.

FIG. 27 is a schematic diagram illustrating a doorbell reminder system of a smart lock according to some embodiments of the present disclosure. As shown in FIG. 27, the smart lock 2710 may include a doorbell module 2713 and a lock member module 2711. For descriptions of the doorbell module 2713 and the lock member module 2710, please refer to the doorbell module 2513 and the lock member module 2511 in FIG. 25 and related descriptions thereof.

In some embodiments, the smart lock 2710 may communicate with the server 2740 through a short-range wireless communication gateway. The short-range wireless communication gateway may be a Bluetooth gateway 2720, and correspondingly, the communication module of the smart lock 2710 may be a Bluetooth module. The Bluetooth gateway 2720 may be configured with information such as an address of the server 2740.

In some embodiments, the user terminal device 2730 may establish a binding relationship with the smart lock 2710. The user terminal device 2730 may configure a doorbell reminder rule in the server 2740. For example, the user terminal device 2730 may send a configuration request to the server 2740. The configuration request carries a doorbell do not disturb time period corresponding to the smart lock 2710, and information related to configuring a smart speaker as a doorbell reminder device. The server 2740 may respond to the configuration request and save the configuration information in the configuration request as the doorbell reminder rule of the smart lock 2710.

In some embodiments, the user terminal device 2730 may configure the doorbell do not disturb time period in the doorbell of the smart lock 2710. The user terminal device 2730 may control the doorbell module 2713 of the smart lock 2710 to turn on or off a do not disturb mode, and set a doorbell ringtone corresponding to the doorbell module 2713 in the smart lock. For example, the user terminal device 2730 may set the doorbell module 2713 of the smart lock 2710 to be silent during the doorbell do not disturb time period. As another example, the user terminal device 2730 may set the doorbell module 2713 to keep silent at any time.

In some embodiments, after the doorbell of the smart lock 2710 detects that the doorbell button is pressed, a broadcast packet in a set format may be broadcast through the Bluetooth module. In some embodiments, the broadcast packet may include an identifier of the doorbell of the smart lock and a doorbell reminder message for prompting that the doorbell is pressed. After receiving the broadcast packet, the Bluetooth gateway 2720 may transmit the broadcast packet to the server 2740.

After receiving the broadcast packet, the server 2740 may obtain the doorbell reminder message and the identifier of the doorbell of the smart lock 2710 in the broadcast packet. The server 2740 may query the doorbell reminder rule corresponding to the doorbell of the smart lock 2710 according to the identifier of the smart doorbell in the broadcast packet. If the current moment does not belong to the doorbell do not disturb time period set in the doorbell reminder rule, the server 2740 may send the doorbell reminder message to the user terminal device bound to the doorbell of the smart lock and other smart devices set in the doorbell reminder rule (e.g., a smart speaker 2750, etc.) to make other smart devices perform corresponding operations, for example, making the smart speaker 2750 play the doorbell reminder message. If the current moment belongs to the set doorbell do not disturb time period, the doorbell reminder message may not continue to be sent to other smart devices and the user terminal device.

In some embodiments, after detecting that the doorbell button is pressed, the smart lock 2710 may send the doorbell reminder message to the server 2740, so that the server 2740 may send the doorbell reminder message to the user terminal device bound to the smart lock to prompt the user that someone presses the doorbell, thereby reducing the situation that the user cannot know that the doorbell is pressed in time. In addition, the doorbell do not disturb time period corresponding to the smart lock 2710 may be set in the smart lock 2710 and the server 2740 through the user terminal device 2730, so that the server 2740 and the smart lock 2710 only perform operations related to doorbell reminding during the time other than the doorbell do not disturb time period, which may prevent the doorbell from interfering to the user.

In some embodiments, both the lock member module 2711 and the doorbell module 2713 of the smart lock 2710 require power supply. In some embodiments, the lock member module 2711 and the doorbell module 2713 may have different power supplies. In this case, the smart lock 2710 may also obtain the remaining power of the lock member module 2711 and/or the remaining power of the doorbell module 2713, and send the remaining power of the lock member module 2711 and/or the remaining power of the doorbell module 2713 to the server 2740. For example, the smart lock 2710 may send information of the remaining power of the lock member module 2711 and the remaining power of the doorbell module 2713 to the server 2740 through the Bluetooth gateway 2720. The server 2740 may save the remaining power of the lock member module 2711 and/or the remaining power of the doorbell module 2713 sent by the smart lock 2710.

In some embodiments, the user may send a power query instruction of the lock member module 2711 and/or the doorbell module 2713 to other smart devices (e.g., the smart speaker 2750). In response to the user's power query instruction, the other smart devices may send a power query request to the server 2740. The power query request may be used to request a power status corresponding to the smart lock. In response to the power query request, the server 2740 may query the remaining power of the lock member module 2711 and/or the remaining power of the doorbell module 2713 of the smart lock 2710, and send information of the remaining power of the lock member module 2711 and the remaining power of the doorbell module 2713 to the other smart devices. Correspondingly, the other smart devices may play or display the information of the remaining power of the lock member module 2711 and/or the remaining power of the doorbell module 2713.

In some embodiments, the smart lock 2710 may detect whether there is an abnormal condition. In response to determining that the abnormal condition is detected, the processing device 112 or the server 2740 may control the smart lock 2710 and/or the other smart devices to perform a corresponding operation according to a preset rule corresponding to the abnormal condition.

In some embodiments, the smart lock 2710 may also be provided with a temperature sensor. In some embodiments, the temperature sensor may be a device independent of a lock body control chip (e.g., the lock body control chip 2511-1), or may be integrated in the lock body control chip.

In some embodiments, the temperature sensor may be used to sense indoor temperature. For example, the smart lock 2710 may have two panels including an outer panel installed outdoors and an inner panel installed indoors. In this case, in order to monitor the indoor temperature more accurately, the temperature sensor may be arranged on the inner panel and as close as possible to the surface of the inner panel, so that a temperature detected by the temperature sensor is closer to an ambient temperature of the inner panel, and the specific position is not limited.

In order to detect indoor abnormalities (e.g., fire or excessive temperature) in time, and in response to detecting the indoor abnormalities, the processing device 112 described in the present disclosure may also activate one or more operations (e.g., controlling the smart lock 2710 to perform an unlocking operation, activating indoor and outdoor alarms, sending an alarm to one or more user terminal devices 2730 bound to the smart lock 2710, the server (e.g., the processing device 112), and/or security agencies) to open the door and prompt and/or assist the user to leave in time.

When the user is out (e.g., when the smart lock is in the armed state), in order to timely obtain possible risks caused by situations such as an excessive indoor temperature, the smart lock 2710 may send a risk alarm to the user terminal device 2730 bound to the smart lock 2710 when the smart lock 2710 determines that the indoor temperature exceeds a temperature threshold. The risk alarm may be used to prompt the user that the indoor temperature has a potential safety risk.

In some embodiments, in response to determining that the indoor temperature exceeds the temperature threshold, the smart lock 2710 may also output a risk alarm ringtone through a speaker, or control a light connected to the smart lock through the smart lock 2710 for prompting. It could be understood that after the smart lock 2710 is in the armed state, the user terminal device 2730 bound to the smart lock may also release the armed state of the smart lock 2710 as required. For example, the user may release the armed state through biometric verification, or the user may send an arming unlocking instruction to the smart lock by the user terminal device to release the armed state of the smart lock, etc.

After the smart lock is in the armed state, if there is an abnormal unlocking behavior such as unlocking from indoors or outdoors by an illegal person other than the user (e.g., an administrator, an owner, etc.) bound to the smart lock 2710, risks may be brought to indoor properties. In order to enable the user to discover and deal with the abnormal unlocking behavior in time, when the smart lock 2710 is in the armed state and if the abnormal unlocking behavior such as lock picking and abnormal unlocking by an illegal person through the inner door operator, the outer door operator, or other actions for rotating the lock body are detected, the smart lock 2710 may also acquire video images by a camera device in the smart lock, and mark the acquired video images as abnormal condition images. In some embodiments, the smart lock 2710 may also send an alarm message to the user terminal device 2730 bound to the smart lock 2710. The alarm message may be used to prompt the user that there is an unlocking action.

In some embodiments, after the smart lock 2710 is in the armed state and the unlocking action is detected, the smart lock may acquire the images and mark the images as the abnormal condition images, which is helpful for subsequent timely acquisition and analysis of images including unlocking by illegal persons. In some embodiments, after the smart lock 2710 sends the alarm message to the user terminal device 2730 bound to the smart lock, if a video viewing instruction sent by the user terminal device 2730 is detected, the smart lock 2710 may also establish a live video channel between the smart lock 2710 and the user terminal device 2730. For example, the smart lock 2710 may establish the live video channel with an application on the user terminal device 2730 through the server 2740, etc. Correspondingly, the smart lock 2710 may transmit the video images acquired by the smart lock 2710 to the user terminal device 2730 through the live video channel. In some embodiments, a duration of establishing the live video channel between the smart lock 2710 and the user terminal device 2730 may be set as required. For example, the maintenance duration of the live video channel may be 4 seconds, 10 seconds, 30 seconds, 1 minute, 5 minutes, etc.

In some embodiments, the doorbell reminder system of the smart lock may also be used to arm a safe-box, a gun cabinet, or the like. In some embodiments, when the user opens a cabinet door and then closes the cabinet door within a limited time, the system may perform arming by manually triggering a safety trigger component by the user. In some embodiments, the system may automatically perform arming when the user opens the cabinet door and then closes and locks the cabinet door within the limited time.

In some embodiments, the specific workflow of the system for arming the safe-box, the gun cabinet, etc., may include the following steps (the safe-box is taken as an example for description below).

(1) An action behavior of opening a smart safe-box of the user may be detected.

In some embodiments, the system may sense the action behavior of the user by at least one sensor of the smart safe-box, and obtain the action behavior of opening the smart safe-box of the user. The user's action behavior of opening the smart safe-box may include one or more actions of opening the door of the smart safe-box of the user, an unlocking action of the lock, a user's body part passing through a cabinet frame, etc.

(2) In response to the user's action behavior of opening the smart safe-box, an action of the safety trigger component of the smart safe-box may be monitored.

In some embodiments, after detecting the user's action behavior of opening the smart safe-box, the above-mentioned execution subject may start monitoring the action of the safety trigger component, so as to subsequently determine whether the smart safe-box needs to enter an armed state to prevent a preset action such as moving the box body, knocking the box body, entering wrong password several times, etc.

In some cases, the safety trigger component may be an arming operator arranged in the smart safe-box for triggering to enter the armed state. Whether the user wants to enter the armed state may be represented by the user's operation action on the arming operator.

In some cases, the safety trigger component may also be a handle outside the box body of the smart safe-box or a main lock body. It could be understood that after the user closes the smart safe-box, using the handle outside the box body or other means to control the lock body to perform the locking action, so that the main lock body pops out, which means that the user has completed the use of the smart safe-box. In this case, it is necessary to prevent illegal persons such as thieves from violently unlocking and stealing the smart safe-box.

In some embodiments, the safety trigger component may be an identification device of the smart safe-box. Arming is performed by verifying an identity and/or authority of a current operator through the identification device. For example, the user may trigger the safety trigger component by tapping a certain area of an outer surface of the smart safe-box with a predetermined number and/or frequency. As another example, the user may trigger the safety trigger component by performing identity and/or authority verification by a biometric identification device such as a fingerprint verification device, a face verification device, a voice recognition device, etc., arranged on the outer surface of the smart safe-box.

In some cases, the detecting the action of the safety trigger component may also be monitoring a control instruction sent by the user terminal device of the smart safe-box for controlling the action of the safety trigger component. For example, the user terminal device may send an action instruction for triggering the safety trigger component to the smart safe-box through an application related to the smart safe-box installed on the user terminal device.

In some embodiments, the operation of monitoring the safety trigger component of the smart safe-box may be performed before the user closes the safe-box, when the user closes the safe-box, and/or after the user closes the safe-box.

(3) The smart safe-box may be controlled to be in the armed state if it is detected that the action of the safety trigger component satisfies a predetermined condition. In some embodiments, the controlling the smart safe-box to be in the armed state may be performed after the user closes the safe-box.

In some embodiments, the predetermined condition to be satisfied by the action of the trigger component is a condition indicating that the current state meets the condition for entering the armed state. In practical applications, the predetermined condition may vary depending on the trigger component.

After the smart safe-box is in the armed state, the smart safe-box may monitor the lock body and related components of the smart safe-box regularly or in real time, and perform an alarm operation if a preset action (e.g., moving the box body) is monitored.

Taking the preset action is moving the box body as an example, in this embodiment, the way that the smart safe-box detects the moving of the box body may include one or more of the following situations: sensing shaking of the box body by sensors of the smart safe-box; sensing changes in position coordinates by the sensors of the smart safe-box; detecting other movement operations other than moving the box body. Of course, there may be other possible situations for the smart safe-box to determine the moving of the box body, which is not limited in this disclosure.

In some embodiments, an arming prompting mode may be a mode that needs to be performed by a local device such as an arming prompting speaker, an arming prompting display screen, or the like. In some embodiments, the arming prompting mode may be a mode that requires a network, such as a short message reminder, a message push reminder in an APP, or the like.

In some embodiments, the smart safe-box may alarm (e.g., sending an alarm to the user) when the lock is damaged by violent unlocking, foreign objects entering the lock body, or the like. In some embodiments, the smart safe-box may alarm (e.g., sending the alarm to the user) when a wrong password entered several times, the face recognition fails, or the like. In some embodiments, the smart safe-box may alarm (e.g., sending the alarm to the user) in case of damaging the box body, such as knocking the box body, attaching foreign objects to the box body, the temperature of the box body being too high, etc. In some embodiments, the smart safe-box may alarm (e.g., sending the alarm to the user) when the box body is moved, shaken, etc. In some embodiments, a security device of the smart safe-box may alarm (e.g., sending the alarm to the user) when the security device detects an abnormal condition. For example, a camera may alarm (such as sending the alarm to the user) when the camera detects that someone is approaching, or an infrared device may alarm (such as sending the alarm to the user) when the infrared device detects that someone is close to the smart safe-box. In some embodiments, the smart safe-box may also send the alarm to contacts preset by the user. In some embodiments, the smart safe-box may also send the alarm to a police officer.

The system can well protect the smart safe-box. By setting the lock of the smart safe-box to prevent the smart safe-box from being opened by destroying the lock, the reliability and safety of the lock are increased. By setting the box body of the smart safe-box, theft and/or destruction of the box body is prevented, and the intelligence and safety of the box body are increased. In addition, the system can also be connected to a network, if the lock enters the armed state, the box body can also be called to enter the armed state. Overall, the reliability, intelligence, and safety of the smart safe-box are increased, and the safety of users' property is protected. After the user opens the box door and then closes the box door within the limited time, the user can manually perform the arming through the safety trigger component without locking the lock. If the user performs the locking, the smart safe-box is automatically armed. In addition, the system also allows the user to send arming and disarming commands via the network, which increases the convenience of the user and can be applied to a variety of application scenarios.

After the system is armed, the system may be disarmed manually or automatically at any time. In some embodiments, the smart safe-box may be automatically disarmed after opening the box door. In some embodiments, the smart safe-box may be manually disarmed after entering the specified password. For example, by entering a special password for disarming in a password input area, the box door may be disarmed without opening the box door. In some embodiments, the smart safe-box may also be disarmed by receiving a disarming instruction sent by the user terminal device.

Figure 28:
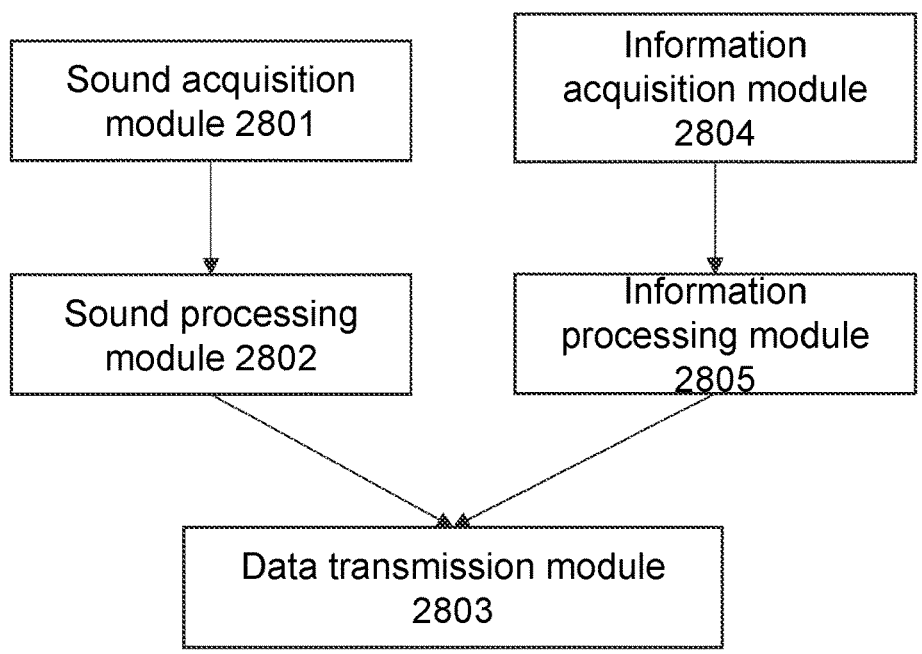
FIG. 28 is schematic diagram illustrating an exemplary system architecture of an information processing apparatus according to some embodiments of the present disclosure.

FIG. 28 is schematic diagram illustrating an exemplary system architecture of an information processing apparatus according to some embodiments of the present disclosure.

In some embodiments, the system 2800 may acquire sound and/or other information of various entities, and process the acquired information, e.g., process the information based on a database and/or a machine learning model, to obtain processing results corresponding to the entities. The system 2800 may further push the processing results to a user terminal device (e.g., a first terminal device, a second terminal device, a third terminal device, etc.).

In some embodiments, the system 2800 may be arranged on a certain device as a whole. For example, the system 2800 may be arranged on a user terminal device (e.g., a mobile phone) to acquire and process sound and/or other information on the user terminal device, and push the processing results to the user terminal device or other user terminal devices. In some embodiments, the system 2800 may be arranged separately. For example, the sound and/or other information acquired in a city A may be transmitted to a processing device in a city B for processing, and then the processing result may be transmitted to a terminal device in a city C via the network.

In some embodiments, the system 2800 may be applied to identify which device and/or sensor has sent an alarm according to sound and/or other information of the device and/or sensor. For example, the system 2800 may be applied to fire monitoring, vehicle-mounted device monitoring, emergency warning, behavior monitoring, etc. In some embodiments, the system 2800 may be applied to identify a source of the sound based on the sound and/or other information, for example, to identify who is speaking, to identify instruments in a concert, to identify the lyrics of a song, etc. For the convenience of description, the application of the system 2800 may be described by taking identifying which device and/or sensor sends the alarm according to the sound and/or other information of device and/or sensor as an example. This is not intended to be limiting, and the system 2800 may be applied in other aspects.

As shown in FIG. 28, the system 2800 may include a sound acquisition module 2801, a sound processing module 2802, and a data transmission module 2803. In some embodiments, the sound acquisition module 2801, the sound processing module 2802, and the data transmission module 2803 may be connected in sequence.

In some embodiments, the system 2800 may also include an information acquisition module 2804 and an information processing module 2805. The information processing module 2805 and the information acquisition module 2804, as well as other modules (e.g., the sound acquisition module 2801, the sound processing module 2802, or the data transmission module 2803) may have a signal connection (e.g., an electrical connection).

In some embodiments, the sound acquisition module 2801 may include a device such as a microphone, a local alarm pickup device, etc., for acquiring sound emitted by a smart device (e.g., a smoke alarm, a flood alarm, a combustible gas alarm, a smart door lock, etc.). In some embodiments, the information acquisition module 2804 may include a system monitor configured to acquire state information of a sensor (e.g., a temperature sensor, a combustible gas concentration sensor, an air humidity sensor, etc.). In some embodiments, the information acquisition module 2804 may be used to acquire state information of a sensor of the smart device (e.g., a smoke alarm, a fire alarm, a combustible gas alarm, a smart door lock, etc.). In some embodiments, the information acquisition module 2804 may be a data acquisition device configured to acquire data information of a gateway of an Internet of Things. In some embodiments, the sound acquisition module 2502 and the information acquisition module 2804 may be run simultaneously, or only one of the sound acquisition module 2502 and the information acquisition module 2804 can be run, which may be flexibly selected according to the actual situation, and is not limited in this disclosure. The data transmission module 2803 may include a device such as a controller. The data transmission module 2803 may be a wired transmission module or a wireless transmission module. The wireless transmission module may be a near field communication (NFC) module, a Bluetooth™ module, a ZigBee™ module, a local area network (LAN), a satellite, etc.

In some embodiments, the sound acquisition module 2801 may acquire a sound signal of a smart device (e.g., the smoke alarm, the flood alarm, the combustible gas alarm, etc.), such as acquire an emitted alarm sound. In some embodiments, the smart device may include a smoke detection alarm, an intrusion alarm, etc. Each type of alarm has its own fixed alarm sound and frequency. Parameters such as a decibel and frequency of the alarm sound emitted by each alarm may be different, i.e., the sound emitted by each alarm is different, and then which device sends which alarm may be determined according to the alarm sound.

In some embodiments, the information acquisition module 2804 may be connected to the sensor and/or device via the data transmission module 2803. In some embodiments, the information acquisition module 2804 may acquire the state information of the sensor and/or a sensor of the device via the data transmission module 2803. For example, the information acquisition module 2804 may connect with a temperature sensor via a Bluetooth network to acquire the information of the temperature sensor.

The sensor may detect and acquire an external signal, a physical condition (e.g., light, heat, and humidity) or a chemical composition (e.g., smoke), and may convert the detected and acquired information into an electrical signal or other required forms of the state information according to a certain rule. That is, the state information of different sensors may be different, and then which type of alarm or what alarm is sent by which device may be determined according to the state information of the sensors.

In some embodiments, the information acquisition module 2804 may acquire gateway data information of the Internet of Things. The device and/or sensor with a remote communication function may perform data transmission with the outside world through the gateway of the Internet of Things. Each device and/or sensor has a unique identifier during the data transmission over the network, so by analyzing the data, what alarm is sent by which device and/or sensor may be determined.

In some embodiments, the information acquisition module 2804 may acquire information in real time. In some embodiments, the information acquisition module may acquire the information periodically, for example, the information acquisition module may acquire the information every 10 seconds. In some embodiments, the information acquisition module may adopt different frequencies to collect information based on a large amount of data at different times and in different scenarios. For example, in winter when the temperature is relatively low, people may rely on burning coal for heating, which is easy to cause fire and produces carbon monoxide, sulfur dioxide, and other gases that are harmful to the human body. The information acquisition module may acquire information of a temperature sensor and information of a harmful gas sensor in real time, and may acquire information of a humidity sensor at intervals or even not acquire the information of the humidity sensor.

In some embodiments, the information acquisition module 2804 may actively acquire the information. In some embodiments, the information acquisition module may passively receive the information from the devices and/or sensors. For example, the information acquisition module is only provided with a receiving module that may receive the information from the devices and/or sensors.

The sound processing module 2802 may obtain a sound analysis result corresponding to a sound signal. The sound analysis result is a sound analysis result of the smart device. The data transmission module 2803 may output the sound analysis result to one or more user terminal devices (e.g., the first terminal device).

Sound is produced by vibration, and different sound signals have different values of feature indicators. By analyzing the sound signal, the meaning of the sound can be identified, so that the user may more easily understand the meaning represented by the sound. In practical applications, the sound processing module 2802 may obtain the sound analysis result by local analysis. Specifically, the sound signal may be analyzed to obtain feature information of the sound signal. The feature information of the sound signal may include a timbre, a tone, a vibration frequency, or a duration, etc., or a combination thereof. After the feature information of the sound signal is determined, according to the information such as the timbre, the tone, the vibration frequency, or the duration, of different smart devices stored in a built-in database of the sound processing module 2802, a smart device corresponding to the obtained feature information may be determined from the database, so that the sound analysis result of the specific smart device may be obtained. For example, the sound analysis result may be that the smoke alarm sends an alarm, etc.

In some embodiments, the information processing apparatus further includes a second terminal device. The second terminal device is connected with the data transmission module 2803. The sound processing module 2802 sends the sound signal to the second terminal device. The second terminal device obtains the sound analysis result corresponding to the sound signal, and sends/feeds back the sound analysis result to the sound processing module 2 802.

In some embodiments, the information processing module 2805 may process information and transmit a processing result to one or more user terminal devices. In some embodiments, the information processing module 2805 may determine what alarm is sent by which device and/or sensor by matching a local and/or cloud database, and output the processing result to the user terminal device through the data transmission module 2803. For example, the information processing module 2805 matches the information obtained by the information acquisition module 2804 with the local and/or cloud database and obtains a processing result that a flammable gas concentration sensor has issued an alarm, and transmits the processing result to the first terminal device. In some embodiments, the information processing module 2805 may use a machine learning model to determine what alarm is sent by which device and/or sensor, and output the result to the user terminal device through the data transmission module 2803. For example, an output result of the machine learning model includes similarities of various alarms of various devices and/or sensors. The information processing module 2805 selects a result with the highest similarity value as the result, and transmits the result to the user terminal device. In some embodiments, the information processing module 2805 may process and summarize the sound analysis result from the sound processing module 2802, and transmit the processing result to the user terminal device.

In some embodiments, the information processing module 2805 may transmit the obtained information to the user terminal device. In some embodiments, the information processing module 2805 may aggregate the information from the information acquisition module and push the information to the first terminal device. In some embodiments, the information processing module may summarize and process the information of the information acquisition module 2804, and transmit the processing result to the first terminal device. For example, if the information summarized by the information processing module is that the smoke sensor detects that the smoke concentration is too high, and the temperature sensor detects that the temperature is normal room temperature, the processing result of the information processing module may be that the fire is very small. In some embodiments, the information processing module 2805 may aggregate the processing result of the information processing module and the sound analysis result of the sound processing module 2802, and transmit the processing result and the sound analysis result to the user terminal device.

In addition, the sound analysis result may include not only the type of the smart device (which may be referred to as a sound processing result in this embodiment), but also a push manner and a push object (which may be referred to as the first terminal device) of the sound processing result. The push manner refers to a manner used to push, such as through wireless, wired, mobile signal (SMS), APP push messages, etc. The push object refers to a terminal device to which the sound processing result may be sent. In this embodiment, the push manner and the push object corresponding to the obtained sound processing result may be determined based on a pre-obtained corresponding relationship between a sound processing result and a push manner, and a pre-obtained corresponding relationship between a sound processing result and a push object. In some embodiments, the information processing module 2805 may use the push manner and the push object included in the sound analysis result from the sound processing module 2802. In some embodiments, the information processing module 2805 may only retain the sound processing result in the sound analysis result from the sound processing module 2802, and the information processing module 2805 may determine a new push manner and push object for pushing.

In some embodiments, the information processing module 2805 may determine the push manner and the push object based on a connection state between the user terminal device and the network. In some embodiments, the information processing module 2805 may obtain the connection state between the user terminal device and the network based on the data transmission module 2803 to determine the push manner and push object. For example, when the information processing module 2805 detects that the first terminal device is not connected to the Internet through the data transmission module 2803, the first terminal device may be determined as the push object, and the determined push manner may be SMS, Bluetooth, etc., that perform data transmission without the Internet. Alternatively, the information processing module 2805 may determine a local community security room or a local police station, i.e., a third terminal device, as the push object. The determined push manner may be wireless, wired, mobile signal (SMS), APP push messages, etc.

In some embodiments, the information processing module 2805 may determine the push manner and the push object based on the type of the information processing result. For example, the information processing module 2805 may classify the sound processing result of the sound processing module 2802, and determine the push manner and the push object based on a classification result. Merely by way of example, the information processing module 2805 may acquire the sound processing result of the sound processing module 2802, and classify the sound processing result into prompting or alarming. For the prompting, the first terminal device may be determined as the push object, and the push manner that does not cause too much interference to the user, such as SMS and APP push messages, may be determined as the push manner. For the alarming, the first terminal device and the third terminal device may be determined as the push object, or in order to reduce the loss, terminal devices that is within a certain distance from the information acquisition module 2804 and/or the first terminal device may also be determined as the push object, and the wireless, wired, mobile signal (short message), APP push messages, etc., may be determined as the push manner. The sound analysis result in this embodiment may include the above-mentioned sound processing result, push manner, and push object. However, when pushing the sound processing result, the content of the sound processing result may only be pushed. In addition, the content of the push manner and the push object may also be pushed.

The above embodiments may be applied in a scenario where the smart device corresponding to the feature information is obtained from the database. In practical applications, if the data stored in the database is not comprehensive and the smart device corresponding to the feature information cannot be obtained from the database, the received sound and feature information corresponding to the sound may be pushed to the user terminal device (e.g., the above-mentioned first terminal), so that the user may know the current state of the device through the user terminal device. In some embodiments, the action of a linkage device associated with the device may be manually controlled remotely, for example, a camera at the location of the sound source may be activated to take images, or when the device sends a smoke alarm, the windows may be controlled to be opened, etc.

After obtaining the sound analysis result, the processing device 112 may output the result to the first terminal device through the data transmission module 2803. The first terminal device may be the user's terminal device, such as a mobile phone, a tablet, a notebook, or any other device. When the data transmission module 2803 outputs the sound analysis result, the sound analysis result may be pushed according to the determined push manner.

In some embodiments, the system 2800 may also be connected with the third terminal device. If a resident fails to process the alarm message in time, for example, the information fed back by the first terminal device is not received through the data transmission module 2803 within a preset time period, the processing device 112 may forward the sound analysis results to the third terminal device, i.e., when the user cannot process the alarm message in time, a relevant agency can also process the emergency alarm message, so as to improve safety and protect the user's property from damage.

In practical applications, regardless of whether the first terminal device may process the sound analysis results in time, the sound processing module 2802 may control a target linkage device associated with the smart device to perform a target action corresponding to the smart device. Specifically, the sound processing module 2802 may control an action of an alarm elimination device corresponding to the smart device to prevent further expansion of the risk. For example, when the flood alarm in the home sounds, the power supply in the home is automatically cut off to avoid another disaster. When the smoke alarm sounds, the windows are controlled to be opened, etc. In addition, the camera device may also be controlled to use the image information of the smart device. For example, when the anti-prying alarm of the windows sounds, all the cameras of the user are on alert, start taking images, and send the images and videos to the user, which helps the user to trace and understand the specific situation.

In this embodiment, a device with a pickup function is used to always receive the early warning or alarm sound of other sensors in an always-on manner. This device is also a device that may be connected to the Internet. The device may analyze the meaning of the sound signal through the network or locally, and then transmit the meaning of the alarm to the user. Even if the user is not at home, the user may know the alarm state at home through the Internet, and then may deal with the emergency alarm as soon as possible. In some embodiments, the device may also send the sound signal to the second terminal device, such as a cloud, so that the second terminal device parses the sound signal to obtain the feature information, and determine the sound analysis result corresponding to the feature information. That is, "the sound processing module 2802 sends the sound signal to the second terminal device; and the second terminal device obtains the sound analysis result corresponding to the sound signal, and send the sound analysis result to the sound processing module 2802."

If the second terminal device processes the sound signal, the controlling the target linkage device associated with the smart device to perform the target action corresponding to the smart device may also be achieved through the second terminal device. For the specific process, please refer to the processing process of the sound processing module 2802, which is not described here.

In order to enable those skilled in the art to understand the present disclosure more clearly, a scenario embodiment is now provided for illustration. Specifically, taking the smart device as a smoke alarm as an example, assuming that a fire occurs in the home, the smoke concentration is high and exceeds an alarm threshold of the smoke alarm. The smoke alarm may emit a warning sound. At this time, the sound acquisition module 2801 of the information processing apparatus in the embodiment of the present disclosure may acquire the warning sound, and then send the warning sound to the sound processing module 2802 for analysis, and a result of the analysis is that the sound processing result is a smoke alarm. If the push manner is SMS, and the push terminal device is the user's mobile phone, a message of "the smoke alarm at home is alarming" may be sent to the user's mobile phone as a short message to inform the user that there may be a fire at home. If the user does not reply to the short message for a long time, it means that the user may not have seen the short message, then the short message may be sent to the security personnel in the community. After the security personnel see the short message, they can deal with the fire in time.

It should be noted that the above descriptions of the information processing apparatuses, modules, and the units thereof are merely for the convenience of description and does not intend to limit the present disclosure to the scope of the embodiments. It may be understood that for those skilled in the art, after understanding the principle of the system, they may arbitrarily combine various modules or form a subsystem to connect with other modules without departing from this principle. For example, the sound acquisition module 2801 and the information acquisition module 2804 may be different modules of one information processing apparatus, or a single module that may realize functions of the sound acquisition module 2801 and the information acquisition module 2804. The sound processing module 2802 and the information processing module 2805 may be different modules of the information processing apparatus, or a single module that may realize functions of the above two modules. Such deformation is within the protection scope of the present disclosure.

In addition, while sending the short message to the user's mobile phone, a target linkage device (e.g., a camera and a water spray device) corresponding to the smoke alarm may be determined. The water spray device may be controlled to spray water, and the camera may be controlled to capture images of the home. In addition, in order to improve the intelligence of the information processing apparatus, the camera may be controlled to capture images of the home from different angles, and then analyze the fire position from the images, and control the water spray device to spray water to the fire position to eliminate the fire as soon as possible. The images or videos collected by the camera may be sent to the user's mobile phone in real time, so that the user may view the situation at home in real time.

In this embodiment, the sound signal of the smart device is acquired by the sound acquisition module 2801, and the sound processing module 2802 obtains the sound analysis result corresponding to the sound signal. The data transmission module 2803 outputs the sound analysis result to the first terminal device. The sound analysis result is the analysis result of the sound emitted by the smart device, i.e., which device sends the alarm, so that the user understands the contents of the alarm sound. In addition, if the user is not at the location of the smart device, the sound analysis result may be outputted to the user's first terminal device through the data transmission module 2803, so that the user may know the sound analysis result in time, which has a high degree of intelligence, and a better user experience.

In the embodiment of the present disclosure, alarm signal analysis and sound analysis result output may be performed in time through the information processing apparatus. It should be noted that the information processing apparatus in the present disclosure may be an independent device, and may also be integrated in an existing smart terminal device, such as a door lock, a peephole, or a smart audio device. In addition, the device in the embodiments of the present disclosure may pick up sound on the basis of the user's original device alarm, the transformation cost is relatively low, the original home smart device does not need to be destroyed, and complete compatibility and adaptation may be achieved. The user does not need to re-purchase a complete set of smart devices to support this solution, the user's cost investment is less, and resources may be reused.

For the existing smart device, such as a smoke alarm, a flood alarm, a combustible gas alarm, a smart door lock, etc., may only install local smart devices, i.e., when an early warning or alarm condition is satisfied, the alarm may be sent. For example, the smoke alarm detects the concentration of smoke, and when the concentration reaches a certain concentration, the smoke alarm may alarm. As another example, a sound such as a warning sound of the door lock when the door lock detects an abnormal person, a low battery warning sound of the door lock, etc., is a kind of alarm prompt more of a local alarm prompt sound, and the user may not know exactly the specific content of the alarm prompt sound. For example, the user may only hear the alarm prompt sound, but the user do not know which smart device the prompt sound belongs to. As another example, for the user who is not local, the alarm prompt sound cannot be received at all. In addition, converting the local smart device into a device that can support remote alarms or prompts may lead to a higher overall cost.

According to the device control method and the system provided in the present disclosure, in the case of the early warning or the alarm, the smart device may sense the current state of the environment through the built-in sensors of the device, and generate the early warning or the alarm according to the dynamic changes of the environmental state. For example, the smart device and the smoke alarm may detect the indoor smoke concentration through the built-in sensors, and generate the sound prompt of early warning or alarm sound according to the change of the smoke concentration. Meanwhile, the sounds of different types of alarm prompt (e.g., the smoke alarm, the fire alarm, the flood alarm, the prying-proof alarm, the door lock prompt sound, etc.) are different. On this basis, the embodiments of the present disclosure can identify the sound signal of the alarming smart device, analyze the sound signal, and extract the meaning of the alarm content contained in the alarm sound signal, so as to interact with the user through the APP or other means, such as prompting the user through the short message and also informing the content of the alarm, or connect to the nearest local police station by other means, thereby handling early warning or alarm events in time to avoid irreparable losses.

Figure 29:
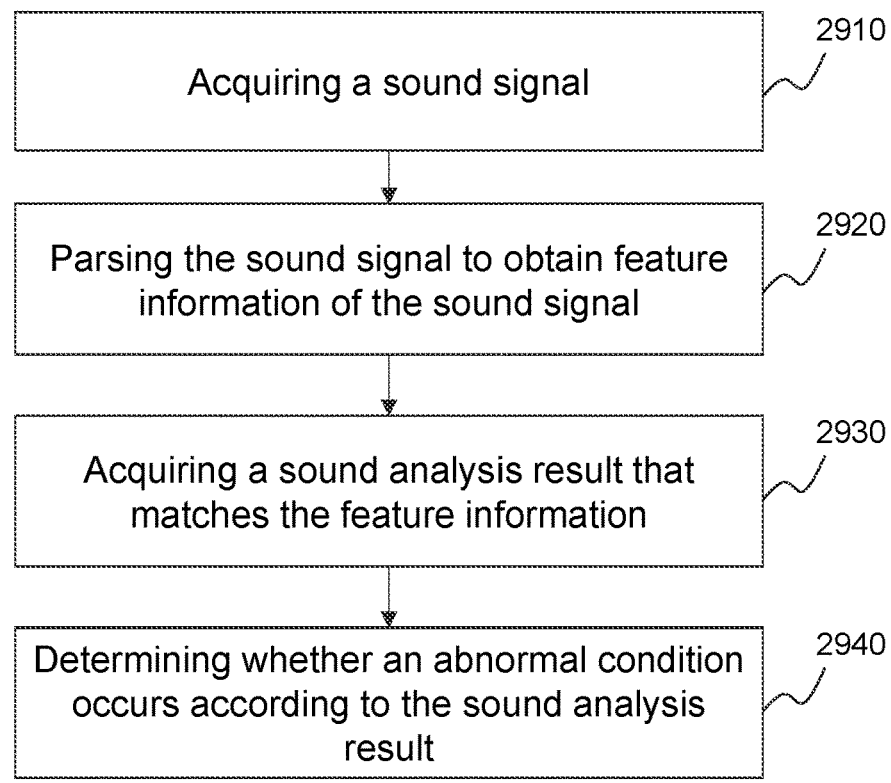
FIG. 29 is an exemplary flowchart illustrating a process for analyzing an abnormal condition according to some embodiments of the present disclosure.

FIG. 29 is an exemplary flowchart illustrating a process for analyzing an abnormal condition according to some embodiments of the present disclosure. In some embodiments, a process 2900 may be executed by a processing logic, which may include hardware (e.g., a circuit, a dedicated logic, a programmable logic, a microcode, etc.), software (instructions running on a processing device to execute hardware simulation), or the like, or any combination thereof. One or more operations illustrated in FIG. 29 for creating a set may be implemented by the device control system 100 in FIG. 1 and the system 2800 shown in FIG. 28. For example, the process 2900 may be stored in a storage device in a form of instructions, which are retrieved and/or executed by the processing device 112. For the convenience of description, in the process 2900, a method for determining an abnormal condition according to a sound signal may be taken as an example to describe a method for determining the abnormal condition according to the sound and/or other information of the device and/or the sensor.

In 2910, the processing device 112 may acquire information. The information may include a sound signal, a light signal, an electrical signal, and other information. In some embodiments, the operation 2910 may be performed by the sound acquisition module 2801 of the system 2800.

In some embodiments, the sound signal may include a sound of any entity, e.g., sounds made by various devices (e.g., alarms), sounds of people speaking, sounds made by musical instruments, or the like. In some embodiments, the sound signal may be emitted by one or more components in a smart device (e.g., the smart device 130 in FIG. 1). For example, the sound signal may be an alarm sound from a smart door lock, a smoke alarm, a noise alarm, a smoke alarm, a fire alarm, a combustible gas alarm, or the like. In some embodiments, the sound signal may also include state information, gateway information, related information on the network, etc., of the device.

In some embodiments, the sound signal may be picked up by one or more sound signal pickup components (e.g., microphones, local alarm pickup devices, etc.). The processing device 112 may acquire the sound signal from one or more sound pickup devices and/or storage devices (e.g., the storage device of the smart device 130) in a wired or wireless manner. For example, the one or more sound pickup components may be the sound pickup components on the smart device, or may be external sound pickup components.

In some embodiments, the processing device 112 may acquire the sound signal in real time. In some embodiments, the processing device 112 may acquire the sound signal at a regular interval (e.g., 10 seconds, 20 seconds, 30 seconds, 1 minute, etc.). In some embodiments, the time interval for signal acquisition may be set by the user, or set or adjusted by the processing device 112 according to actual conditions. For example, when the processing device 112 determines that an abnormal situation occurs, the time interval for signal acquisition may be shortened. In some embodiments, when the processing device 112 determines that an abnormal situation occurs, the time interval for signal acquisition may be shortened or canceled. For example, the processing device 112 may adopt different frequencies to collect information based on a large amount of data at different times and in different scenarios. Merely by way of example, in winter when the temperature is relatively low, people may rely on burning coal for heating, which is easy to cause fire and produces carbon monoxide, sulfur dioxide, and other gases that are harmful to the human body. The processing device 112 may acquire sound information of a temperature sensor and sound information of a harmful gas sensor in real time, and may acquire sound information of a humidity sensor at intervals.

In 2920, the processing device 112 may parse the information to obtain features of the information. For example, the processing device 112 may parse the acquired sound signal to obtain the feature information of the sound signal. In some embodiments, operation 2910 may be performed by the sound acquisition module 2801 in the system 2800.

In some embodiments, the feature information of the sound signal may include a timbre, a tone, a vibration amplitude, a vibration frequency, a duration, an amplitude, etc., or a combination thereof. In some embodiments, the processing device 112 may extract feature information of the sound signal from the sound signal based on various feature extraction techniques for the sound signal. Exemplary feature information extraction techniques for the sound signal may include mel-frequency cepstral coefficient (MFCC), packet level protocol (PLP), filter cluster, etc., or a combination thereof.

In 2930, the processing device 112 may obtain an analysis result that matches the feature information. For example, the processing device 112 may acquire the feature information that matches the feature information of the sound signal. Operation 2930 may be performed by the sound processing module 2802 in the system 2800.

In some embodiments, according to the feature information of the sound signals of different smart devices stored in, for example, the built-in database of the sound processing module 2802, the processing device 112 may obtain the smart device corresponding to the obtained feature information from the database.

Specifically, the processing device 112 may first screen out all sound analysis results that conform to the first information of the feature information, and then obtain all sound analysis results that conform to the second information of the screened sound analysis results . . . , until a sound analysis result that simultaneously satisfies each information of the feature information is obtained. In addition, the processing device may also traverse a database to find a sound analysis result that completely matches the above-mentioned feature information. Alternatively, the processing device pre-trains a neural network model that is obtained by training based on a large number of feature information samples (e.g., normal condition samples, abnormal condition samples, etc.) and the sound analysis results corresponding to the feature information samples. By inputting the above feature information into the neural network model, the corresponding sound analysis results may be output. Of course, in this embodiment of the present disclosure, other methods other than the above-mentioned method may also be used to "obtain the sound analysis results that match the feature information". Any method that can acquire the sound analysis results that match the feature information may fall within the protection scope of the embodiment of the present disclosure.

In some embodiments, the processing device 112 may obtain a sound analysis result of a specific smart device, for example, the sound analysis result may be that the smoke alarm sends an alarm, etc. In some embodiments, the processing device 112 may determine what alarm is sent by which device and/or sensor by matching the local and/or cloud database. For example, the information processing module 2805 matches the information obtained by the information acquisition module 2804 with the local and/or cloud database, and the obtained processing result is that the combustible gas concentration sensor sends an alarm. In some embodiments, the processing device 112 may use a machine learning model to determine what alarm is sent by which device and/or sensor. For example, the output result of the machine learning model is the similarities of various alarms of various devices and/or sensors, and the processing device 112 selects the result with the highest similarity value from the similarities.

In 2940, the processing device 112 and/or the user may determine whether an abnormal condition occurs according to the analysis result. For example, the processing device 112 and/or the user may determine whether the abnormal condition occurs based on a sound analysis result. Operation 2940 may be performed by the information processing module 2805 in the system 2800.

In some embodiments, the abnormal condition may include a stranger opening the door lock, presence of a stranger indoors and/or outdoors, unauthorized user controlling the device, fire, flood, smoke, objects (e.g., accidents of monitored elderly, children, pets, etc.) etc., or a combination thereof.

In some embodiments, the processing device 112 and/or the user may determine whether the abnormal condition occurs based on the analysis result. For example, when the analysis result is that a fire alarm sounds a fire alarm, the processing device 112 and/or the user may determine that the abnormal condition occurs. As another example, when the analysis result is that a stranger is indoors, the processing device 112 and/or the user may determine that the abnormal condition occurs.

In some embodiments, the processing device 112 and/or the user may determine whether the abnormal condition occurs according to the feature information of the sound signal. For example, the processing device 112 may determine whether the frequency of the sound signal is greater than a frequency threshold. When the processing device 112 and/or the user determines that the frequency of the sound signal is greater than the frequency threshold, the processing device 112 and/or the user may determine that the abnormal condition occurs. As another example, the processing device 112 and/or the user may determine whether an amplitude of the sound signal is greater than an amplitude threshold. When the processing device 112 and/or the user determines that the amplitude of the sound signal is greater than the amplitude threshold, the processing device 112 and/or the user may determine that the abnormal condition occurs. In some embodiments, the threshold (e.g., the frequency threshold, the amplitude threshold, the duration threshold, etc.) corresponding to the sound feature information may be a predetermined value or a value determined by the processing device 112 and/or the user according to the specific condition.

It should be noted that the above description is merely for the convenience of description and does not intend to limit the present disclosure to the scope of the embodiments. It may be understood that for those skilled in the art, after understanding the principle of the system, they may make various modifications and changes to the above methods and systems in form and detail without departing from the principle. In some embodiments, operation 2940 may be omitted from the process 2900.

In some embodiments, the process 2900 may include one or more additional operations. For example, after each operation of the process 2900, the processing device 112 may transmit the sound signal, the feature information of the sound signal, the sound analysis result, and/or the abnormal condition to one or more user terminal devices. For example, when the data stored in the database is not comprehensive and the smart device corresponding to the feature information cannot be obtained from the database, the received sound and the feature information corresponding to the sound may be pushed to a user terminal device (e.g., the first terminal device mentioned above), so that the user may know the current state of the device through the user terminal device.

In some embodiments, the processing device 112 may transmit the feature information of the sound signal, the sound analysis result, the abnormal condition, etc., or a combination thereof to one or more user terminal devices.

In some embodiments, the processing device 112 may acquire sound signals of one or more devices, and transmit sound analysis results of the one or more devices that match the feature information and/or abnormal conditions determined according to the sound analysis results to one or more user terminal devices. The sound analysis results may include sound processing results, push manners of the sound processing results, and push object of the sound processing results. For example, the processing device 112 may send the sound signals, the feature information, the sound analysis results, and/or determined abnormal conditions of one or more devices to one or more user terminal devices. As another example, the processing device 112 may process and summarize the sound analysis results of one or more devices, and transmit the processing results to one or more terminal devices. As a further example, the processing device 112 may determine that the fire intensity is small according to the smoke sensor detecting that the smoke concentration is too high, and the temperature sensor detecting that the temperature is a normal room temperature.

The push manner refers to a manner used to push, such as through wireless, wired, mobile signal (SMS), APP push messages, etc. The push object refers to a terminal device to which the sound processing result may be sent. In this embodiment, the push manner and the push object corresponding to the obtained sound processing result may be determined based on a pre-obtained corresponding relationship between a sound processing result and a push manner, and a pre-obtained corresponding relationship between a sound processing result and a push object.

In some embodiments, the processing device 112 may determine the push manner and the push object based on a connection state between the first terminal device and the network. In some embodiments, the processing device 112 may determine the push manner and the push object based on a connection state between the user terminal device and the network. For example, when the processing device 112 determines that the first terminal device is not connected to the Internet, the first terminal device may be determined as the push object, and the determined push manner may be SMS, Bluetooth, NFC, etc., that perform data transmission without the Internet. In some embodiments, the processing device 112 may determine a third terminal device (e.g., a local community security room, a local police station, a property manager, etc.) as the push object, and the determined push manner may include wireless, wired, mobile signal (SMS), APP push messages, etc.

In some embodiments, the processing device 112 may determine the push manner and the push object based on the type of the sound analysis result. In some embodiments, the processing device 112 may classify the sound analysis result, and determine the push manner and the push object based on a classification result. For example, the processing device 112 may classify the sound processing result into prompting or alarming. For the prompting, the processing device 112 may determine the first terminal device as the push object, and the push manner that does not cause too much interference to the user, such as SMS and APP push messages, may be determined as the push manner. For the alarming, the processing device 112 may determine the first terminal device and the third terminal device as the push object, or in order to reduce the loss, terminal devices that is within a certain distance from the information acquisition module 2804 and/or the first terminal device may also be determined as the push object, and the wireless, wired, mobile signal (short message), APP push messages, etc., may be determined as the push manner. The sound analysis result in this embodiment may include the above-mentioned sound processing result, push manner, and push object. However, when pushing the sound processing result, the content of the sound processing result may only be pushed. In addition, the content of the push manner and the push object may also be pushed.

In some embodiments, the processing device 112 may also be connected to the third terminal device. If a resident fails to process the alarm message in time, for example, if the processing device 112 does not receive the information fed back by the first terminal device within a preset time period, the sound analysis result may be forwarded to the third terminal device. That is, when the user cannot deal with the alarm message in time, the relevant agency may also handle the emergency alarm message, so as to improve safety and protect the user's property from damage.

In some embodiments, the information acquisition module 2804 may acquire a distance between the system 2800 and the first terminal device. In some embodiments, the information processing module 2805 may determine whether the user is nearby based on the acquired distance information. In some embodiments, the information processing module 2805 may compare the collected distance information with a preset distance range, and determine that the user is not nearby if the acquired distance exceeds the preset distance range.

In some embodiments, the information processing module 2805 may output the sound analysis result to the first terminal device through the data transmission module 2803, and determine whether the user is nearby. If the user is nearby, the information processing module 2805 may do not forward the sound analysis result to the third terminal device. If the user is not nearby, the information processing module 2805 may forward the sound analysis result to the third terminal device. In this way, when the user is nearby, the user may check whether a false alarm occurs in time according to the alarm, and take measures to reduce the workload for firefighters, police officers, etc. When the user is not nearby, firefighters, police officers, etc., may be notified in time to avoid risks regardless of whether the false alarm occurs.

In some embodiments, the processing device 112 or the user may perform a corresponding operation on one or more devices. For example, the processing device 112 may link a device (e.g., the first device) in a control set (e.g., a first set) to perform the corresponding operation. For example, when the processing device 112 determines that a fire occurs, the processing device 112 may activate a camera at the location where the sound source is located, and control the power supply and/or the gas stove to be turned off. As another example, when the processing device 112 determines that the temperature in the house is too high, the processing device 112 may control the door lock to be unlocked, the windows to be opened, etc.

In some embodiments, regardless of whether the user may process the sound analysis result in time, the processing device 112 may control the target linkage device associated with the smart device to perform the target action corresponding to the smart device, and specifically may control the action of the alarm elimination device corresponding to the smart device to prevent further damage. For example, when the flood alarm in the home sounds, the power supply in the home is automatically cut off to avoid another disaster. When the smoke alarm sounds, the windows are controlled to be opened, etc. In addition, a camera device may be controlled to capture the image information of the smart device. For example, when a prying-proof alarm of the window sounds, the user's camera devices are all on alert, start shooting images, and send the images and videos to the user, which helps the user to trace and understand the specific situation.

In order to enable those skilled in the art to understand the present disclosure more clearly, a scenario embodiment is now provided for illustration. Specifically, taking the smart device as a smoke alarm as an example, assuming that a fire occurs in the home, the smoke concentration is high and exceeds an alarm threshold of the smoke alarm. The smoke alarm may emit a warning sound. At this time, the sound acquisition module of the information processing apparatus in the embodiment of the present disclosure may acquire the warning sound, and then send the warning sound to the sound processing module for analysis, and a result of the analysis is that the sound processing result is a smoke alarm. If the push manner is SMS, and the push terminal device is the user's mobile phone, a message of "the smoke alarm at home is alarming" may be sent to the user's mobile phone as a short message to inform the user that there may be a fire at home. If the user does not reply to the short message for a long time, it means that the user may not have seen the short message, then the short message may be sent to the security personnel in the community. After the security personnel see the short message, they can deal with the fire in time.

In addition, while sending the short message to the user's mobile phone, a target linkage device (e.g., a camera and a water spray device) corresponding to the smoke alarm may be determined. The water spray device may be controlled to spray water, and the camera may be controlled to capture images of the home. In addition, in order to improve the intelligence of the information processing apparatus, the camera may be controlled to capture images of the home from different angles, and then analyze the fire position from the images, and control the water spray device to spray water to the fire position to eliminate the fire as soon as possible. The images or videos collected by the camera may be sent to the user's mobile phone in real time, so that the user may view the situation at home in real time.

In this embodiment, the sound signal of the smart device is acquired by the sound acquisition module, and the sound processing module obtains the sound analysis result corresponding to the sound signal. The data transmission module outputs the sound analysis result to the first terminal device. The sound analysis result is the analysis result of the sound emitted by the smart device, i.e., which device sends the alarm, so that the user understands the contents of the alarm sound. In addition, if the user is not at the location of the smart device, the sound analysis result may be outputted to the user's first terminal device through the data transmission module, so that the user may know the sound analysis result in time, which has a high degree of intelligence, and a better user experience.

The embodiments of the present disclosure may perform alarm signal analysis and sound analysis result output in time. In addition, the device in the embodiments of the present disclosure may pick up sound on the basis of the user's original device alarm, the transformation cost is relatively low, the original home smart device does not need to be destroyed, and complete compatibility and adaptation may be achieved. The user does not need to re-purchase a complete set of smart devices to support this solution, the user's cost investment is less, and resources may be reused.

The process of the method for analyzing the abnormal condition is described in FIG. 29 by taking the sound signal as an example. It should be noted that the above description is only for illustration and description, and does not limit the scope of application of the present disclosure. For those skilled in the art, various modifications and changes can be made to the method for analyzing the abnormal condition under the guidance of the present disclosure. However, such modifications and changes are still within the scope of this disclosure. In some embodiments, the method for analyzing the abnormal condition may also be performed based on other types of signals or information. For example, the method for analyzing the abnormal condition may also be applied to optical signals, electromagnetic wave signals, radar signals, or the like.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block," "module," "engine," "unit," "component,"

or "system". Furthermore, aspects of the present disclosure may take the form of a computer program product embodied in one or more computer-readable media having computer-readable program code embodied thereon.

In the present disclosure, the descriptions of the device control method and system is intended to be illustrative, but not to limit the scope of the application. Numerous alternatives, modifications, and variations may be apparent to those of ordinary skill in the art. The features, structures, methods, and other features of the exemplary embodiments described herein may be combined in various ways to obtain additional and/or alternative exemplary embodiments.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

What is claimed is:

1. A method for controlling a device, comprising:
   determining one or more sets, wherein the one or more sets include one or more preset rules each of which corresponds to a set of the one or more sets;
   including a first device into a first set of the one or more sets based on information of the first device;
   controlling the first device in the first set to perform a corresponding operation according to a preset rule corresponding to the first set;
   receiving a sharing request of the first device;
   creating a new set by using an identifier of the first set corresponding to the first device as a set identifier;
   including the first device into the new set; and
   setting a control authority of the first device to make the control authority meet a requirement of setting information of an original user account corresponding to the first device, wherein the first device includes a smart lock, and the method further comprises:
   detecting, by a temperature sensor arranged on an inner panel of the smart lock, an indoor temperature;
   detecting, by a carbon monoxide detector, an indoor concentration of carbon monoxide;
   detecting, by a smoke detector, an indoor concentration of smoke;
   determining whether the indoor temperature exceeds a temperature threshold, whether the indoor concentration of carbon monoxide exceeds a first standard, and whether the indoor concentration of smoke exceeds a second standard;
   in response to determining that the indoor temperature exceeds the temperature threshold, the indoor concentration of carbon monoxide exceeds the first standard, and the indoor concentration of smoke exceeds the second standard, controlling the smart lock to be unlocked.

2. The method of claim 1, further comprising:
   receiving a management instruction; and
   performing a corresponding management operation according to the management instruction, wherein the management instruction is configured to instruct to manage: a set, a device in the set, and a user account associated with the device in the set.

3. The method of claim 1,
   wherein the sharing request carries the identifier of the first device, an identifier and configuration information of the first set corresponding to the first device, and the setting information of the original user account corresponding to the first device, and
   configuration information of the new set is set as the configuration information of the first set.

4. The method of claim 1, further comprising:
   obtaining a control instruction for controlling the first device used by a user;
   verifying whether the control instruction satisfies a preset condition to obtain a verification result; and
   determining whether to control the first device to perform an operation corresponding to the control instruction according to the verification result, a state of the first device, and the control instruction.

5. The method of claim 4, wherein the control instruction is sent by the user through a first terminal device, and the verifying whether the control instruction satisfies the preset condition comprises:
   verifying whether the first terminal device has an authority to execute the operation corresponding to the control instruction.

6. The method of claim 4, wherein the control instruction is generated based on an operation of the user on an operating component of the first device, and the verifying whether the control instruction satisfies the preset condition includes:
   verifying whether the operating component is at a preset position.

7. The method of claim 4, wherein the control instruction is configured to control to turn on or turn off a preset mode of the first device, and the preset mode includes one or more of: a safe mode, a do not disturb mode, a specific user control mode, or a user self-setting mode.

8. The method of claim 4, further comprising:
after controlling the first device to perform the operation corresponding to the control instruction, determining whether a preset scene occurs based on an image acquired by an image acquisition device; and
in response to determining that the preset scene occurs, controlling the image acquisition device to perform an image acquisition operation according to a preset image acquisition rule.

9. The method of claim 1, wherein the method further comprises:
detecting a door-opening action behavior or a door-closing action behavior of a user;
in response to determining that the door-opening action behavior or the door-closing action behavior is detected, monitoring an action of a trigger component of the smart lock; and
in response to determining that the action of the trigger component satisfies a predetermined condition, controlling the first device to be in an armed state.

10. The method of claim 9, wherein the monitoring the action of the trigger component of the smart lock comprises:
monitoring an action of an outer door operator or a lock body of the smart lock; and
the in response to determining that the action of the trigger component satisfies the predetermined condition comprises:
determining that a locking action of the outer door operator or the lock body of the smart lock is detected.

11. The method of claim 9, wherein the in response to determining that the door-opening action behavior or the door-closing action behavior is detected, the monitoring the action of the trigger component of the smart lock comprises:
in response to determining that the door-opening action behavior or the door-closing action behavior of the user is detected, monitoring an action of the trigger component of the smart lock within a set time period; and
the in response to determining that the action of the trigger component satisfies the predetermined condition comprises:
determining that the action of the trigger component satisfies the predetermined condition within the set time period.

12. The method of claim 1, wherein the controlling the first device in the first set to perform the corresponding operation according to the preset rule corresponding to the first set comprises:
detecting whether an abnormal condition exists; and
in response to determining that the abnormal condition is detected, controlling the first device in the first set to perform a corresponding operation according to a preset rule corresponding to the abnormal condition.

13. The method of claim 12, wherein the detecting whether the abnormal condition exists comprises:
obtaining information;
obtaining a feature of the information by parsing the information;
obtaining an analysis result that matches the feature; and
determining whether the abnormal condition exists according to the analysis result.

14. The method of claim 13, wherein the information includes a sound signal, the feature of the information includes feature information of the sound signal, and the feature information includes one or more of: a timbre, a tone, a vibration amplitude, a vibration frequency, or a duration.

15. A device control system, comprising:
at least one storage device storing executable instructions; and
at least one processor in communication with the at least one storage device, wherein when executing the executable instructions, the at least one processor is configured to cause the device control system to perform operations including:
determining one or more sets, wherein the one or more sets include one or more preset rules each of which corresponds to a set of the one or more sets;
including a first device into a first set of the one or more sets based on information of the first device;
controlling the first device in the first set to perform a corresponding operation according to a preset rule corresponding to the first set;
receiving a sharing request of the first device;
creating a new set by using an identifier of the first set corresponding to the first device as a set identifier;
including the first device into the new set; and
setting a control authority of the first device to make the control authority meet a requirement of setting information of an original user account corresponding to the first device, wherein the first device includes a smart lock, and the operations further comprise:
detecting, by a temperature sensor arranged on an inner panel of the smart lock, an indoor temperature;
detecting, by a carbon monoxide detector, an indoor concentration of carbon monoxide;
detecting, by a smoke detector, an indoor concentration of smoke;
determining whether the indoor temperature exceeds a temperature threshold, whether the indoor concentration of carbon monoxide exceeds a first standard, and whether the indoor concentration of smoke exceeds a second standard;
in response to determining that the indoor temperature exceeds the temperature threshold, the indoor concentration of carbon monoxide exceeds the first standard, and the indoor concentration of smoke exceeds the second standard, controlling the smart lock to be unlocked.

16. A non-transitory computer-readable storage medium storing instructions, the instructions, when executed by a computer, causing the computer to implement a method, the method comprises:
determining one or more sets, wherein the one or more sets include one or more preset rules each of which corresponds to a set of the one or more sets;
including a first device into a first set of the one or more sets based on information of the first device;
controlling the first device in the first set to perform a corresponding operation according to a preset rule corresponding to the first set;
receiving a sharing request of the first device;
creating a new set by using an identifier of the first set corresponding to the first device as a set identifier;
including the first device into the new set; and
setting a control authority of the first device to make the control authority meet a requirement of setting information of an original user account corresponding to the first device, wherein the first device includes a smart lock, and the method further comprises:

detecting, by a temperature sensor arranged on an inner panel of the smart lock, an indoor temperature;

detecting, by a carbon monoxide detector, an indoor concentration of carbon monoxide;

detecting, by a smoke detector, an indoor concentration of smoke;

determining whether the indoor temperature exceeds a temperature threshold, whether the indoor concentration of carbon monoxide exceeds a first standard, and whether the indoor concentration of smoke exceeds a second standard;

in response to determining that the indoor temperature exceeds the temperature threshold, the indoor concentration of carbon monoxide exceeds the first standard, and the indoor concentration of smoke exceeds the second standard, controlling the smart lock to be unlocked.

17. The method of claim 1, wherein the controlling the first device in the first set to perform a corresponding operation according to a preset rule corresponding to the first set includes:

acquiring an emitted alarm sound from a smart device;

determining a processing result indicating what alarm is sent by which device or sensor by using a machine learning model, wherein an output result of the machine learning model includes similarities of various alarms of various devices or sensors, and the processing result is a result with a highest similarity value;

transmitting the processing result to a user terminal device.

18. The method of claim 17, wherein the smart device includes a smoke detection alarm and an intrusion alarm, an emitted alarm sound from the smoke detection alarm has a different decibel from an emitted alarm sound from the intrusion alarm, and the emitted alarm sound from the smoke detection alarm has a different frequency from the emitted alarm sound from the intrusion alarm.

19. The method of claim 1, further comprising:

controlling the first device to be in an armed state; and releasing the armed state through biometric verification.

20. The method of claim 1, further comprising:

establishing a live video channel between the smart lock and a user terminal device;

transmitting video images acquired by the smart lock to the user terminal device through the live video channel.

* * * * *